United States Patent
Islam et al.

(10) Patent No.: US 12,367,612 B2
(45) Date of Patent: *Jul. 22, 2025

(54) METHOD AND SYSTEM FOR PERFORMING AUTOMATIC CAMERA CALIBRATION FOR ROBOT CONTROL

(71) Applicants: Mujin, Inc., Tokto (JP); Russell Islam, Tokyo (JP)

(72) Inventors: Russell Islam, Tokyo (JP); Rosen Diankov, Tokyo (JP); Xutao Ye, Tokyo (JP)

(73) Assignee: MUJIN, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/436,727

(22) PCT Filed: Jul. 16, 2019

(86) PCT No.: PCT/US2019/042047
§ 371 (c)(1),
(2) Date: Sep. 7, 2021

(87) PCT Pub. No.: WO2020/180342
PCT Pub. Date: Sep. 10, 2020

(65) Prior Publication Data
US 2022/0172399 A1 Jun. 2, 2022

Related U.S. Application Data

(63) Continuation of application No. 16/505,466, filed on Jul. 8, 2019, now Pat. No. 10,636,172, and a
(Continued)

(51) Int. Cl.
*B25J 9/16* (2006.01)
*G06T 1/00* (2006.01)
(Continued)

(52) U.S. Cl.
CPC ............ *G06T 7/80* (2017.01); *B25J 9/1692* (2013.01); *B25J 9/1697* (2013.01);
(Continued)

(58) Field of Classification Search
CPC ............... B25J 9/1692; B25J 9/1697; G05B 2219/37015; G05B 2219/39008;
(Continued)

(56) References Cited

U.S. PATENT DOCUMENTS

| 10,052,766 B2 | 8/2018 | Shirakyan et al. |
| 10,350,755 B2 | 7/2019 | Wagner et al. |
(Continued)

FOREIGN PATENT DOCUMENTS

| CN | 101100061 A | 1/2008 |
| CN | 103209809 A | 7/2013 |
(Continued)

OTHER PUBLICATIONS

Office Action issued Jun. 23, 2023 in Japanese Appl. No. 2020-060752 (with English translation), 5 pages.
(Continued)

*Primary Examiner* — Spencer D Patton
(74) *Attorney, Agent, or Firm* — MEDLER FERRO WOODHOUSE & MILLS PLLC

(57) ABSTRACT

A robot control system and a method for automatic camera calibration is presented. The robot control system includes a control circuit configured to determine all corner locations of an imaginary cube that fits within a camera field of view, and determine a plurality of locations that are distributed on or throughout the imaginary cube. The control circuit is further configured to control a robot arm to move a calibration pattern to the plurality of locations, and to receive a plurality of calibration images corresponding to the plurality of locations, and to determine respective estimates of intrin-
(Continued)

sic camera parameters based on the plurality of calibration images, and to determine an estimate of a transformation function that describes a relationship between a camera coordinate system and a world coordinate system. The control circuit is further configured to control placement of the robot arm based on the estimate of the transformation function.

21 Claims, 23 Drawing Sheets

Related U.S. Application Data continuation of application No. 16/456,074, filed on Jun. 28, 2019, now Pat. No. 10,628,966, and a continuation of application No. 16/362,471, filed on Mar. 22, 2019, now Pat. No. 10,373,336, and a continuation of application No. 16/295,940, filed on Mar. 7, 2019, now Pat. No. 10,369,698.

(51) Int. Cl.

| | | |
|---|---|---|
| *G06T 5/80* | (2024.01) | |
| *G06T 7/50* | (2017.01) | |
| *G06T 7/60* | (2017.01) | |
| *G06T 7/73* | (2017.01) | |
| *G06T 7/80* | (2017.01) | |

(52) U.S. Cl.
CPC .............. *G06T 1/0014* (2013.01); *G06T 5/80* (2024.01); *G06T 7/50* (2017.01); *G06T 7/60* (2013.01); *G06T 7/73* (2017.01); *G05B 2219/37015* (2013.01); *G05B 2219/39008* (2013.01); *G05B 2219/39016* (2013.01); *G05B 2219/45083* (2013.01); *G06T 2207/30208* (2013.01)

(58) Field of Classification Search
CPC . G05B 2219/39016; G06T 5/006; G06T 7/50; G06T 7/60; G06T 7/70–80; G06T 2207/30208; G06T 2207/30204; G06T 1/0014; G06T 5/80
See application file for complete search history.

(56) References Cited

U.S. PATENT DOCUMENTS

| | | | |
|---|---|---|---|
| 10,373,336 B1 | 8/2019 | Islam et al. | |
| 2007/0024712 A1* | 2/2007 | Morita | H04N 17/002 |
| | | | 348/E17.002 |
| 2013/0336583 A1 | 12/2013 | Ernst et al. | |
| 2015/0025683 A1 | 1/2015 | Amano | |
| 2016/0039094 A1 | 2/2016 | Lundberg | |
| 2016/0184995 A1 | 6/2016 | Uchiyama | |
| 2018/0186004 A1 | 7/2018 | Park et al. | |
| 2018/0194008 A1 | 7/2018 | Namiki et al. | |
| 2020/0226789 A1* | 7/2020 | Ma | G06T 7/70 |

FOREIGN PATENT DOCUMENTS

| | | |
|---|---|---|
| CN | 103596501 A | 2/2014 |
| CN | 108297095 A | 7/2018 |
| CN | 110103219 A | 8/2019 |
| DE | 101-64-944 B4 | 3/2013 |
| DE | 11-2011-101-730 B4 | 3/2016 |
| DE | 10-2017-217-142 A1 | 3/2018 |
| DE | 10-2018-200-154 A1 | 7/2018 |
| JP | 04-035885 A | 2/1992 |
| JP | 2005201824 A | 7/2005 |
| JP | 2010-172986 A | 8/2010 |
| JP | 2013-526423 A | 6/2013 |
| JP | 2016-097474 A | 11/2014 |
| JP | 2015-174191 A | 10/2015 |
| JP | 2015-182144 A | 10/2015 |
| JP | 2015530276 A | 10/2015 |
| JP | 2018-111166 A | 7/2017 |
| JP | 6163942 B2 | 7/2017 |
| JP | 2019014031 A | 1/2019 |
| KR | 10-2018-0080630 A | 7/2018 |

OTHER PUBLICATIONS

Calvet et al., "Detection and Accurate Localization of Circular Fiducials under Highly Challenging Conditions," Conference Paper (2016), pp. 562-570.
Datta et al., "Accurate Camera Calibration using Iterative Refinement of Control Points, " Workshop on Visual Surveillance (VS) (2009).
Devernay et al., "Straight lines have to be straight: automatic calibration and removal of distortion from scenes of structured environments," Machine Vision and Applications, Springer Verlag (2001), 13(1), pp. 14-24.
Diankov, Rosen, "Automated Construction of Robotic Manipulation Programs," The Robotics Institute Carnegie Mellon University, Pittsburg, PA (2010), pp. 1-263.
Fornaciari et al., "Very Fast Detection for Embedded Vision Applications," Conference Paper (2012).
Ricolfe-Viala et al., "Camera calibration under optimal conditions," Optics Express (2011), 19(11).
Shu, Fangwu, "High Precision Calibration Approaches to Robot Vision Systems," Department of Informatics Unviersity of Hamburg (2009), pp. 1-161.
Tang et al., "Hihg-precision camera distortion measurements with a calibration harp," Journal of the Optical Society of America. A Optics, Image Science, and Vision, Optical Society of America (2012), 29(10), pp. 2134-2143.
Zhang, Zhengyou, "A Flexible New Technique for Camera Calibration," Technical Report MSR-TR-98-71 (1998) pp. 1-22.
Tang et al.,High-precision camera distortion measurements with a calibration harp, Journal of the Optical Society of America, 2012, pp. 1-23.
Burger et al., "Zhang's Camera Calibration Algorithm: In-Depth Tutorial and Implementation", Technical Report, Department of Digital Media (May 16, 2016), pp. 1-23.
Office Action dated Nov. 14, 2019 in JP Appl. No. 2019-106616.
Non-Final Office Action in U.S. Appl. No. 16/505,466 dated Sep. 24, 2019.
Non-Final Office Action in U.S. Appl. No. 16/456,074 dated Sep. 18, 2019.
International Search Report issued in corresponding International Application No. PCT/US2019/042047 dated Dec. 5, 2019.
Written Opinion issued in corresponding International Application No. PCT/US2019/042047 dated Dec. 5, 2019.
Chinese Office Action issued in corresponding Chinese Application No. 201911372095.9 dated Jun. 28, 2020.
German Office Action issued in corresponding German Application No. DE 10 2020 105 655.9 dated Sep. 8, 2020.

* cited by examiner

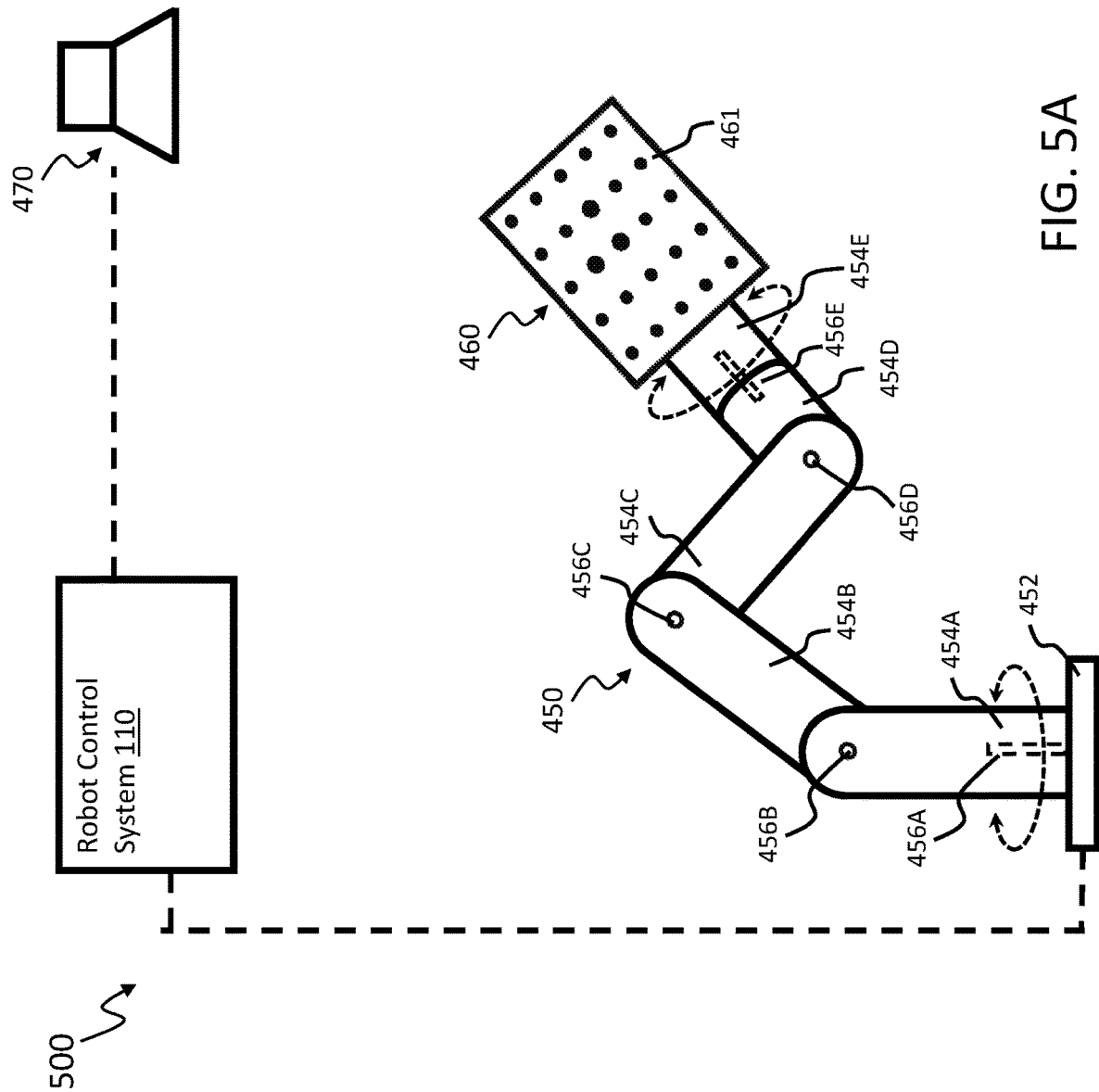

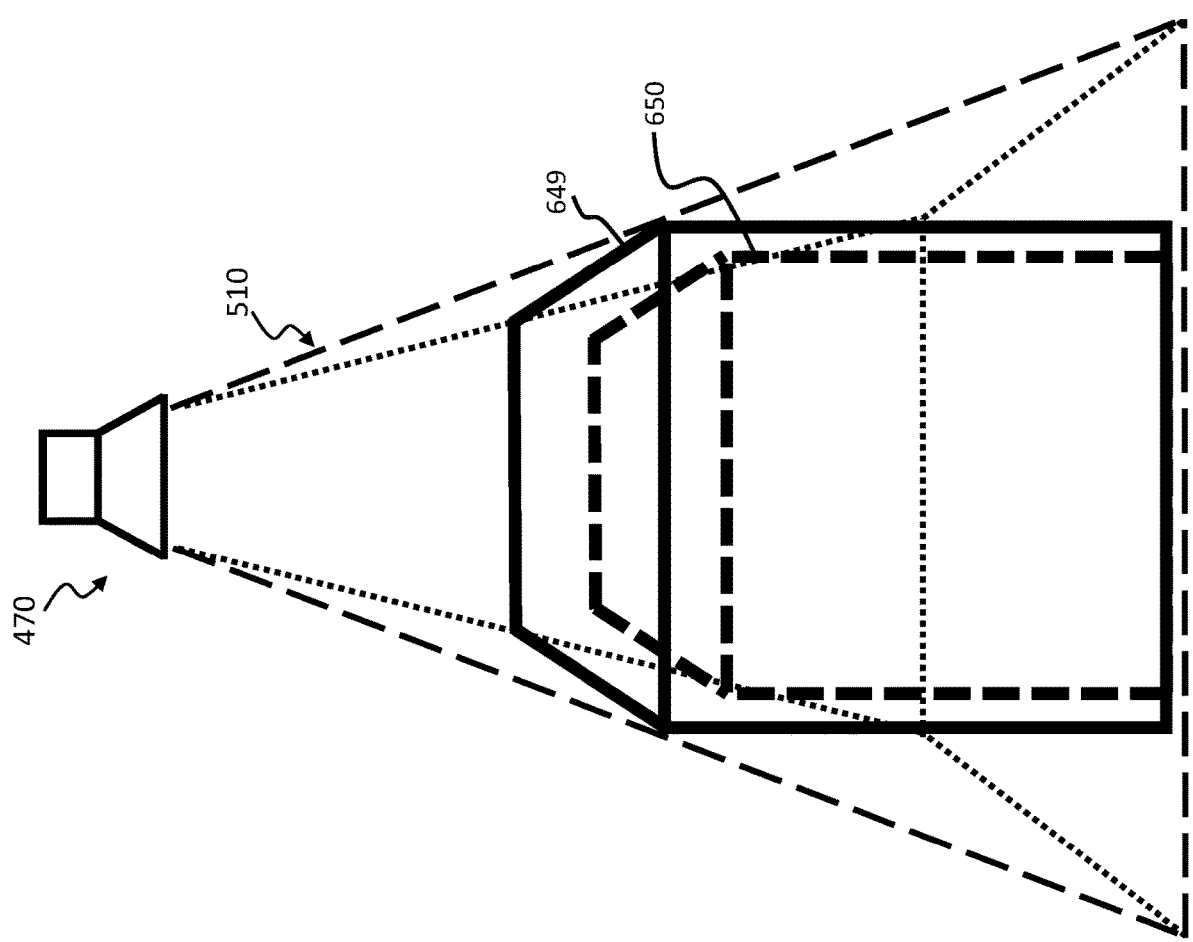

METHOD AND SYSTEM FOR PERFORMING AUTOMATIC CAMERA CALIBRATION FOR ROBOT CONTROL

CROSS-REFERENCE TO RELATED APPLICATION(S)

This application is a national stage entry under 35 U.S.C. 371 of PCT Appl. No. PCT/US2019/042047, which claims priority to the following applications: U.S. patent application Ser. No. 16/295,940, entitled "METHOD AND SYSTEM FOR PERFORMING AUTOMATIC CAMERA CALIBRATION FOR ROBOT CONTROL" and filed on Mar. 7, 2019; U.S. patent application Ser. No. 16/362,471, entitled "METHOD AND SYSTEM FOR PERFORMING AUTOMATIC CAMERA CALIBRATION FOR ROBOT CONTROL" and filed on Mar. 22, 2019; U.S. patent application Ser. No. 16/456,074, entitled "METHOD AND SYSTEM FOR PERFORMING AUTOMATIC CAMERA CALIBRATION FOR ROBOT CONTROL" and filed on Jun. 28, 2019; and U.S. patent application Ser. No. 16/505,466, entitled "METHOD AND SYSTEM FOR PERFORMING AUTOMATIC CAMERA CALIBRATION FOR ROBOT CONTROL" and filed on Jul. 8, 2019.

FIELD OF THE INVENTION

The present invention is directed to a method and system for performing automatic camera calibration for robot control.

BACKGROUND

As automation becomes more common, robots are being used in more environments, such as in warehousing and manufacturing environments. For instance, robots may be used to load items onto or off of a pallet in a warehouse, or to pick up objects from a conveyor belt in a factory. The movement of the robot may be fixed, or may be based on an input, such as an image taken by a camera in the warehouse or factory. In the latter situation, calibration may be performed so as to determine a property of the camera, and to determine a relationship between the camera and an environment in which the robot is located. The calibration may be referred to as camera calibration, and may generate calibration information that is used to control the robot based on images captured by the camera. In some implementations, the camera calibration may involve manual operation by a person, who may manually control movement of the robot, or manually control the camera to capture an image of the robot.

SUMMARY

One aspect of the embodiments herein relates to performing automatic camera calibration for robot control. The automatic camera calibration may be performed by a robot control system comprising a communication interface and a control circuit. The communication interface may be configured to communicate with a robot and with a camera having a camera field of view, wherein the robot may have a base and a robot arm with a calibration pattern disposed thereon. The control circuit of the robot control system may be configured to perform camera calibration by: a) determining all corner locations of an imaginary cube that fits within the camera field of view, b) determining a plurality of locations that are distributed on or throughout the imaginary cube, c) controlling the robot arm to move the calibration pattern to the plurality of locations that are distributed on or throughout the imaginary cube by outputting movement commands to the robot via the communication interface, d) receiving a plurality of calibration images from the camera via the communication interface, wherein the plurality of calibration images are captured by the camera, and are respective images of the calibration pattern at the plurality of locations, e) determining respective estimates of intrinsic camera parameters based on the plurality of calibration images, and f) determining, based on the respective estimates of the intrinsic camera parameters: an estimate of a transformation function that describes a relationship between a camera coordinate system and a world coordinate system, wherein the camera coordinate system is a coordinate system defined with respect to a location and orientation of the camera, and the world coordinate system is a coordinate system defined with respect to a location that is stationary relative to the base of the robot. The control circuit may further be configured, after the camera calibration is performed, to receive a subsequent image from the camera via the communication interface, and to control placement of the robot arm by outputting to the robot, via the communication interface, a subsequent movement command that is based on the subsequent image and based on the estimate of the transformation function. In an embodiment, the robot control system may have a non-transitory computer-readable medium storing instructions thereon that, when executed by the control circuit, causes the control circuit to perform the above steps.

One aspect of the embodiments also relates to performing automatic camera calibration for robot control. The automatic camera calibration may be performed by a robot control system comprising a communication interface and a control circuit. The communication interface may be configured to communicate with: a robot having a base and a robot arm with a calibration pattern disposed thereon, and a camera having a camera field of view. The calibration pattern may include a plurality of pattern elements having respective defined pattern element locations in a pattern coordinate system, wherein the pattern coordinate system is a coordinate system defined with respect to a location and orientation of the calibration pattern. The control circuit may be configured to perform camera calibration by: a) controlling the robot arm to move the calibration pattern to at least one location within the camera field of view by outputting a movement command to the robot via the communication interface, b) receiving a calibration image from the camera via the communication interface, wherein the calibration image is captured by the camera and is an image of the calibration pattern at the at least one location, c) determining a plurality of image pattern element locations that indicate respective locations at which the plurality of pattern elements appear in the calibration image, d) determining a first estimate of a first intrinsic camera parameter based on the plurality of image pattern element locations and based on the defined pattern element locations, e) after the first estimate of the first intrinsic camera parameter has been determined, determining a first estimate of a second intrinsic camera parameter based on the first estimate of the first intrinsic camera parameter and based on the plurality of image pattern element locations, f) determining a second estimate of the first intrinsic camera parameter and a second estimate of the second intrinsic camera parameter based on the first estimate of the second intrinsic camera parameter, and based on the plurality of image pattern element locations and the defined pattern element locations, and g) determining, based on the second estimate of the first intrinsic camera parameter and the second estimate of the second intrinsic camera parameter, an estimate of a transformation function that describes a relationship between a camera coordinate system and a world coordinate system, wherein the camera coordinate system is a coordinate system defined with respect to a location and orientation of the camera, and the world coordinate system is a coordinate system defined with respect to a location that is stationary relative to the base of the robot. The control circuit may further be configured, after the camera calibration is performed, to receive a subsequent image from the camera, and to control placement of the robot arm by outputting to the robot a subsequent movement command that is based on the subsequent image and based on the estimate of the transformation function.

BRIEF DESCRIPTION OF THE DRAWINGS

The foregoing and other features, objects and advantages of the invention will be apparent from the following description of embodiments hereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

FIGS. 5A and 5B illustrate an example system in which a robot arm places a calibration pattern at various locations within a camera's field of view, according to an embodiment herein.

FIG. 7 illustrates imaginary cubes that fit within a camera's field of view, according to an embodiment herein.

DETAILED DESCRIPTION

Figure 1A:
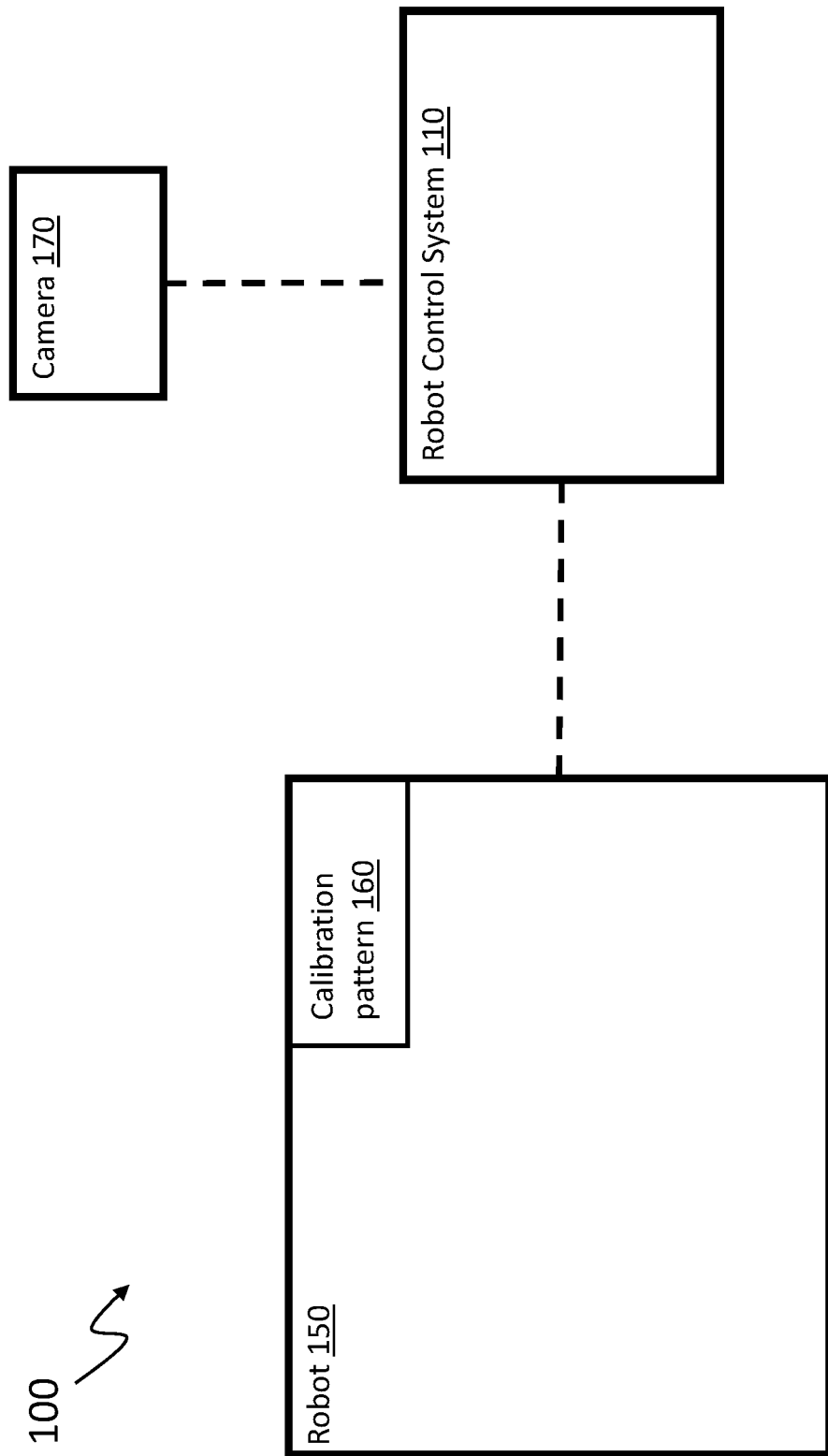
FIGS. 1A and 1B depict block diagrams of systems in which camera calibration is performed, according to embodiments herein.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Embodiments described herein relate to performing calibration of a camera used to control a robot, such as a robot used in a warehouse, a manufacturing plant, or in some other environment. The calibration may be referred to as camera calibration, and may be performed by, e.g., a robot control system (also referred to as a robot controller) to generate calibration information that facilitates an ability of the robot control system to control the robot based on images captured by the camera. For instance, the robot may be used to pick up a package in a warehouse, wherein placement of an arm or other component of the robot may be based on images of the package captured by the camera. In that instance, the calibration information may be used along with the images of the package to determine, for example, a location and orientation of the package relative to the arm of the robot. As described in more detail below, the camera calibration may involve determining respective estimates of intrinsic camera parameters of a camera and determining an estimate of a relationship between the camera and its external environment. An intrinsic camera parameter may refer to an intrinsic parameter of a camera, and may also be referred to as an internal parameter of a camera, and may have a value that is, e.g., a matrix, a vector, or a scalar value. As discussed in more detail below, examples of an intrinsic camera parameter include a projection matrix and a distortion parameter, wherein an estimate of the intrinsic camera parameter may also be referred to as an estimated value. The relationship between the camera and its external environment may in some cases be expressed as a transformation function, and an estimate of this transformation function may also be referred to as an estimated function. In some instances, the transformation function may be a linear transformation represented by a matrix. In some cases, the camera calibration may be performed with the aid of a calibration pattern, which may have pattern elements disposed at defined locations. The camera may capture an image of the pattern elements of the calibration pattern, and the camera calibration may be performed based on comparing an image of the pattern elements with the defined locations of the pattern elements.

One aspect of the embodiments herein relates to improving an accuracy of the camera calibration by determining an estimate of a first intrinsic camera parameter (e.g., projection matrix) in a separate stage than that used to determine an estimate of a second intrinsic camera parameter (e.g., distortion parameter). More specifically, the first intrinsic camera parameter may be estimated in a first stage, and the resulting estimate may be used as an input to a second stage in which an estimate of the second intrinsic camera parameter is determined. Under this approach, the estimate of the first intrinsic camera parameter may be considered to be known during the second stage, so that the second stage can be specialized toward determining the estimate of the second intrinsic camera parameter. Further, because the estimate of the first intrinsic camera parameter is considered to be known, the second stage does not need to determine respective estimates for all intrinsic camera parameters of a camera, but may focus on determining only the estimate of the second intrinsic camera parameter. As a result, the second stage may yield a more accurate estimate of the second intrinsic camera parameter that is more robust against calibration error, relative to an implementation in which respective estimates for all intrinsic camera parameters are simultaneously estimated in a single stage and are then used as an output of intrinsic calibration.

For instance, a single stage may simultaneously determine respective estimates for all intrinsic camera parameters of a camera by, for instance, generating and solving a set of simultaneous equations that involve the intrinsic camera parameters, and that describe a relationship between an image of the pattern elements and defined locations of the pattern elements of the calibration pattern. In some cases, the simultaneous equations may describe a relationship between locations in the captured images (which may also be referred to as calibration images) at which the pattern elements appear and the defined locations of the pattern elements. The captured calibration images from the camera, however, may include image noise, which may reduce an accuracy of the simultaneous equations. As a result, the respective estimates of the intrinsic camera parameters that are derived from the simultaneous equations may also suffer in accuracy. Further, a respective estimate for each intrinsic camera parameter of the simultaneous equations may sacrifice some accuracy so as to allow the simultaneous equations to be satisfied. Accordingly, this single stage may produce calibration error in its estimates of the intrinsic camera parameters, which may in turn affect an ability to accurately position the arm of the robot based on images captured by the camera.

In an embodiment, the calibration error may be reduced by using multiple stages to determine respective estimates for all the intrinsic camera parameters of the camera. As stated above, a first stage may be used to determine a first estimate of a first intrinsic camera parameter, and a second stage may be used to determine a first estimate of a second intrinsic camera parameter. In some instances, the first stage may also generate another estimate for the second intrinsic camera parameter, but the second stage may ignore this estimate from the first stage, and instead generate its own estimate for the second intrinsic camera parameter. In some cases, rather than be a general-purpose stage that determines respective estimates for all intrinsic camera parameters, the second stage may be a special-purpose stage that is dedicated to determining an estimate for only the second intrinsic camera parameter. As a result, the second stage may generate a more accurate estimate for the second intrinsic camera parameter.

In an embodiment, the multiple stages may be used in a pipelined manner, in which a result of the first stage is used as an input to the second stage, as mentioned above. More specifically, the second stage may generate an estimate for the second intrinsic camera parameter based on an estimate of the first intrinsic camera parameter from the first stage. In some cases, the estimate of the second intrinsic camera parameter from the second stage may in turn be used to refine the estimate of the first intrinsic camera parameter, which may be treated as a third stage. In some instances, the third stage may also refine the estimate of the second intrinsic camera parameter. For example, the estimate of the second intrinsic camera parameter from the second stage may be used by the third stage as an informed initial guess regarding the second intrinsic camera parameter. This initial guess may have a high level of accuracy, and thus may help the third stage further improve the estimates of the first intrinsic camera parameter and of the second intrinsic camera parameter.

In an embodiment, the respective estimates of the intrinsic camera parameters may be further refined in a fourth stage that evaluates an accuracy of the estimates by using them to determine simulated locations of respective pattern elements. In some cases, the fourth stage may follow the third stage. In other cases, the fourth stage may be performed immediately after the second stage, and the third stage discussed above may be skipped. As discussed in more detail below, a simulated location for a pattern element may be a predicted location in a calibration image at which the pattern element is predicted to appear based on the estimates of the intrinsic camera parameters. The fourth stage may compare the simulated locations of the respective pattern elements with actual locations at which the pattern elements appear in the captured calibration images. This stage may adjust the estimates of the intrinsic camera parameters so as to reduce a difference between the simulated locations and the actual locations at which the pattern elements appear.

In an embodiment, the determination of simulated locations may be performed as part of an intrinsic calibration phase of camera calibration. As discussed in more detail below, the camera calibration may further include a hand-eye calibration phase. In an embodiment, the hand-eye calibration phase may also include a stage in which estimates of various functions are adjusted based on simulated locations of respective pattern elements.

One aspect of the embodiments herein relate to planning various poses for the calibration pattern, wherein the calibration pattern is photographed by the camera at such poses. A robot control system may determine the poses, and control the robot arm to move the calibration pattern to those poses. Each pose may refer to a location and/or an orientation of the calibration pattern relative to the camera. In an embodiment, the pose planning may involve determining a plurality of locations within the camera's field of view to which the calibration pattern is moved by the robot.

In some instances, the plurality of locations may be distributed on or throughout an imaginary cube that fits (e.g., completely fits) within the camera's field of view (also referred to as a camera field of view). The use of the imaginary cube may allow the camera to capture the calibration pattern at a set of diverse locations, which may cause the camera calibration to account for a greater set of situations, and thus render the camera calibration more robust. For instance, the diverse locations may include corner locations of the imaginary cube as well as a center location of the imaginary cube. The corner locations may be nearer a periphery of the camera's field of view. The center location may be directly in front of the camera, and more specifically may be located along a central axis of the camera's field of view. In some instances, the camera may introduce a meaningful amount of lens distortion when photographing objects located near a periphery of the camera's field of view, and may introduce little to no lens distortion when photographing objects that are near the central axis of the camera's field of view. The use of the imaginary cube to place the calibration pattern may cause the calibration pattern to be photographed near the periphery of the camera's field of view and to be photographed near the central axis of the camera's field of view. As a result, the camera may capture a diverse set of calibration images that may exhibit different degrees of lens distortion. The diverse set of calibration images may thus allow the camera calibration to better estimate a property of the lens distortion of the camera.

In an embodiment, the orientation of the calibration pattern may also be varied across a set of calibration images used for the camera calibration. For instance, the robot control system may determine, for each location of the plurality of locations, an angle at which the robot arm tilts the calibration pattern relative to the camera. In an embodiment, the plurality of locations to which the robot arm moves the calibration pattern may be uniformly distributed on or throughout the imaginary cube, or randomly distributed throughout the imaginary cube. In an embodiment, the imaginary cube may have to be a cube for which all corner locations can be reached by the calibration pattern via the robot arm. Further, the corner locations may have to be situated so that the robot arm can tilt the calibration pattern to be within a defined range of angles relative to the camera for some or all corner locations. In some cases, if a particular imaginary cube does not satisfy the above conditions, the robot control system may try to satisfy the above conditions with a smaller imaginary cube.

FIG. 1A illustrates a block diagram of a robot operation system 100 for performing automatic camera calibration. The robot operation system 100 includes a robot 150, a robot control system 110 (also referred to as a robot controller), and a camera 170. In an embodiment, the robot operation system 100 may be located within a warehouse, a manufacturing plant, or other premises. The robot control system 110 may be configured to perform camera calibration, which is discussed in more detail below, to determine calibration information that is later used to control the robot 150. In some cases, the robot control system 110 is configured both to perform the camera calibration and to control the robot 150 based on the calibration information. In some cases, the robot control system 110 may be dedicated to performing the camera calibration, and may communicate the calibration information to another robot control system (also referred to as another robot controller) that then controls the robot 150 based on the calibration information. The robot 150 may be positioned based on images captured by the camera 170 and on the calibration information.

In an embodiment, the robot control system 110 may be configured to communicate via a wired or wireless communication with the robot 150 and the camera 170. For instance, the robot control system 110 may be configured to communicate with the robot 150 and/or the camera 170 via a RS-232 interface, a universal serial bus (USB) interface, an Ethernet interface, a Bluetooth® interface, an IEEE 802.11 interface, or any combination thereof. In an embodiment, the robot control system 110 may be configured to communicate with the robot 150 and/or the camera 170 via a local computer bus, such as a peripheral component interconnect (PCI) bus.

In an embodiment, the robot control system 110 may be separate from the robot 150, and may communicate with the robot 150 via the wireless or wired connection discussed above. For instance, the robot control system 110 may be a standalone computer that is configured to communicate with the robot 150 and the camera 170 via a wired connection or wireless connection. In an embodiment, the robot control system 110 may be an integral component of the robot 150, and may communicate with other components of the robot 150 via the local computer bus discussed above. In some cases, the robot control system 110 may be a dedicated control system (also referred to as a dedicated controller) that controls only the robot 150. In other cases, the robot control system 110 may be configured to control multiple robots, including the robot 150. In an embodiment, the robot control system 110, the robot 150, and the camera 170 are located at the same premises (e.g., warehouse). In an embodiment, the robot control system 110 may be remote from the robot 150 and the camera 170, and may be configured to communicate with the robot 150 and the camera 170 via a network connection (e.g., local area network (LAN) connection).

In an embodiment, the robot control system 110 may be configured to retrieve or otherwise receive images of a calibration pattern 160 (also referred to as calibration images) disposed on the robot 150. In some instances, the robot control system 110 may be configured to control the camera 170 to capture such images. For example, the robot control system 110 may be configured to generate a camera command that causes the camera 170 to capture an image of a scene in a field of view of the camera 170 (also referred to as a camera field of view), and to communicate the camera command to the camera 170 via the wired or wireless connection. The same command may cause the camera 170 to also communicate the image (as image data) back to the robot control system 110, or more generally to a storage device accessible by the robot control system 110. Alternatively, the robot control system 110 may generate another camera command that causes the camera 170, upon receiving the camera command, to communicate an image(s) it has captured to the robot control system 110. In an embodiment, the camera 170 may automatically capture an image of a scene in its camera field of view, either periodically or in response to a defined triggering condition, without needing a camera command from the robot control system 110. In such an embodiment, the camera 170 may also be configured to automatically, without a camera command from the robot control system 110, communicate the image to the robot control system 110 or, more generally, to a storage device accessible by the robot control system 110.

In an embodiment, the robot control system 110 may be configured to control movement of the robot 150 via movement commands that are generated by the robot control system 110 and communicated over the wired or wireless connection to the robot 150. The movement commands may cause the robot to move a calibration pattern 160 disposed on the robot. The calibration pattern 160 may be permanently disposed on the robot 150, or may be a separate component that can be attached to and detached from the robot 150.

Figure 1B:
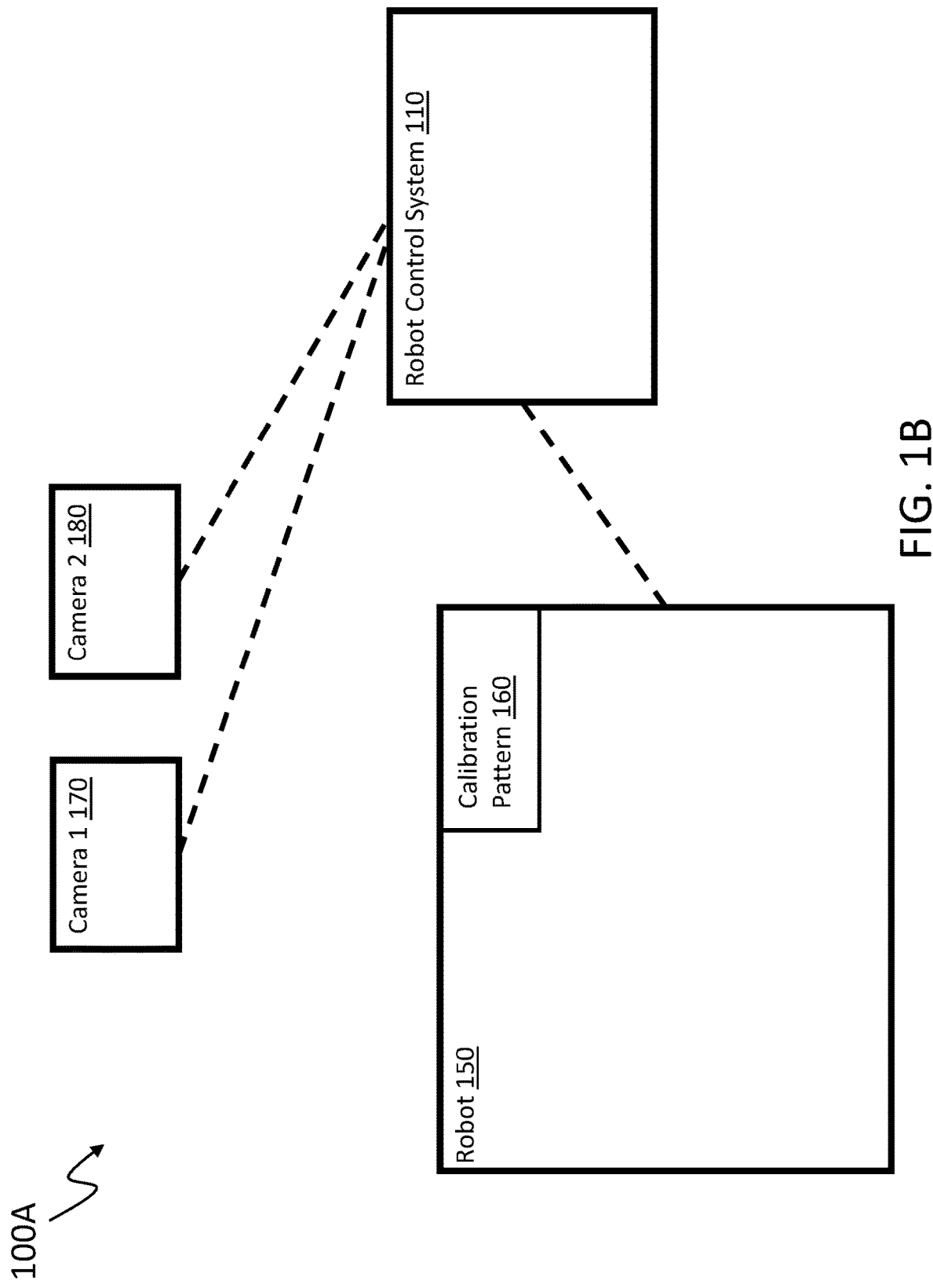

In an embodiment, the only images used to control the robot 150 are those captured by the camera 170. In another embodiment, the robot 150 may be controlled by images from multiple cameras. FIG. 1B illustrates a robot operation system 100A that is an embodiment of the robot operation system 100. The system 100A includes multiple cameras, such as camera 170 and camera 180. The robot control system 110 may be configured to receive images from both camera 170 and camera 180, and to control movement of the robot 150 based on the images from the two cameras 170, 180. In some instances, the presence of the two cameras 170, 180 may provide the robot control system 110 with stereoscopic vision. The robot control system 110 may be configured to perform camera calibration for both the camera 170 and the camera 180, as discussed in more detail below. In an embodiment, the robot control system 110 may control both cameras 170, 180 to capture respective images of the calibration pattern 160 in order to perform camera calibration. In an embodiment, the robot operation system 100A may have exactly two cameras, or may have more than two cameras.

Figure 1C:
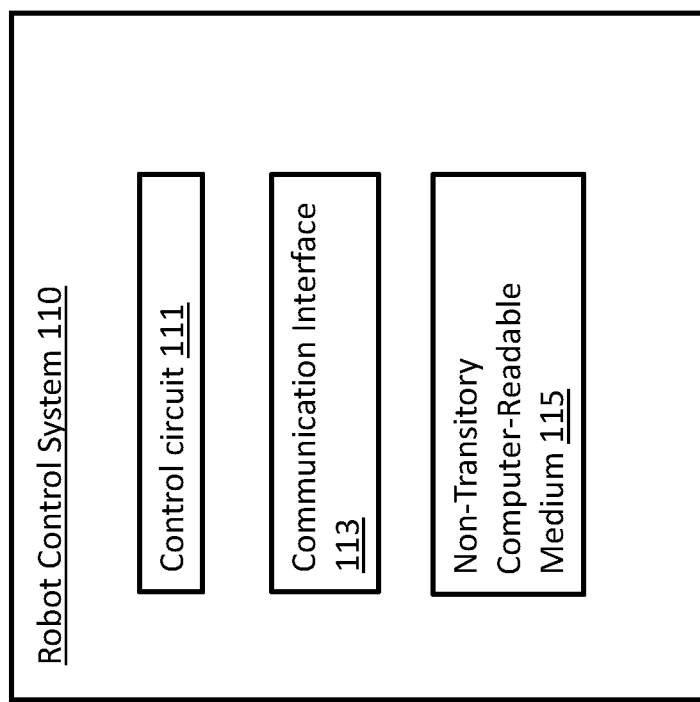
FIG. 1C depicts a block diagram of a robot control system configured to perform camera calibration, according to an embodiment herein.

FIG. 1C depicts a block diagram of the robot control system 110. As illustrated in the block diagram, the robot control system 110 can include a control circuit 111, a communication interface 113, and a non-transitory computer-readable medium 115 (e.g., memory). In an embodiment, the control circuit 111 may include one or more processors, a programmable logic circuit (PLC) or a programmable logic array (PLA), a field programmable gate array (FPGA), an application specific integrated circuit (ASIC), or any other control circuit.

In an embodiment, the communication interface 113 may include one or more components that are configured to communicate with the camera 170 and the robot 150. For instance, the communication interface 113 may include a communication circuit configured to perform communication over a wired or wireless protocol. As an example, the communication circuit may include a RS-232 port controller, a USB controller, an Ethernet controller, a Bluetooth® controller, a PCI bus controller, any other communication circuit, or a combination thereof.

Figure 9A:
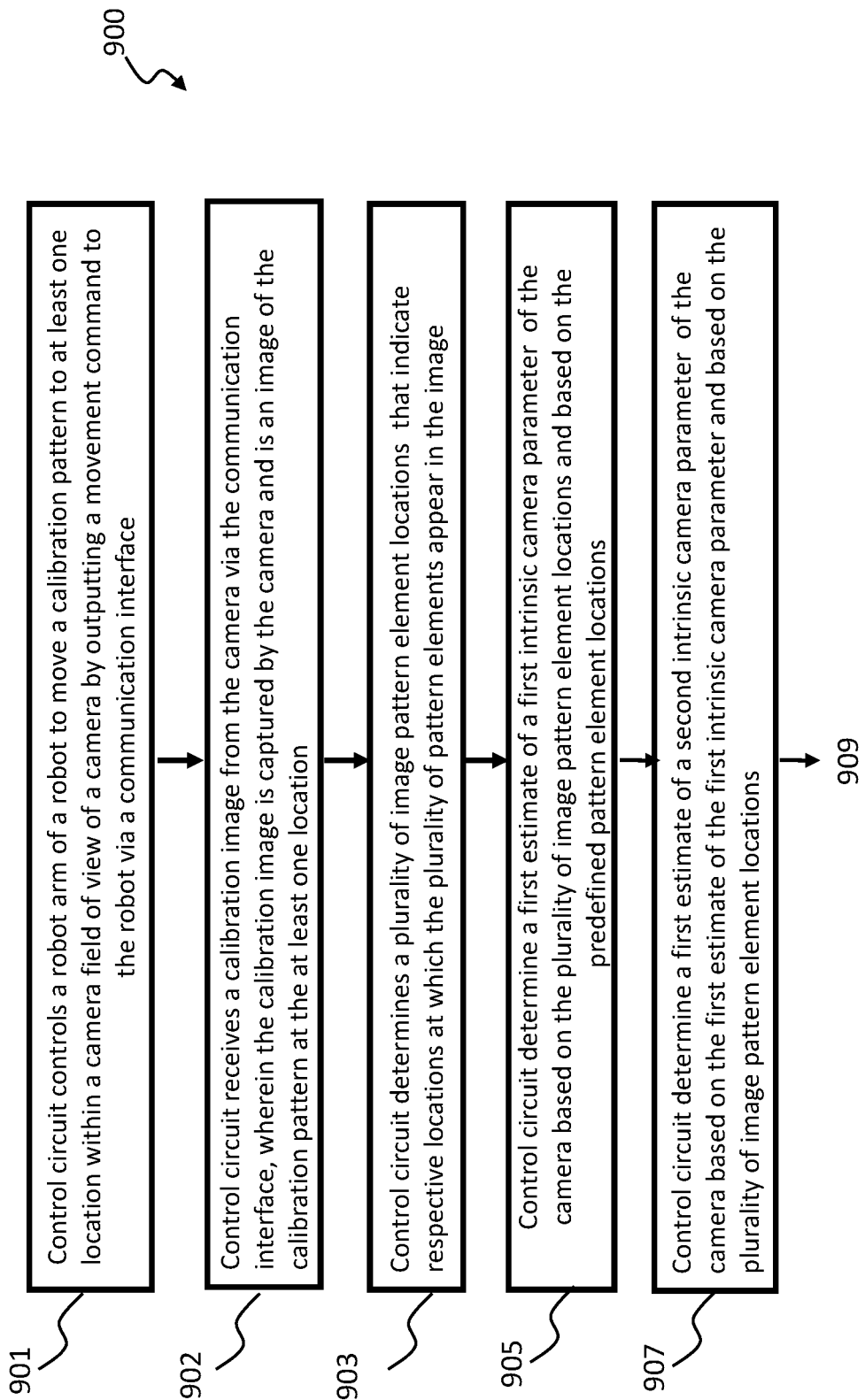
FIGS. 9A and 9B provide a flow diagram that illustrates a method for performing camera calibration, according to an embodiment herein.
Figure 9B:
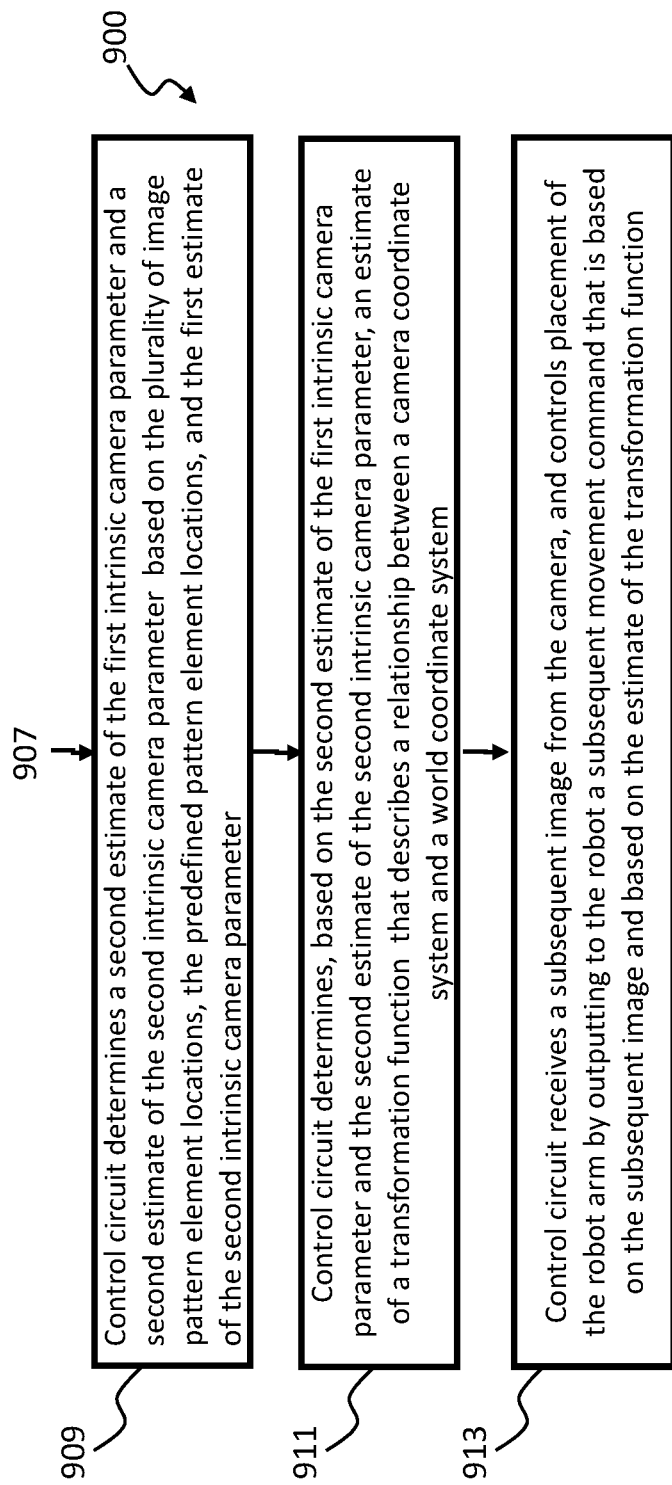

In an embodiment, the non-transitory computer-readable medium 115 may include computer memory. The computer memory may comprise, e.g., dynamic random access memory (DRAM), solid state integrated memory, and/or a hard disk drive (HDD). In some cases, the camera calibration may be implemented through computer-executable instructions (e.g., computer code) stored on the non-transitory computer-readable medium 115. In such cases, the control circuit 111 may include one or more processors configured to perform the computer-executable instructions to perform the camera calibration (e.g., the steps illustrated in FIGS. 4 and 9A and 9B).

Figure 2A:
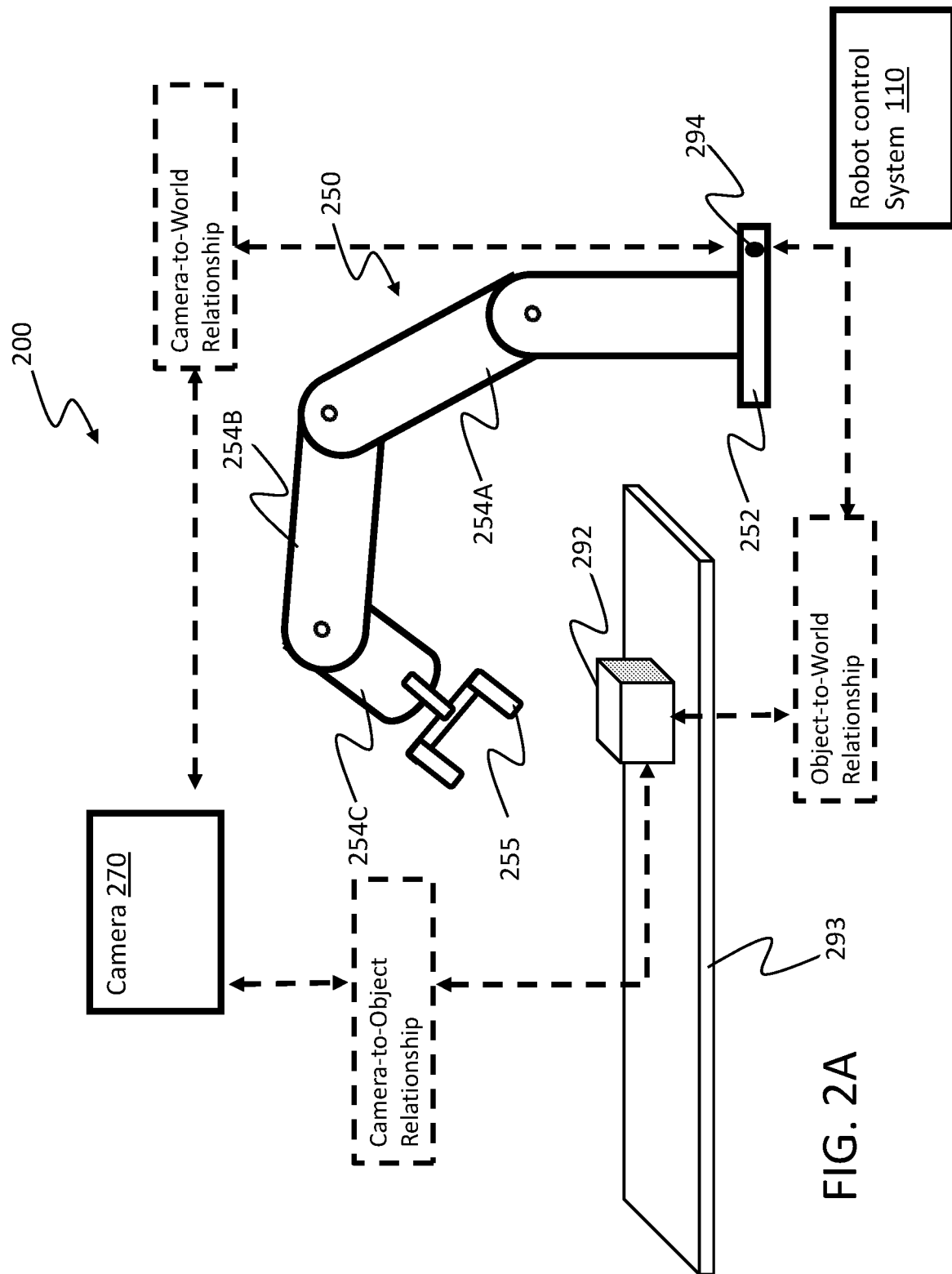
FIG. 2A depicts a system that illustrates a robot being controlled based on calibration information obtained from camera calibration, according to an embodiment herein.

As stated above, the camera calibration may be performed in order to facilitate the control of a robot based on images captured by a camera. For instance, FIG. 2A depicts a robot operation system 200 in which the images are used to control a robot 250 to pick up an object 292 in a warehouse. More specifically, the robot operation system 200 may be an embodiment of the system 100 of FIG. 1A, and includes a camera 270, the robot 250, and the robot control system 110 of FIG. 1A. The camera 270 may be an embodiment of the camera 170 of FIG. 1A, and the robot 250 may be an embodiment of the robot 150 of FIG. 1A. The camera 270 may be configured to capture an image of the object 292 (e.g., a package for shipping) disposed on a conveyor belt 293 in the warehouse, and the robot control system 110 may be configured to control the robot 250 to pick up the object 292.

In the embodiment of FIG. 2A, the robot 250 may have a base 252 and a robot arm that is movable relative to the base 252. More specifically, the robot arm may comprise a plurality of links 254A through 254C that are rotatable relative to each other, and a gripper 255 attached to the link 254C, wherein the gripper may be used to pick up objects. In an embodiment, the robot control system 110 may be configured to communicate a movement command to rotate one or more of the links 254A through 254C. The movement command may be a low-level command, such as motor movement commands, or a high-level command. If the movement command from the robot control system 110 is a high-level command, the robot 150 may be configured to convert the high-level command to a low-level command.

In an embodiment, one of the objectives of camera calibration is to determine a relationship between the camera 270 and the robot 250, or more specifically a relationship between the camera 270 and a reference point 294 that is stationary relative to the base 252 of the robot 250. In other words, the calibration information may include information describing a relationship between the camera 270 and the reference point 294. In an embodiment, this relationship may refer to a location of the camera 270 relative to the reference point 294, as well as an orientation of the camera 270 relative to a reference orientation for the robot 250. In an embodiment, the reference orientation may be used to define a world coordinate system, as discussed below in more detail, and the above relationship may be referred to as a camera-to-world relationship. In some cases, the camera-to-world relationship may be used to determine a relationship between the camera 270 and the object 292 (also referred to as a camera-to-object relationship), and a relationship between the object 292 and the reference point 294 (also referred to as an object-to-world relationship). The camera-to-object relationship and the object-to-world relationship may be used to control the robot 250 to pick up the object 292. For instance, the robot control system 110 may be configured to determine a location and orientation of the gripper 255 or the link 254C (e.g., a link-to-object relationship) relative to the object 292 based on the camera-to-object relationship, the object-to-world relationship, the camera-to-world relationship, or a combination thereof.

Figure 2B:
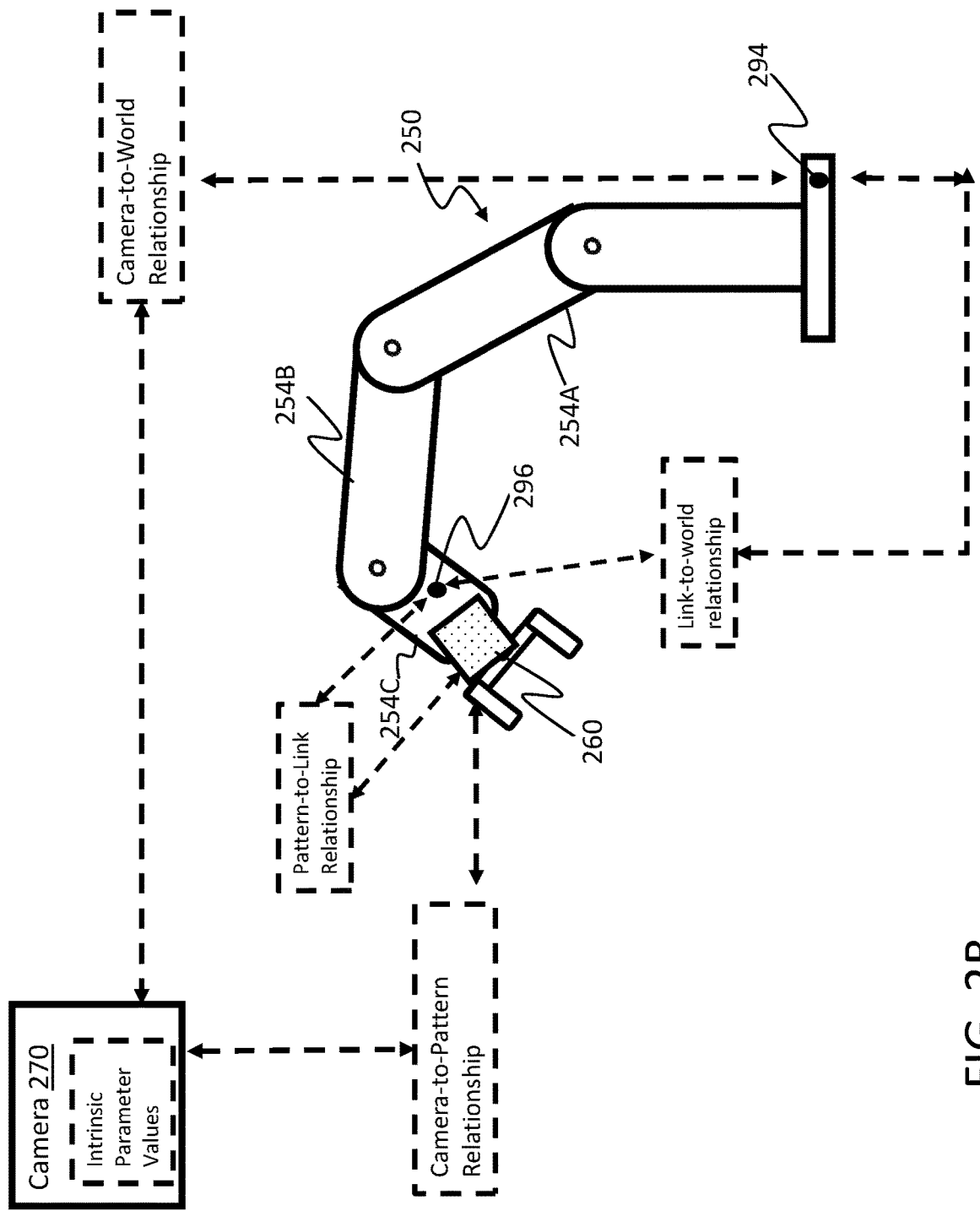
FIG. 2B depicts an example of calibration information that is obtained by an intrinsic calibration phase and a hand-eye calibration phase of the camera calibration, according to an embodiment herein.

In an embodiment, the camera calibration includes an intrinsic calibration phase and a hand-eye calibration phase. FIG. 2B depicts an example of information that is determined from the intrinsic calibration phase and the hand-eye calibration phase, and further illustrates a calibration pattern 260 that is used to perform the camera calibration. In an embodiment, the calibration pattern 260 may be directly and fixedly attached to the link 254C, such that the calibration pattern 260 remains stationary relative to the link 254C. The intrinsic calibration phase may involve automatically determining respective estimates for intrinsic camera parameters of the camera 270. In an embodiment, an intrinsic camera parameter of the camera 270 may be any parameter whose value is independent of a location and an orientation of the camera 270. As discussed in more detail below, the intrinsic camera parameters may characterize a property of the camera 270, such as its focal length, a size of its image sensor, or an effect of lens distortion introduced by the camera 270. In an embodiment, the hand-eye calibration phase may involve automatically determining the camera-to-world relationship and a relationship between the calibration pattern 260 and the link 254C (also referred to as a pattern-to-link relationship), or more specifically a relationship between the calibration pattern 260 and a reference point 296 on the link 254C. In an embodiment, the camera-to-world relationship and the pattern-to-link relationship may be determined based on a relationship between the camera 270 and the pattern 260 (also referred to as a camera-to-pattern relationship), and on a relationship between the link 254C and the reference point 294 (also referred to as the link-to-world relationship). In some cases, the camera-to-pattern relationship may be determined based on results of the intrinsic calibration, while the link-to-world relationship may be determined based on movement commands that the robot control system 110 has communicated to the robot 250. In an embodiment, the camera calibration may include a stereo calibration phase for systems that include multiple cameras. The stereo calibration phase may involve determining a relationship among the multiple cameras, such as a location and orientation of one camera relative to a location and orientation of another camera.

Figure 3A:
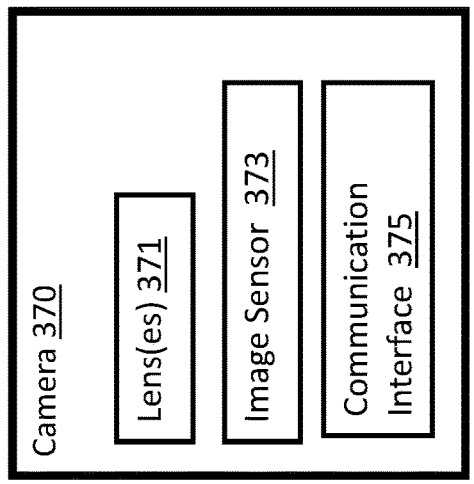
FIG. 3A depicts a model of a camera involved in camera calibration, according to an embodiment herein.

In an embodiment, the intrinsic camera parameters of a camera may describe how an object external to the camera is projected as an image onto its image sensor, and how a lens distorts an appearance of the object in the image. For instance, FIG. 3A depicts a block diagram of a camera 370, which is an embodiment of the camera 170 of FIG. 1A and the camera 270 of FIG. 2A, that includes one or more lenses 371, an image sensor 373, and a communication interface 375. The communication interface 375 may be configured to communicate with the robot control system 110 of FIG. 1A, and may be similar to the communication interface 113 of FIG. 1A of the robot control system 110. In an embodiment, the one or more lenses 371 may focus light that is coming from outside the camera 370 onto the image sensor 373. In an embodiment, the image sensor 373 may include an array of pixels configured to represent an image via respective pixel intensity values. The image sensor 373 may include a charge-coupled device (CCD) sensor, a complementary metal oxide semiconductor (CMOS) sensor, a quanta image sensor (QIS), or any other image sensor.

Figure 3B:
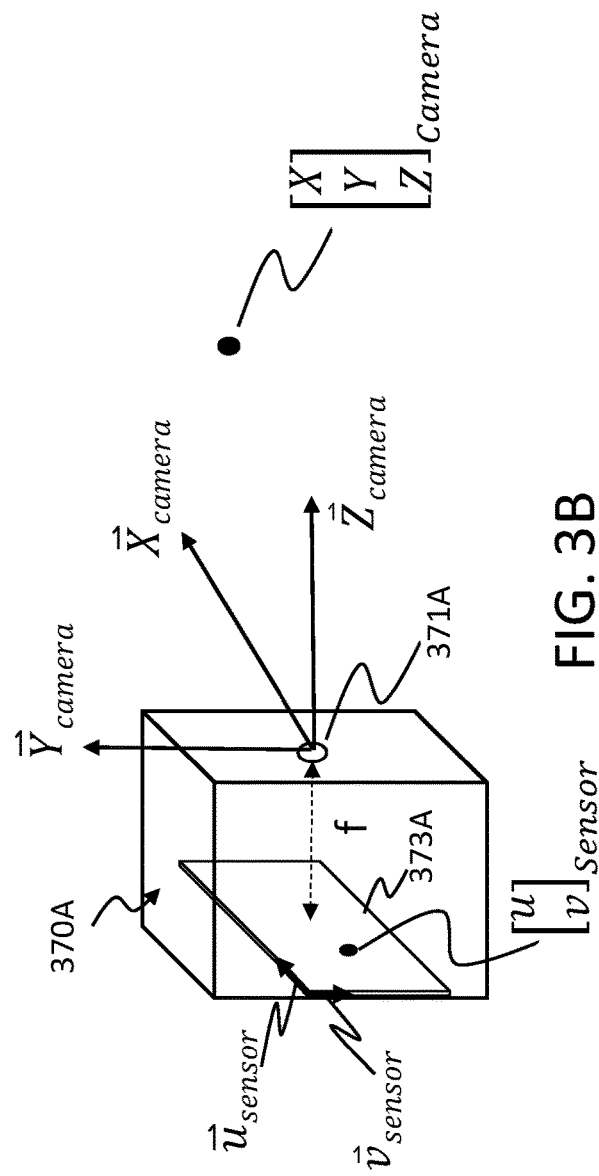
FIGS. 3B and 3C depict coordinate systems involved in performing camera calibration, according to an embodiment herein.

As stated above, the intrinsic camera parameters may describe how an object within a field of view of the camera 370 (also referred to as its camera field of view) projects as an image onto an image sensor, or more specifically how various locations at which the object is disposed project onto a pixel array of the image sensor. For instance, FIG. 3B illustrates a location $[X\ Y\ Z]_{Camera}^T$ external to a camera 370A, wherein the superscript of T refers to a transpose, and the subscript of Camera refers to the X, Y, and Z coordinates as being expressed in a camera coordinate system. More specifically, the camera 370A may be an embodiment of the camera 370, and may include one or more lenses 371A and an image sensor 373A. A location and orientation of the camera 370A may be used to define a camera coordinate system. FIG. 3B depicts the camera coordinate system to be defined by the orthogonal coordinate axes $\vec{X}_{camera}$, $\vec{Y}_{camera}$, $\vec{Z}_{camera}$. The coordinate axes may be aligned with an orientation of various components of the camera 370A. For instance, the $\vec{Z}_{camera}$ coordinate axis may be the equal to a central axis of a camera field of view of the camera 370A, which may be equal to an optical axis of the one or more lenses 371A. In some cases, the $\vec{X}_{camera}$ and $\vec{Y}_{camera}$ coordinate axes may be parallel to the edges of the image sensor 373A. Further, an origin of the camera coordinate system may be equal to a location of a lens of the one or more lenses 371A, a location of an aperture of the camera 370A, or another location (e.g., a location on, in front of, or behind the image sensor 373A).

In an embodiment, light from the location $[X\ Y\ Z]_{Camera}^T$ may be projected onto a coordinate $$\left[-\frac{X}{f}\ -\frac{Y}{f}\ -f\right]_{Camera}^T$$

within the camera, where f is a focal length of the one or more lenses 371A. This coordinate in the camera coordinate system may also correspond to pixel coordinate $[u\ v]_{Sensor}^T$ on an image sensor coordinate system. FIG. 3B depicts the image sensor coordinate system to be defined by the coordinate axes $\vec{U}_{sensor}$, $\vec{V}_{sensor}$, which may be aligned with respective edges of the image sensor 373A. The image sensor coordinate system may have an origin that is located at a corner of the image sensor 373A.

In an embodiment, an intrinsic camera parameter may have a value that is a scalar value, a vector, or a matrix. In an embodiment, one of the intrinsic camera parameters is a projection matrix K that models a geometrical relationship between the location $[X\ Y\ Z]_{Camera}^T$ and the location $[u\ v]_{Sensor}^T$. The estimate of this intrinsic camera parameter may be an estimated matrix, which may include respective estimated values of components of the matrix. In some cases, the projection matrix K may model a distortionless relationship between $[X\ Y\ Z]_{Camera}^T$ and $[u\ v]_{Sensor}^T$, while another intrinsic camera parameter or set of intrinsic camera parameters may account for an effect of lens distortion, as discussed in more detail below. In an embodiment, $$K = \begin{bmatrix} f_x & 0 & C_x \\ 0 & f_y & C_y \\ 0 & 0 & 1 \end{bmatrix},$$

and $[u\ v]_{Sensor}^T = K\ [X/Z\ Y/Z\ 1]_{Camera}^T$. In this example, $f_x$ may be a first scale factor based on the focal length f and a pixel size of the image sensor 373A along the $\vec{U}_{sensor}$ axis. Similarly, $f_y$ may be a second scale factor based on a focal length f of the camera 370A and a pixel size of the image sensor 373A along the $\vec{V}_{sensor}$ axis. Both $f_x$ and $f_y$ may have a unit of pixels per millimeter. The value $C_x$ may be a first part of a principal point offset, and may be based on a distance along the $\vec{U}_{sensor}$ axis between an origin of the image sensor coordinate system and an origin of the camera coordinate system. The value $C_y$ may be a second part of a principal point offset, and may be based on a distance along the $\vec{V}_{sensor}$ axis between the origin of the image sensor coordinate system and the origin of the camera coordinate system. As stated above, the projection matrix K is an intrinsic camera parameter, and each of $f_x$, $f_y$, $C_x$, and $C_y$ is a component of the matrix, wherein each of the components has a scalar value. In an embodiment, each of $f_x$, $f_y$, $C_x$, $C_y$, and the focal length f may also be considered an intrinsic camera parameter, wherein a value of each of those intrinsic camera parameters is a scalar value.

In an embodiment, the intrinsic camera parameters include one or more distortion parameters, which may characterize an effect of lens distortion caused by the one or more lenses 371A. In an embodiment, the intrinsic camera parameter may be a parameter in a distortion function. For instance, the lens distortion of the one or more lenses 371A may be modeled as an effect which causes a location $[X\ Y\ Z]_{Camera}^T$ to appear as if it were at $[\hat{X}\ \hat{Y}\ Z]_{Camera}^T$, where a first function $d_x$ (which may be referred to as a first distortion function) may relate $\hat{X}$ to the values of X, Y, and Z, and a second function $d_y$ (also referred to as a second function) may relate $\hat{Y}$ to the values of X, Y, and Z. For instance, in one model, $$d_x = \hat{X} = \frac{X}{Z}(1 + k_1 r^2 + k_2 r^4 + k_3 r^6) + 2p_1 \frac{X\ Y}{Z\ Z} + p_2\left(r^2 + 2\left(\frac{X}{Z}\right)^2\right),$$

wherein $$r^2 = \left(\frac{X}{Z}\right)^2 + \left(\frac{y}{Z}\right)^2.$$

In this example, each of $k_1$, $k_2$, $k_3$, $p_1$, $p_2$ may be a distortion parameter that has a scalar value, and an estimate of a particular distortion parameter may be an estimated scalar value. Further, an estimate may be determined for a set of distortion parameters (e.g., $k_1$, $k_2$, $k_3$, $p_1$, $p_2$), wherein the estimate of the set of distortion parameters refers to a set of respective estimated scalar values for the set of distortion parameters.

Figure 3C:
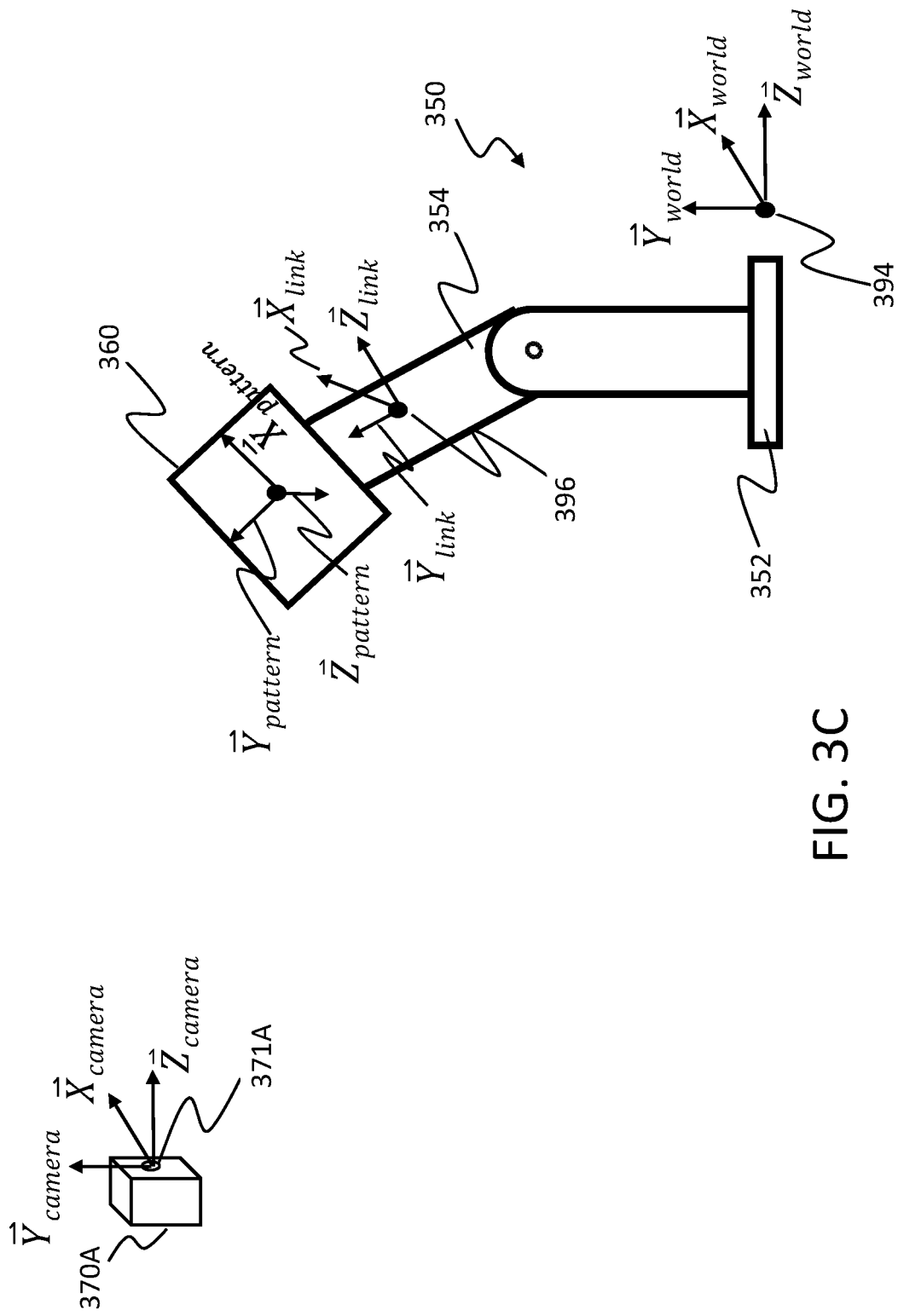

As stated above, the camera calibration may involve a hand-eye calibration phase that determines a relationship between the camera and the camera's environment, or a relationship between a calibration pattern and the pattern's environment. The hand-eye calibration is discussed in more detail below. In an embodiment, the external parameters may describe the camera-to-world relationship and the pattern-to-link relationship illustrated in FIG. 2B. In an embodiment, the camera-to-world relationship may be described via a transformation function that describes a relationship between the camera coordinate system and a world coordinate system. The world coordinate system is illustrated in FIG. 3C, and is defined by the coordinate axes $\vec{X}_{World}$, $\vec{Y}_{World}$, $\vec{Z}_{World}$. An origin of the world coordinate system is a reference point 394, which may be any point that is stationary relative to a base 352 of a robot 350. In an embodiment, the axes $\vec{X}_{World}$, $\vec{Y}_{World}$, $\vec{Z}_{World}$ may have an arbitrary orientation. In an embodiment, the axes the axes $\vec{X}_{World}$, $\vec{Y}_{World}$, $\vec{Z}_{World}$ may be defined relative to a structure of the robot 350 or of an environment (e.g., warehouse) in which the robot 350 is located. For instance, the axis $\vec{Z}_{World}$ may have to be orthogonal to a floor of the warehouse. In an embodiment, the above transformation function may be a matrix $T_{World}^{Camera}$ that defines a linear transformation from the camera coordinate system to the world coordinate system. The above nomenclature of $T_a^b$ refers to a transformation matrix for a b-to-a transformation that defines mapping from a coordinate in a coordinate system "b" to a coordinate in a coordinate system "a". In one example, $T_a^b$ has the form $$T_a^b = \begin{bmatrix} R_{ba} & t_{ba} \\ 0 & 1 \end{bmatrix}$$

In the above example, $R_{ba}$ is a relative rotation matrix between the coordinate systems b and the coordinate system a, and $t_{ba}$ is a relative translation vector between the coordinate system b to the coordinate system a.

In an embodiment, the pattern-to-link relationship may be described via a transformation function that describes a relationship between a pattern coordinate system and a link coordinate system, an example of which are depicted in FIG. 3C. In an embodiment, a calibration pattern 360 may be used to perform the camera calibration, and may be attached to a link 354 of the robot 350, wherein the link 354 may form at least part of a robot arm of the robot 350. The pattern coordinate system may be a coordinate system defined with respect to the calibration pattern 360. For instance, the pattern coordinate system may be defined by the coordinate axes $\vec{X}_{Pattern}$, $\vec{Y}_{Pattern}$, $\vec{Z}_{Pattern}$, and may have an origin that is located at a center of the calibration pattern 360. In an embodiment, the calibration pattern 360 may be formed from a flat rectangular board or flat rectangular sheet (e.g., sticker), and $\vec{X}_{Pattern}$, $\vec{Y}_{Pattern}$ may be parallel with respective edges of the flat board or flat sheet, while $\vec{Z}_{Pattern}$ is orthogonal to the flat board or flat sheet. FIG. 3C also illustrates the link coordinate system, which may be defined by the coordinate axes $\vec{X}_{link}$, $\vec{Y}_{link}$, $\vec{Z}_{link}$. In an embodiment, an origin of the link coordinate system is a point 396 on the link 354. The link 354 may be fixedly attached to the calibration pattern 360, such that the calibration pattern 360 is stationary relative to the link 354. In an embodiment, an orientation of the coordinate axes $\vec{X}_{link}$, $\vec{Y}_{link}$, $\vec{Z}_{link}$ may be the same as an orientation of the link 354. In an embodiment, the transformation function for the pattern-to-link relationship may be a matrix $T_{Link}^{Pattern}$ that defines a linear transformation between the pattern coordinate system and the link coordinate system. In an embodiment, $T_{Link}^{Pattern}$ may be unknown prior to performing the hand-eye calibration phase, and the hand-eye calibration phase may involve determining an estimate of $T_{Link}^{Pattern}$ along with an estimate of a camera-to-world relationship (e.g., $T_{World}^{Camera}$).

As discussed in more detail below, some embodiments of the hand-eye calibration phase may determine the camera-to-world relationship and the pattern-to-link relationship based on a camera-to-pattern relationship and a link-to-world relationship. In an embodiment, the camera-to-pattern relationship may be defined by a matrix $T_{Pattern}^{Camera}$ that defines a linear transformation between the camera coordinate system and the pattern coordinate system. In an embodiment, the link-to-world relationship may be defined by a matrix $T_{World}^{Link}$ that defines a linear transformation between the link coordinate system and the world coordinate system.

In an embodiment in which a robot is controlled based on images from two or more cameras, the camera calibration may involve a stereo calibration phase that estimates or otherwise determines a transformation function that describes a relationship between a camera coordinate system of a first camera (e.g., camera 1 in FIG. 1B) and a camera coordinate system of a second camera (e.g., camera 2 in FIG. 1B). In an embodiment, such a transformation function may be a matrix $T_{Camera\ 2}^{Camera\ 1}$ that defines a linear transformation between the two camera coordinate systems.

Figure 4:
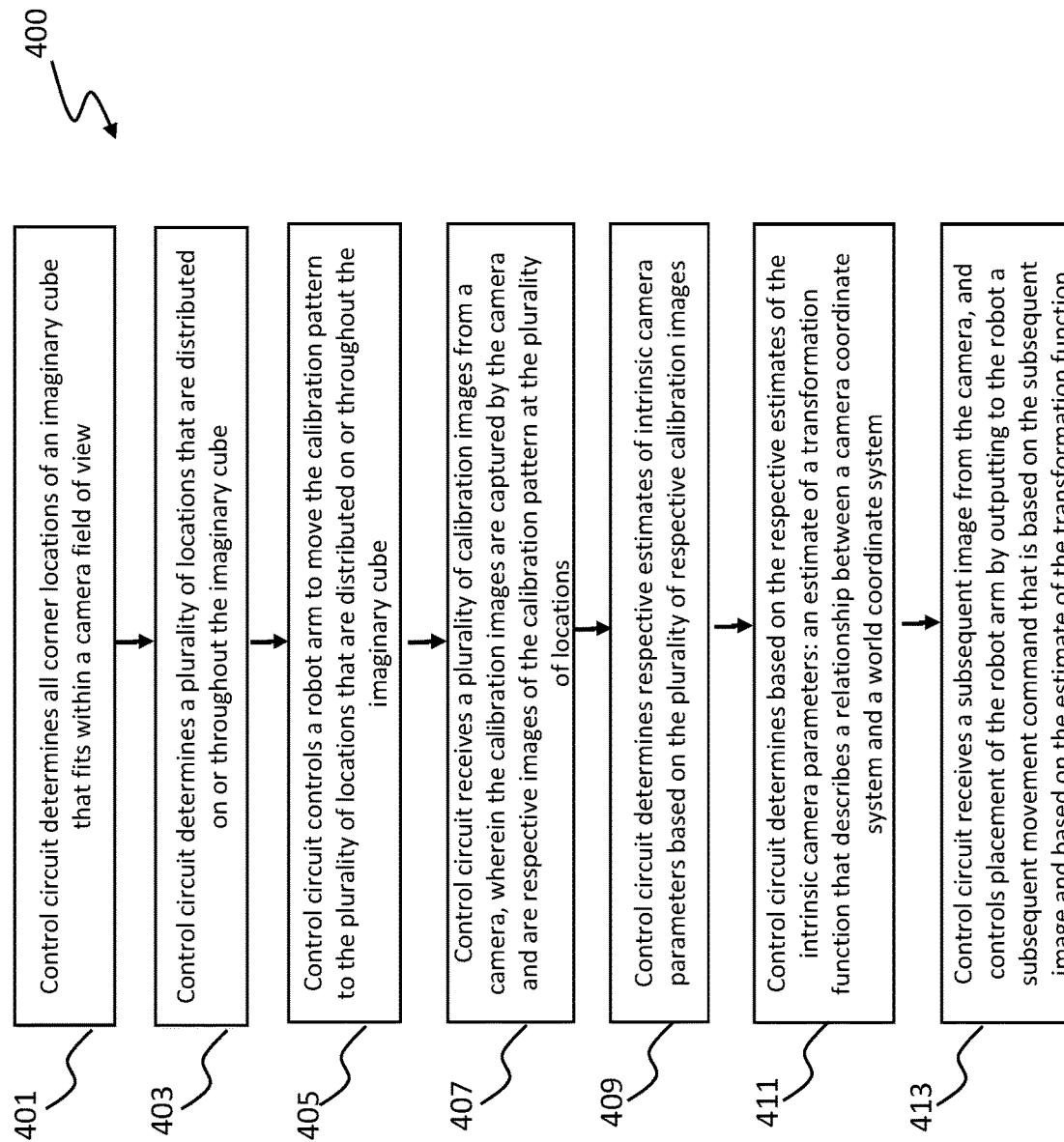
FIG. 4 provides a flow diagram that illustrates a method for determining locations at which to place a calibration pattern within a camera's field of view (also referred to as a camera field of view), and capturing respective images of the calibration pattern at the determined locations, according to an embodiment herein.

As stated above, the camera calibration may involve determining locations and/or orientations at which a calibration pattern is photographed by a camera, wherein the resulting images are used to perform the intrinsic calibration, hand-eye calibration, and/or stereo calibration. For instance, the calibration pattern may be moved to a plurality of locations that are distributed on or throughout an imaginary cube which fits within a camera field of view of the camera. FIG. 4 depicts a flow diagram that illustrates a method 400 for obtaining images of a calibration pattern (also referred to as calibration images) for performing camera calibration. In an embodiment, the method 400 is performed by the control circuit 111 of FIG. 1A of the robot control system 110 of FIG. 1A. As stated above, the robot control system 110 may include a communication interface configured to communicate with a robot arm and with a camera.

An example environment in which method 400 is performed is depicted in FIG. 5A, which depicts a robot operation system 500 that includes the robot control system 110 of FIG. 1A in communication with the camera 470 and a robot 450. The camera 470 may be an embodiment of the camera 170/270/370 of FIG. 1A/FIG. 2A/FIG. 3A, and the robot may be an embodiment of the robot 150/250/350 of FIG. 1A/FIG. 2A/FIG. 3A. The robot 450 may include a base 452 and a robot arm movable relative to the base 452. The robot arm includes one or more links, such as links 454A through link 454E. In an embodiment, the links 454A-454E may be rotatably attached to each other. For instance, the link 454A may be rotatably attached to the robot base 452 via a joint 456A. The remaining links 454B through 454E may be rotatably attached to each other via joints 456B through 456E. In an embodiment, the links (e.g., 454B through 454E) may be connected via one or more prismatic joints, exclusively or in combination with other types of joints (e.g., one or more cylindrical joints). In such an embodiment involving the one or more prismatic joints, the links may be referred to as being linearly attached to each other. In an embodiment, the base 452 may be used to mount the robot 452 to, e.g., a mounting frame or mounting surface (e.g., floor of a warehouse). In an embodiment, the robot 450 may include a plurality of motors that are configured to move the robot arm by rotating the links 454A-454E. For instance, one of the motors may be configured to rotate the first link 454A with respect to the joint 456A and the base 402, as shown with the dotted arrow in FIG. 5A. Similarly, other motors of the plurality of motors may be configured to rotate the links 454B through 454E. The plurality of motors may be controlled by the robot control system 110. FIG. 5A further depicts a calibration pattern 460 disposed in a fixed manner on the fifth link 454E, such that rotations of the links 454A-454E or other movement of the robot 450 does not change a location nor orientation of the calibration pattern 460 relative to the link 454E. In an embodiment, the calibration pattern 460 may be painted onto the link 454E. In an embodiment, the calibration pattern 460 may be part of a calibration board that is attached to the link 454E.

Figure 5B:
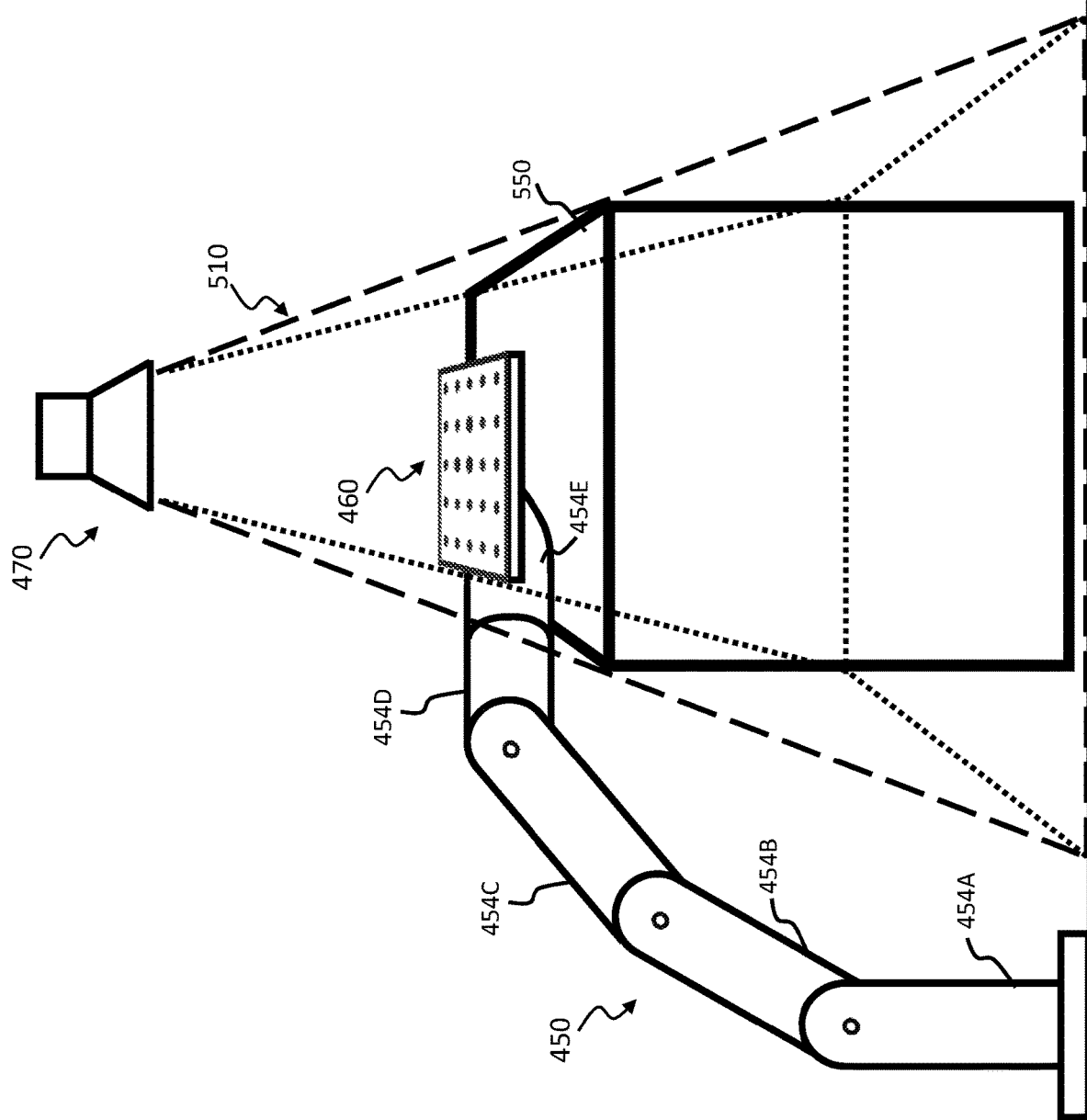
Figure 5C:
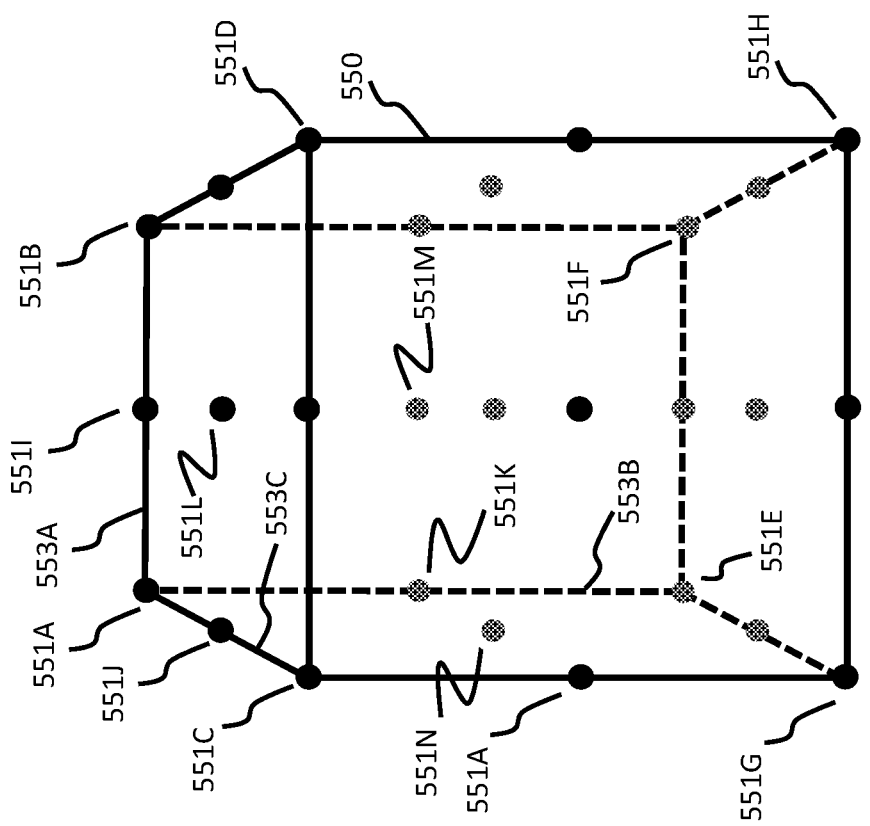
FIGS. 5C-5F illustrate imaginary cubes for that enclose various locations at which a calibration pattern is placed, according to embodiments herein.

Returning to FIG. 4, the method 400 may in an embodiment begin with step 401, in which the control circuit 111 may determine all corner locations of an imaginary cube that fits (e.g., completely fits) within a camera field of view, wherein the camera field of view may refer to a field of view of a camera. FIG. 5B depicts an example camera field of view 510, which may be a field of view of the camera 470, and further depicts an imaginary cube 550 that fits within the camera field of view 510. In an embodiment, the camera field of view 510 may form an imaginary pyramid spreading outward from the camera 470. In some cases, a width of the camera field of view 510 may depend on a focal length of one or more lenses of the camera 470. FIG. 5C depicts an example of the corner locations of the imaginary cube 550. More specifically, the imaginary cube 550 has eight corner locations 551A through 551H corresponding to the eight corners of the imaginary cube 550. In an embodiment, determining a corner location of the imaginary cube may involve determining a coordinate (e.g., $[X\ Y\ Z]_{World}^{T}$) of the corner location.

In an embodiment, the imaginary cube 550 may define a space on or within which the calibration pattern 460 is moved by a robot arm of the robot 450. The camera 470 may capture multiple images of the calibration pattern 460 (also referred to as calibration images), corresponding to different locations on or within the imaginary cube 550. Although the calibration pattern 460 may be moved throughout a space defined by a different shape, such as a sphere, the space defined by the imaginary cube 550 may include locations that are closer to a periphery of the camera field of view 510 of the camera 470. For instances, the eight corner locations of the imaginary cube 550 may be close to a periphery of the camera field of view 510. If the camera 470 exhibits lens distortion or other forms of camera distortion, an effect of the lens distortion on a calibration image may be more pronounced when the calibration pattern 460 is located near the periphery of the camera field of view 510, relative to, e.g., when the calibration pattern 460 is located around a center of the camera field of view 510. Thus, the imaginary cube 550 may facilitate the acquisition of calibration images in which an effect of the distortion is more pronounced, which may allow the camera calibration to generate a more accurate estimate for a distortion parameter of the camera 470.

Returning to FIG. 4, the method 400 may further include a step 403, in which the control circuit 111 may determine a plurality of locations that are distributed on or throughout the imaginary cube, wherein the calibration pattern is at least partially visible to the camera at each location of the plurality of locations.

In an embodiment, the plurality of locations are uniformly distributed (also referred to as being evenly distributed) on or throughout the imaginary cube. In an embodiment, the plurality of locations may be exactly $n^3$ locations that are uniformly distributed on or within the imaginary cube, wherein n is a positive integer that is equal to or greater than 2, or equal to or greater than 3. For instance, FIG. 5C illustrates an embodiment of exactly 27 locations that are uniformly distributed on or throughout the imaginary cube 550. In an embodiment, the plurality of uniformly distributed locations have uniform spacing, as measured along an edge of the imaginary cube, between immediately neighboring locations of the plurality of locations. For instance, the corner location 551A may be an immediately neighboring location to locations 551I through 551N. The corner location 551A and the immediately neighboring locations 551I through 551N may have uniform spacing as measured along an edge of the imaginary cube 550. More specifically, the corner location 551A may have the same distance, measured along an edge 553A, 553B, or 553C, to each of the immediately neighboring locations 551 through 551N. This distance may be, e.g., half of a length of each side of the imaginary cube 550. In another embodiment, the imaginary cube 550 may be divided into $n^3$ smaller, non-overlapping cubes (e.g., 27 smaller cubes), such that the smaller cubes uniformly divide the imaginary cube 550. In such an implementation, each location of the plurality of uniformly distributed locations may be a center location of a respective smaller cube.

In an embodiment, the plurality of locations are randomly distributed throughout the imaginary cube 550. In some cases, the control circuit 111 is configured to determine the plurality of locations by dividing the imaginary cube 550 into a plurality of non-overlapping regions, and by assigning a respective location of the plurality of locations to be in each region of the plurality of non-overlapping regions, wherein the respective location in a particular region may be a random location in that region. In some cases, the control circuit 111 may be configured to recursively or iteratively divide each of the half regions into smaller half regions, and assign locations to different half regions, so that the plurality of locations are not clustered around one region of the imaginary cube 550.

Figure 5E:
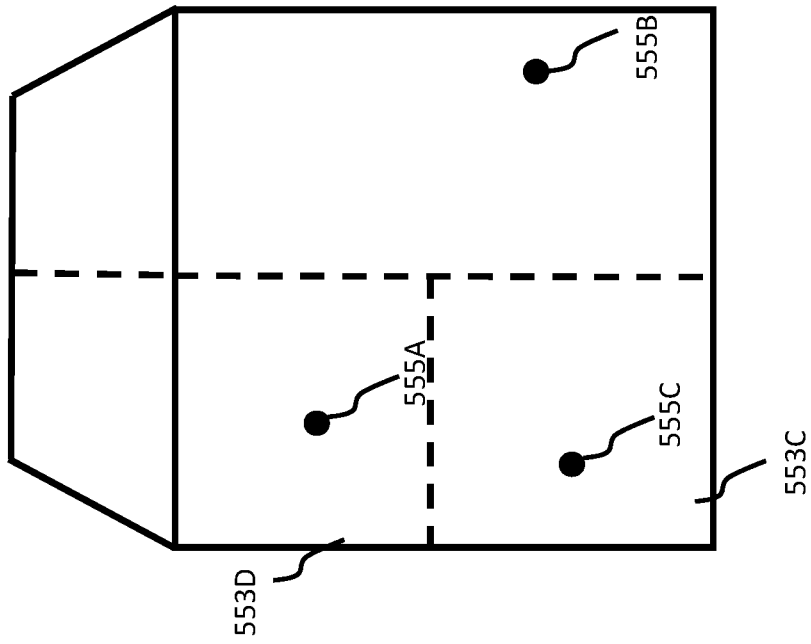
Figure 5D:
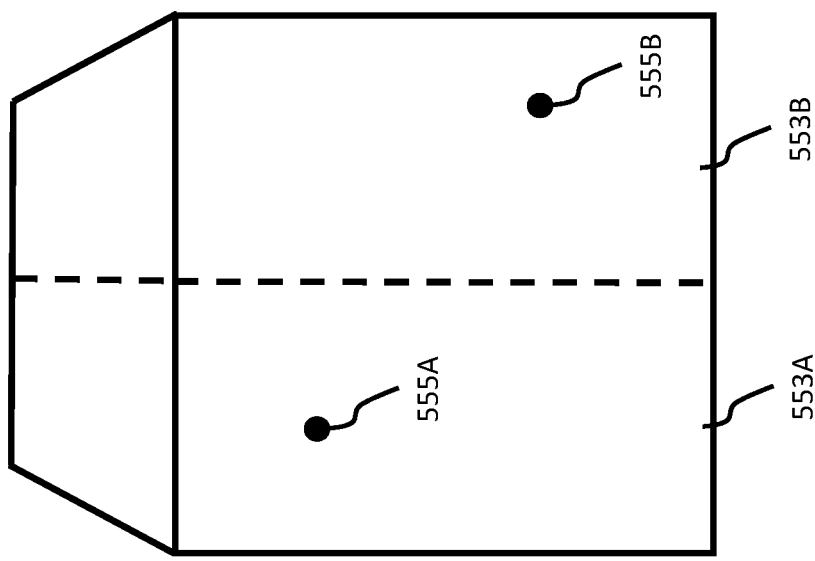
Figure 5F:
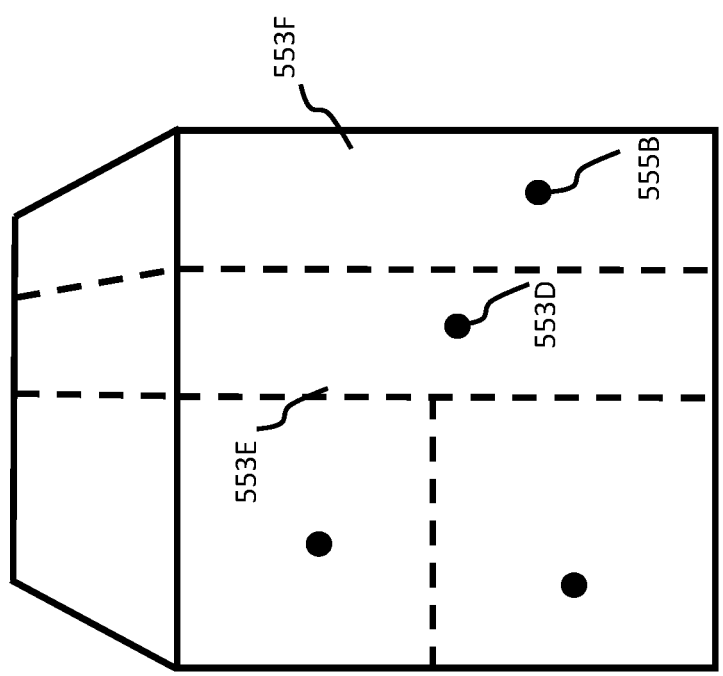
Figure 6A:
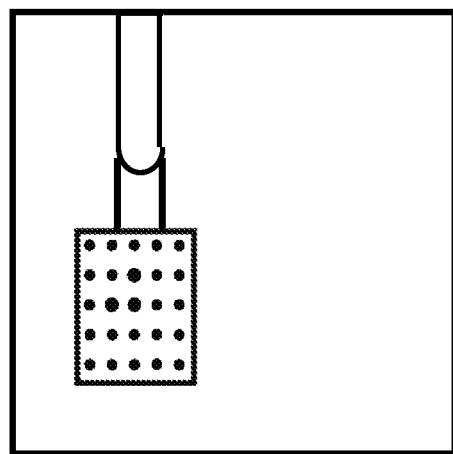
FIGS. 6A-6D illustrate example calibration images, which are images of a calibration pattern captured by a camera, according to an embodiment herein.
Figure 6C:
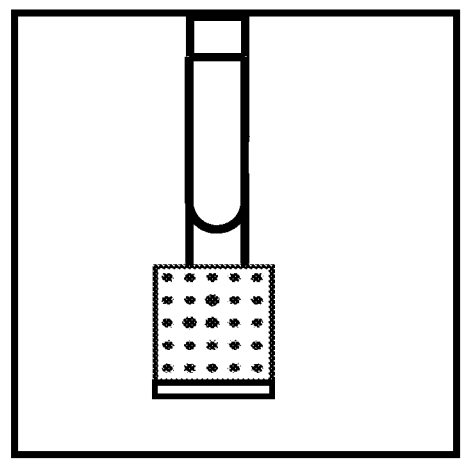
Figure 6B:
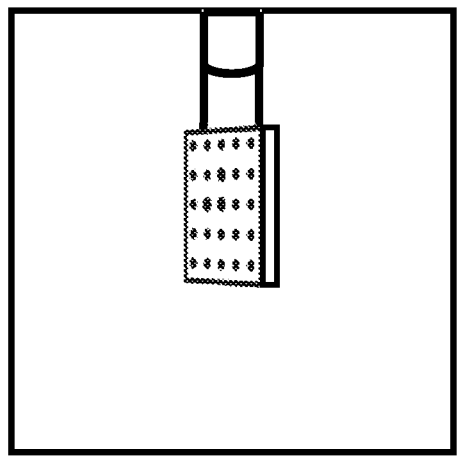
Figure 6D:
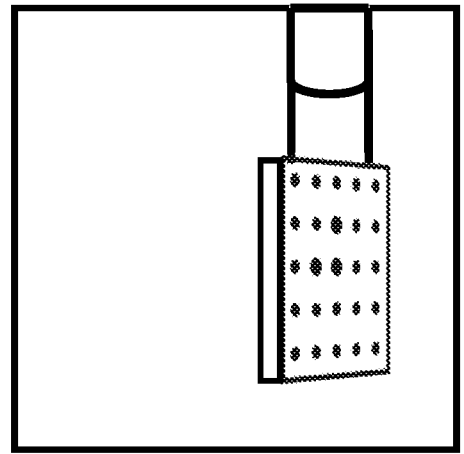

For instance, the control circuit may configured to determine the plurality of locations over a series of iterations, wherein a first location of the plurality of locations is determined as any location within the imaginary cube, and is determined during a first iteration of the series of iterations, wherein the imaginary cube forms a first region used to perform the first iteration. FIG. 5D illustrates an example of a first location 555A that is determined in the first iteration. In this example, respective locations for the remaining iterations are determined by performing the following for each of the remaining iterations: (a) dividing a region used to perform a previous iteration into a first region and a second regions that do not overlap, wherein each of the first region and the second region is a region used to perform a current iteration, (b) determining which of the first region and the second region contains a previous location, wherein the previous location is a respective location of the plurality of locations determined in the previous iteration, (c) and determining any location within the other of first region and the second region as a current location, wherein the current location is a location of the plurality of locations that is determined for the current iteration. For instance, FIG. 5D illustrates a second iteration that divides a region that was used in a previous iteration (i.e., the first iteration) into a first half region 553A and a second half region 553B. Further, because the location for the first iteration is in the first half region 554A, the location for the second iteration is in the other, second half region 553B. FIG. 5E illustrates a third iteration that divides a region 553A used in a previous iteration into a first half region 553C and a second half region 553D. Further, because a location 555A from a previous iteration was in the half region 553D, the location 555C for the third iteration is in the other half region 553C. FIG. 5F illustrate a fourth iteration that divides a region 553B used in a previous iteration into half regions 553E and 553F. Because a location from a previous iteration was in the half region 553F, the location 555D for the fourth iteration is in the other half region 553E.

Returning to FIG. 4, method 400 includes a step 405, in which the control circuit 111 may control the robot arm to move the calibration pattern to the plurality of locations determined in step 403. For instance, with respect to FIG. 5B, the robot 450 may move the robot arm by moving one or more of the links 454A through 454E of the robot arm. The control circuit 111 may, e.g., generate one or more movement commands that would cause the robot to move the plurality of links 454A through 454E, and output the one or more movement commands to the robot 450 via the communication interface 113. More specifically, the control circuit 111 may output the one or more movement commands to the communication interface 113, which may communicate the one or more movement commands to the robot 450 to cause the robot arm (e.g., the plurality of links 454A through 454E) to move the calibration pattern based on the one or more movement commands to the plurality of locations, which are distributed on or throughout the imaginary cube. In an embodiment, the one or more movement commands may include one or more motor commands that control an amount of rotation by which the links 454A through 454E rotate relative to each other. In an embodiment, the control circuit may be configured to determine a location as a Cartesian coordinate $[X\ Y\ Z]_{World}^T$, and to determine motor commands based on the Cartesian coordinate. In an embodiment, the control circuit 111 may be configured to control the robot arm (e.g., via movement commands communicated to the robot 450) to tilt the calibration pattern 460 to different respective angles relative to the camera 470 for the plurality of locations that are distributed on or throughout the imaginary cube 550, such that a plurality of respective calibration images capture the calibration pattern 460 at different respective angles relative to the camera 470.

In an embodiment, method 400 includes a step 407, in which the control circuit 111 may retrieve or otherwise receive a plurality of calibration images from the camera 470 via the communication interface 113, wherein the plurality of calibration images are captured by the camera and are respective images of the calibration pattern 460 at the plurality of locations of steps 403 and 405. In some cases, step 407 may involve the control circuit controlling the camera to capture the plurality of respective calibration images corresponding to the calibration pattern being disposed at the plurality of locations. For instance, FIGS. 6A through 6D illustrate an example of four respective images of the calibration pattern 460 of FIG. 5A at different locations and/or different respective angles relative to the camera 470. In some instances, each calibration image of the plurality of respective calibration images may include an array of pixels having respective pixel intensity values. In an embodiment, one or more of the calibration images may show distortion, which may be manifested through a curvature in or among elements of the calibration pattern that are actually straight. The distortion is discussed in more detail below with respect to FIG. 8B.

In an embodiment, step 407 may involve the control circuit retrieving a calibration image by generating a camera command and communicating the camera command to the camera via the communication interface 113. The camera command, when received by the camera, may cause the camera to capture the calibration image or any other image from the camera field of view and/or cause the camera to communicate a captured image back to the communication interface 113, which may then communicate the captured image to the control circuit 111. As a result, the control circuit 111 may thus receive the captured calibration image from the camera via the communication interface 113. In an embodiment, the control circuit 111 may receive a captured image from the camera without generating a camera command. For instance, the camera may automatically capture a calibration image or any other image from its camera field of view, periodically or in response to a defined triggering condition, without needing a camera command from the control circuit 111. In such an embodiment, the camera may also be configured to automatically, without a camera command from the control circuit 111, communicate the calibration image to the communication interface 113, which may then communicate the image to the control circuit 111.

Returning to FIG. 4, method 400 includes a step 409, in which the control circuit 111 may determine respective estimates of the intrinsic camera parameters based on the plurality of respective calibration images. The method 400 further includes a step 411, in which the control circuit 111 determines, based on the respective estimates of the intrinsic camera parameters, an estimate of a transformation function that describes a relationship between a camera coordinate system and a world coordinate system. In an embodiment, steps 409 and 411 may be part of an intrinsic calibration phase and a hand-eye calibration phase, which are discussed below in more detail. In an embodiment, the method 400 may include a step 413, in which the control circuit receives a subsequent image from the camera, and controls placement of the robot arm by outputting to the robot (e.g., via the communication interface 113) a subsequent movement command that is based on the subsequent image and based on the estimate of the transformation function. For instance, the subsequent image may be an image of a package or other object captured by the camera (e.g., captured automatically or in response to a camera command). In one example, step 413 may involve using the transformation function and the subsequent image to determine an object-to-world relationship (e.g., a matrix $T_{WORLD}^{OBJECT}$) and this relationship may be used to generate a movement command that controls placement of the robot arm or other component of the robot relative to the package.

In an embodiment, the imaginary cube used in step 405 (in which the calibration pattern is moved to locations distributed on or throughout the imaginary cube) may be a largest imaginary cube that can fit (e.g., completely fit) within a camera field of view (e.g., 510). In an embodiment, the largest imaginary cube is used in step 405 if (e.g., only if) a robot arm is able to move the calibration pattern to all corner locations of the imaginary cube. Otherwise, a smaller imaginary cube may be used for step 405. For instance, in one embodiment of method 400, step 401 is performed before step 405 and involves the control circuit 111 determining a first imaginary cube that fits within the camera field of view of the camera. FIG. 7 depicts an example of a first imaginary cube 649, which may in some cases be the largest imaginary cube that can fit within the camera field of view of the camera. The control circuit 111 may then determine whether the robot arm (e.g., of the robot 450) is able to move the calibration pattern to all corner locations of the first imaginary cube. If the robot arm is able to do so, the first imaginary cube may then be used as the imaginary cube in steps 403 and 405.

In some cases, the control circuit 111 may determine that the robot arm is not able to move the calibration pattern to one or more corner locations of the first imaginary cube 649. For instance, the control circuit 111 may determine that the robot arm is able to move a calibration pattern to only six corner locations of the first imaginary cube 649, and may be unable to move the calibration pattern to a seventh corner location or eighth corner location of the first imaginary cube 649. Such a determination reflects a possibility that the calibration pattern cannot be placed near the seventh corner location and the eighth corner location. In such a situation, if the first imaginary cube 649 is used to determine locations at which the calibration pattern is photographed by the camera, the camera may be unable to capture calibration images of the calibration pattern near the seventh corner location and the eighth corner location because the calibration pattern cannot be moved near there. This situation may reduce the diversity of calibration images that are available for camera calibration, which may reduce an accuracy or robustness of the camera calibration. Thus, the control circuit 111 may, in response to a determination that the robot arm is unable to move the calibration pattern to at least one corner location of the first imaginary cube 649, determine a second imaginary cube 650 that is smaller than the first imaginary cube 649 (e.g., 20% smaller). If the robot arm is able to move the calibration pattern to all corner locations of the second imaginary cube 650, then the second imaginary cube 650 may be used as the imaginary cube of steps 403 and 405.

In an embodiment, the control circuit may determine whether the robot arm is able to move the calibration pattern to a particular location based on detecting whether a physical object (e.g., a power cable) is obstructing a path from the robot arm to that location. In an embodiment, there may be some locations that the robot arm is simply unable to reach because they are too far from a base of the robot, or because the robot arm is constrained by its physical structure from moving to that location. For instance, the robot arm may be constrained by a size of one or more links making up the robot arm, an orientation of the one or more links, how many degrees of freedom are provided by joints that connect the one or more links, or some other constraint. In an embodiment, the control circuit may make the above determination without actually moving the robot arm. In another embodiment, the control circuit may make the above determination by actually attempting to move the calibration arm via the robot arm to the particular location, and determining whether such an attempt is successful.

In an embodiment, a particular imaginary cube is used for step 405 if, at each corner location, the robot arm can tilt the calibration pattern to be within a defined range of angles relative to the camera. In some cases, the particular imaginary cube is used for step 405 only if the above-recited condition is satisfied. For instance, the camera calibration may use only calibration images in which an angle between the calibration pattern and the camera is in a range of 0 to 45 degrees. Thus, in an embodiment, step 401 may involve the control circuit 111 determining whether the robot arm is able to move the calibration pattern to all corner locations of the first imaginary cube 649 and whether, at each corner location of all corner locations of the first imaginary cube 649, to tilt the calibration pattern to an angle that is within a defined range of angles relative to the camera. If the control circuit determines that the robot arm is unable to move the calibration pattern to one or more corner locations of the first imaginary cube 649, or that the robot arm is not able, for at least one corner location of the first imaginary cube 649, to tilt the calibration pattern to an angle that is within the defined range of angles relative to the camera, the control circuit 111 may determine all corner locations of the second imaginary cube 650. The second imaginary cube 650 may be used for step 405 if the above conditions are satisfied.

In an embodiment, the control circuit 111 may be configured to determine a value of a focus parameter and a value of an exposure parameter based on an image of the calibration pattern. In some cases, this determination may be performed before step 401. For instance, the control circuit 111 may be configured to control the camera to capture a first calibration image of the calibration pattern before step 401, and to determine a level of intensity and a level of contrast of at least one pattern element (e.g., a dot) of the calibration pattern. The control circuit 111 may be configured to determine respective values of the exposure parameter (e.g., an aperture, shutter speed, or ISO) and a focus parameter of the camera based on at least one of the level of intensity and the level of contrast of at least one of the pattern elements in the first calibration image. The respective values of these parameters may then be used by the camera to capture calibration images of the calibration pattern at step 407.

Figure 8A:
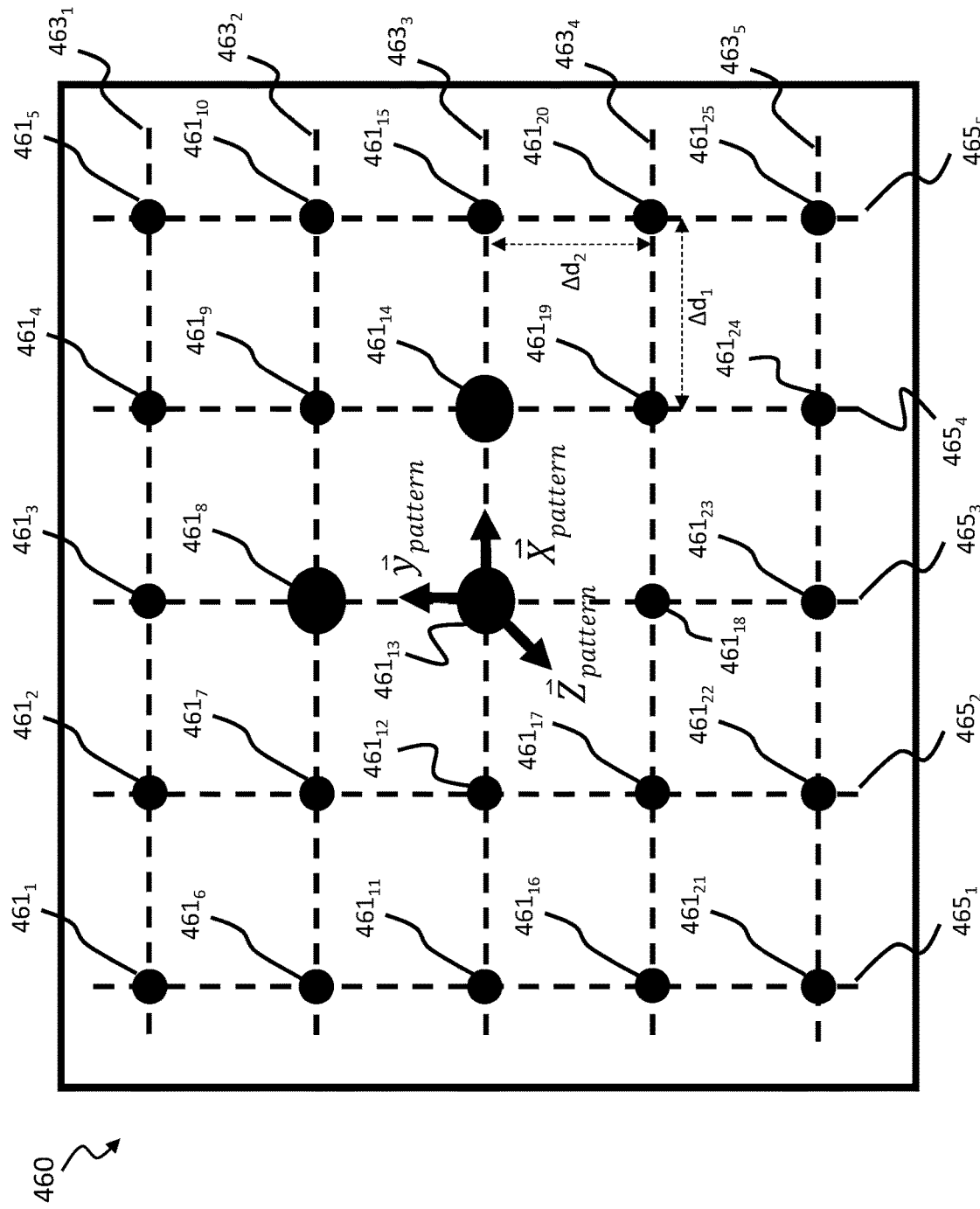
FIG. 8A depicts an example calibration pattern, according to an embodiment herein.

As discussed above, the camera calibration may be based on calibration images, such as images of the calibration pattern 460. In an embodiment, the calibration pattern 460 may be printed on a flat calibration board. The calibration board may be formed from a material that is resistant to temperature-induced warping, such as carbon fiber. FIG. 8A depicts an example of the calibration pattern 460, which may include a plurality of pattern elements $461_1$ through $461_{25}$ that are arranged along imaginary straight grid lines ($463_1$ through $463_5$, and $465_1$ through $465_5$) of a rectangular grid. For example, the imaginary grid lines may include a first set of uniformly spaced straight lines $463_1$ through $463_5$, and a second set of uniformly spaced straight lines $465_1$ through $465_5$, wherein the first set of imaginary grid lines $463_1$ through $463_5$ are orthogonal to the second set of imaginary grid lines $465_1$ through $465_5$. In an embodiment, each of the pattern elements $461_1$ through $461_{25}$ may be a circular dot. In an embodiment, the pattern elements $461_1$ through $461_{25}$ may differ in size. For instance, the pattern elements $461_8$, $461_{13}$, and $461_{14}$, have a first diameter, while all remaining pattern elements have a second diameter smaller than the first diameter. In an embodiment, the plurality of pattern elements $461_1$ through $461_{25}$ have a defined size(s) and a defined spacing among them. For instance, the first diameter and the second diameter may be values defined by a maker of the calibration pattern 460 (e.g., a calibration board manufacturer), and may be a known value during camera calibration. Further, the plurality of pattern elements $461_1$ through $461_{25}$ may have a defined distance $\Delta d_1$ along the grid lines $465_1$ through $465_5$, and have a defined distance $\Delta d_2$ along the grid lines $463_1$ through $463_5$, wherein the defined distances may be known values during camera calibration. In an embodiment, $\Delta d_1$ is equal to $\Delta d_2$. In an embodiment, the pattern elements $461_1$ through $461_{25}$ may all have the same size (e.g., same diameter), and the calibration pattern 460 may further include a feature (e.g., a rotationally asymmetrical shape) that indicates an orientation of the calibration pattern 460.

As stated above, the pattern coordinate system may be defined with respect to a calibration pattern, such as the calibration pattern 460. In an embodiment, a pattern element at or near a center of the calibration pattern 460, such as pattern element $461_{13}$ may define an origin of the calibration coordinate system. In this embodiment, the $\vec{X}_{Pattern}$ axis may be aligned with the imaginary grid lines $463_1$ through $463_5$, while the $\vec{Y}_{Pattern}$ axis may be aligned the imaginary grid lines $465_1$ through $465_5$, and the $\vec{Z}_{Pattern}$ axis is orthogonal to a plane formed by the calibration pattern 460.

Figure 8B:
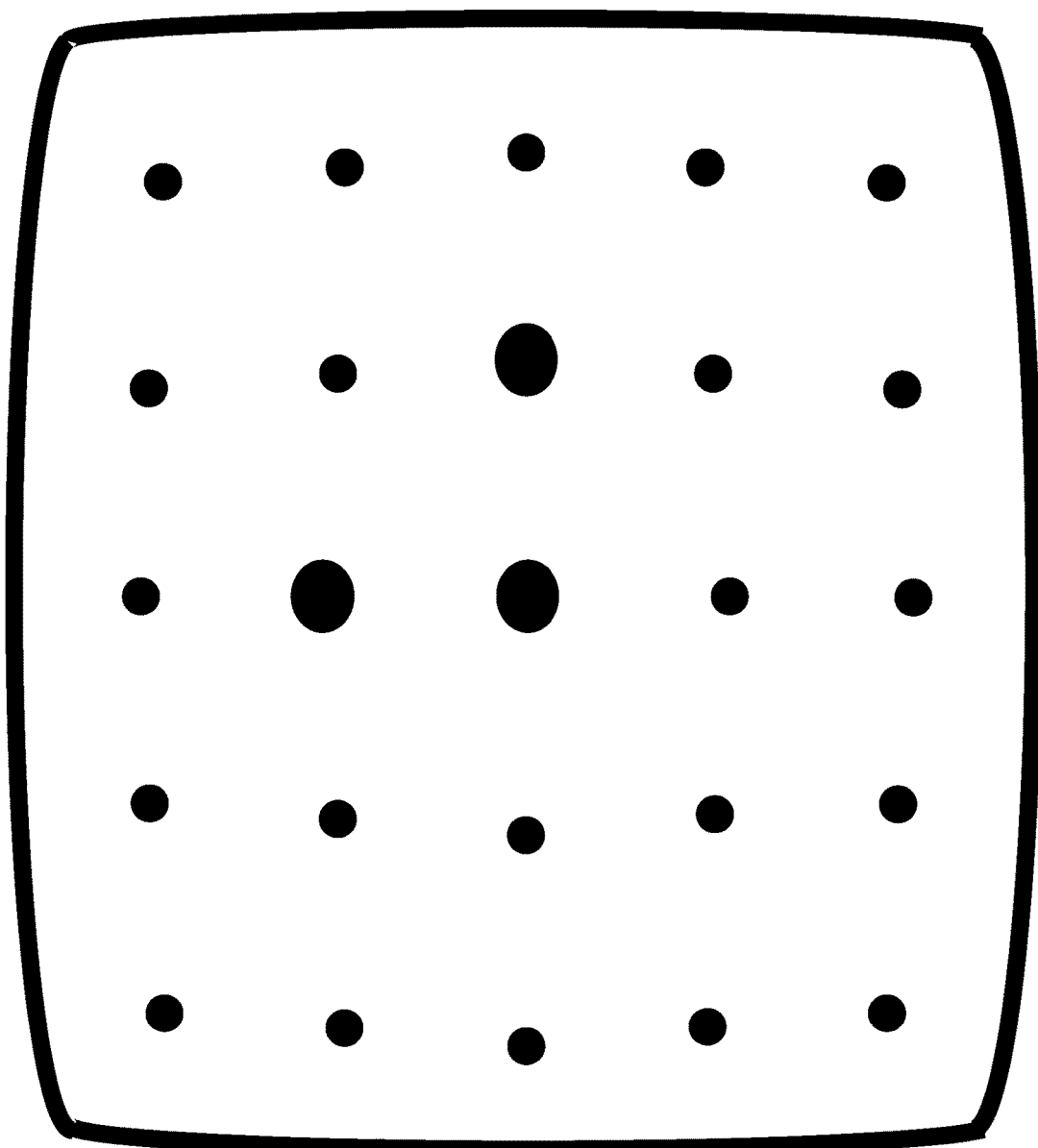
FIG. 8B depicts an example image of a calibration pattern in which the image exhibits an effect of lens distortion, according to an embodiment herein.

While the pattern elements are disposed along straight imaginary lines, they may appear to be disposed along a curved path in a calibration image, due to an effect of lens distortion. For instance, FIG. 8B depicts an example of a calibration image for the calibration pattern 460, in which the calibration image includes an effect of lens distortion. For instance, while the pattern elements in the calibration pattern 460 are arranged along straight lines of a rectangular grid, the lens distortion may cause them to appear as if they were arranged along a curved path. As discussed in more detail below, the camera calibration may determine an estimate of a distortion parameter or set of distortion parameters based on detecting curvature in the calibration image.

As stated above, one aspect of the camera calibration may involve an intrinsic calibration phase (also referred to as performing intrinsic calibration), which is discussed below. In an embodiment, the intrinsic calibration may comprise determining respective estimates for intrinsic camera parameters of the camera 170/370/470 of FIG. 1A/FIG. 3B/FIG. 5A, such as distortion parameters and a projection matrix.

In an embodiment, the projection matrix may be an intrinsic camera parameter whose value is a matrix formed from scalar values. For instance, the projection matrix K of a camera 170/370/470 may be defined as a 3×3 matrix made up 9 scalar values. As stated above, one example of the projection matrix is:

$$K = \begin{bmatrix} f_x & 0 & C_x \\ 0 & f_y & C_y \\ 0 & 0 & 1 \end{bmatrix}$$

In an embodiment, the projection matrix defines a linear transformation or other mapping that projects a coordinate $[X\ Y\ Z]_{Camera}^T$ of a pattern element within the camera's camera field of view to a pixel coordinate $[u\ v]_{Sensor}^T$ at which the pattern element will appear in a calibration image:

$$\begin{bmatrix} u \\ v \\ 1 \end{bmatrix} = K \begin{bmatrix} X/Z \\ Y/Z \\ 1 \end{bmatrix},$$

The above relationship may assume that there is no lens distortion. In the above example, the vector $[X/Z\ Y/Z\ 1]^T$ is a homogeneous 3D coordinate in the camera coordinate system, and the vector $[u\ v\ 1]^T$ is a homogeneous 3D coordinate in the image sensor coordinate system.

In an embodiment, the pixel coordinate $[u\ v]_{Sensor}^T$ of a pattern element may refer to an estimate of a center of the pattern element in the calibration image. For instance, if the pattern element appears as a circular dot in the calibration image, the pixel coordinate may be a center of the circular dot. In some situations, the pattern element may appear as an ellipse in the calibration image, even though it is actually a circular dot on the calibration pattern. This appearance may be due to an angle between the camera and the calibration pattern. In these situations, the pixel coordinate of the pattern element may be slightly different from a geometric center of the ellipse.

In an embodiment, each of $f_x$, $f_y$, $C_x$, and $C_y$ may be a component of the projection matrix, and may also be an intrinsic camera parameter whose value is a scalar value. As stated above, the parameters $f_x$ and $f_y$ may be scaling factors based on a focal length of the camera and a pixel size of an image sensor in a X or Y direction. The parameters $C_x$ and $C_y$ may be pixel coordinates of an image center expressed in the image sensor coordinate system.

In an embodiment, a distortion parameter may be a parameter of a distortion function. More specifically, lens distortion of a camera may be modeled as one or more functions $d_x$ and $d_y$ which makes a pattern element that is actually located at $[X\ Y\ Z]_{Camera}^T$ in the camera's field of view appear as if the pattern element is located at $[\hat{X}\ \hat{Y}\ \hat{Z}]_{Camera}^T$. In this model, the projection matrix K is applied to $[\hat{X}\ \hat{Y}\ \hat{Z}]_{Camera}^T$ rather than $[X\ Y\ Z]_{Camera}^T$. This phenomenon may be expressed as:

$$\begin{bmatrix} u \\ v \\ 1 \end{bmatrix} = K \begin{bmatrix} \hat{X} \\ \hat{Y} \\ 1 \end{bmatrix} = K \begin{bmatrix} d_x(\tilde{X}, \tilde{Y}) \\ d_y(\tilde{X}, \tilde{Y}) \\ 1 \end{bmatrix} = K \begin{bmatrix} d_x(X/Z, Y/Z) \\ d_y(X/Z, Y/Z) \\ 1 \end{bmatrix}$$

In the above example, X/Z and Y/Z are written more simply as $\tilde{X}$ and $\tilde{Y}$. A nonlinear distortion function $d_x$ may determine $\hat{X}$ as a function of $\tilde{X}$ and $\tilde{Y}$, and a nonlinear distortion function $d_y$ may determine $\hat{Y}$ as a function of $\tilde{X}$ and $\tilde{Y}$. In some instances, an intrinsic camera parameter may be a parameter in the distortion function $d_x$ or $d_y$, in which case the intrinsic camera parameter may be referred to as a distortion parameter.

In an embodiment, the distortion functions may be based on a polynomial distortion model, in which $$\hat{X} = d_x(\tilde{X}, \tilde{Y}) = \tilde{X}(1 + k_1 r^2 + k_2 r^4 + k_3 r^6) + 2p_1 \tilde{X}\tilde{Y} + p_2(r^2 + 2\tilde{X}^2)$$

$$\hat{Y} = d_y(\tilde{X}, \tilde{Y}) = \tilde{Y}(1 + k_1 r^2 + k_2 r^4 + k_3 r^6) + 2p_2 \tilde{X}\tilde{Y} + p_1(r^2 + 2\tilde{Y}^2)$$

In the above example, $r^2 = \tilde{X}^2 + \tilde{Y}^2$. Further, the intrinsic camera parameters in this example may include $k_1$, $k_2$, $k_3$, $p_1$, $p_2$, each of which may be more specifically referred to as a distortion parameter. In some cases, some or all of the distortion parameters may have a value that is a scalar value.

In an embodiment, the distortion functions may be based on a rational distortion model, in which $$\hat{X} = d_x(\tilde{X}, \tilde{Y}) = \tilde{X}\left(\frac{1 + k_1 r^2 + k_2 r^4 + k_3 r^6}{1 + k_4 r^2 + k_5 r^4 + k_6 r^6}\right) + 2p_1 \tilde{X}\tilde{Y} + p_2(r^2 + 2\tilde{X}^2)$$

$$\hat{Y} = d_y(\tilde{X}, \tilde{Y}) = \tilde{Y}\left(\frac{1 + k_1 r^2 + k_2 r^4 + k_3 r^6}{1 + k_4 r^2 + k_5 r^4 + k_6 r^6}\right) + 2p_2 \tilde{X}\tilde{Y} + p_1(r^2 + 2\tilde{Y}^2)$$

In the above example, $r^2 = \tilde{X}^2 + \tilde{Y}^2$, and each of $k_1$, $k_2$, $k_3$, $k_4$, $k_5$, $k_6$, $p_1$, and $p_2$ is an intrinsic camera parameter, and more specifically a distortion parameter.

In an embodiment, the distortion functions may be based on a Field-Of-View Model, in which:

$$\hat{X} = d_x(\tilde{X}) = \frac{\tilde{X}\tan(r\tan(\omega))}{\tan(\omega)}$$

$$\hat{Y} = d_y(\tilde{Y}) = \frac{\tilde{Y}\tan(r\tan(\omega))}{\tan(\omega)}$$

In the above example, $\omega$ is an intrinsic camera parameter, and more specifically a distortion parameter whose value is a scalar value.

As discussed in more detail below, some instances of the intrinsic calibration phase may involve determining an estimate of a distortion parameter, wherein the estimate may be a value that, when applied to inverse distortion functions $d_x^{-1}$ and $d_y^{-1}$, can compensate for an effect of lens distortion. For instance, the inverse distortion function, when applied with the estimate of the distortion parameter, may converting an image that exhibits curvature to (e.g., the image in FIG. 8B) to an "undistorted" image that reduces or eliminates the curvature.

FIG. 9 depicts a flow diagram of an example method 900 for performing camera calibration, wherein the camera calibration may include an intrinsic calibration phase. The method may determine estimated values of different intrinsic camera parameters in different stages. The method 900 may be performed by, e.g., the control circuit 111 of FIG. 1A of the robot control system 110 of FIG. 1A. As discussed above, the robot control system 110 may be in communication with a robot and a camera, such as the robot 450 of FIG. 5A and the camera 470 of FIG. 5A having the camera field of view 510. The robot 450 may have a robot arm on which a calibration pattern, such as calibration pattern 460 of FIG. 5A, is disposed. The calibration pattern 460 includes a plurality of pattern elements $461_1$ through $461_{25}$ of FIG. 8A having respective defined pattern element locations (e.g., pattern coordinates) in a pattern coordinate system, such as that depicted in FIGS. 3C and 8A. The pattern coordinate system may be a coordinate system defined with respect to a location and orientation of the calibration pattern 460. For instance, as illustrated in FIG. 8A, the pattern calibration system is defined by the coordinate axes $\vec{X}_{pattern}$, $\vec{Y}_{pattern}$, and $\vec{Z}_{pattern}$. In an embodiment, pattern element $461_{13}$ is an origin of the pattern calibration system, and its defined pattern element location is the pattern coordinate $[0\ 0\ 0]_{Pattern}^T$. In this embodiment, the defined pattern element location of pattern element $461_{14}$, for example, is $[d_1\ 0\ 0]_{Pattern}^T$, wherein $d_1$ is a defined value that is known. As another example, the defined pattern element location of pattern element $461_8$ is $[0\ d_2\ 0]_{Pattern}^T$.

In an embodiment, the method 900 may begin with step 901, in which the control circuit 111 may control the robot arm to move the calibration pattern (e.g., 460) to at least one location within a camera field of view (e.g., 510 of FIG. 5B), wherein the camera field of view may refer to a field of view of the camera (e.g. 470). In some instances, step 901 may involve the control circuit 111 generating a movement command for outputting to the communication interface 113 of the robot control system 110, and outputting the movement command to the communication interface 113. The communication interface 113 may communicate the movement command to the robot, wherein the movement command may cause the robot arm to move the calibration pattern to the at least one location in the camera field of view. In an embodiment, step 901 may be performed in a manner similar to steps 401 through 405 of FIG. 4.

In step 902, the control circuit 111 retrieves or otherwise receives a calibration image from the camera via the communication interface 113, wherein the calibration image is captured by the camera and is an image of the calibration pattern at the at least one location. In an embodiment, step 902 may be performed in a manner similar to step 407. In an embodiment, step 902 may involve the control circuit 111 controlling the camera, via a camera command, to capture a calibration image corresponding to the calibration pattern being at the at least one location, such as one of the calibration images in FIGS. 6A through 6D, or in FIG. 8B.

In step 903, the control circuit 111 may determine a plurality of image pattern element locations (also referred to as captured pattern element locations) that indicate respective locations at which the plurality of pattern elements appear in a calibration image. For example, each of the pattern elements may be a circular dot, and a captured element location of a particular circular dot may be a pixel coordinate $[u\ v]^T$ at which the circular dot appears in the calibration image, and more specifically may be an estimated pixel coordinate of a center of the circular dot.

In step 905, the control circuit 111 may determine a first estimate of a first intrinsic camera parameter of the camera based on the plurality of image pattern element locations (e.g., a set of $[u\ v]^T$ coordinates) and based on the defined pattern element locations (e.g., a set of $[X'\ Y'Z']_{Pattern}^T$ coordinates). In some cases, the camera includes a lens and an image sensor, and the first intrinsic camera parameter may be a projection matrix that describes image projection onto the image sensor. For example, the first intrinsic camera parameter may be the projection matrix K. In some cases, the first intrinsic camera parameter may be a component of the projection matrix K, such as one of the parameters $f_x$, $f_y$, $C_x$, and $C_y$.

As stated above, the projection matrix K may be estimated based on respective known coordinates of $[X'\ Y'\ Z']_{Pattern}^T$ of various pattern elements, and on respective known $[u\ v]^T$ coordinates at which the various pattern elements appear in a calibration image of the calibration pattern. In an embodiment, $[u \ v]^T$ may be related to $K*T_{Camera}^{Pattern} [X' \ Y' \ Z']_{Pattern}^{T}$. In this embodiment, $T_{Camera}^{Pattern}$ may be a linear transformation that describes a relationship between the pattern coordinate system and a camera coordinate system, such as that depicted in FIGS. 3B and 3C. For instance, it may reflect the relationship that:

$$\begin{bmatrix} X \\ Y \\ Z \\ 1 \end{bmatrix}_{Camera} = T_{camera}^{pattern} \begin{bmatrix} X' \\ Y' \\ Z' \\ 1 \end{bmatrix}_{Pattern}$$

In some cases $T_{camera}^{pattern}$ may comprise a rotation matrix R and a translation vector t. For instance, it may be written as a 4×4 matrix with the form $$T_{camera}^{pattern} = \begin{bmatrix} R_{camera}^{pattern} & t_{camera}^{pattern} \\ 0 & 1 \end{bmatrix}.$$

In an embodiment, step 905 may involve solving for K and $T_{Camera}^{Pattern}$ based on a plurality of pixel coordinates $[u \ v]^T$ and their corresponding coordinates $[X' \ Y' \ Z']_{Pattern}^{T}$. In an embodiment, the perspective-n-point algorithm may be used to determine an estimate of $T_{Camera}^{Pattern}$. In an embodiment, this step may also account for lens distortion, and may determine an estimate of a distortion parameter. This estimated value may, however, be discarded after step 905 is performed, or more generally is not used in the other steps of method 900. In an embodiment, step 905 may be performed based on a camera calibration algorithm discussed in "A Flexible New Technique for Camera Calibration," Technical Report MSR-TR-98-71, by Zhengyou Zhang (also referred to as Zhang's algorithm), the disclosure of which is incorporated by reference herein in its entirety. More specifically, Zhang's algorithm may be able to use the $[u \ v]^T$ and $[X' \ Y' \ Z']_{Pattern}^{T}$ coordinates to determine an estimate of a projection matrix K, an estimate of the $T_{Camera}^{Pattern}$ matrix, and an estimate of a distortion parameter or set of distortion parameters. In this example, the estimate of the projection matrix K may be used for steps 907, which is discussed in more detail below, while the estimated value of $T_{Camera}^{Pattern}$ and/or the estimate of the distortion parameter(s) may be discarded, or alternatively one or more of the above estimates may also be used as an initial guess of a parameter value in step 907, as discussed in more detail below.

In step 907, the control circuit may determine a first estimate of a second intrinsic camera parameter(s) of the camera based on the first estimate of the first intrinsic camera parameter and based on the plurality of image pattern element locations (also referred to as captured pattern element locations). In some cases, the second intrinsic camera parameter may be a distortion parameter that describes distortion caused by the lens. For example, as discussed above, the second intrinsic camera parameter may be a distortion parameter that is used for the nonlinear distortion functions $d_x$ and $d_y$.

In an embodiment, the control circuit in step 907 may determine the first estimate of the second intrinsic camera parameter(s) (e.g., distortion parameter(s)) by: (a) determining an initial estimate of the second intrinsic camera parameter(s), (b) generating, based on the initial estimate of the second intrinsic camera parameter(s), on the first estimate of the projection matrix, and on the calibration image: a modified version of the calibration image that compensates against the distortion caused by the lens, (c) determining an amount of curvature in the modified version of the calibration image, (d) adjusting the initial estimate of the second intrinsic camera parameter based on the amount of curvature in the modified version of the calibration image so as to generate an adjusted estimate of the second intrinsic camera parameter that reduces the amount of curvature, wherein the adjusted estimate is the first estimate of the second intrinsic camera parameter. In an embodiment, the initial estimate for the second intrinsic camera parameter may have a zero value or a set of zero values (e.g., $k_1$, $k_2$, $k_3$, $p_1$, and/or $p_2$ in the above distortion functions are equal to zero). In an embodiment, the initial estimate for the second intrinsic camera parameter may be obtained from a result of step 905. For instance, if step 905 uses Zhang's algorithm, the algorithm may output an estimate for the second intrinsic camera parameter, and this outputted estimate may be inputted to step 907 as the initial estimate of the second intrinsic camera parameter.

In an embodiment, the modified version of the calibration image may be a version that attempts to compensate for lens distortion in the calibration image. For instance, the modified version may be generated by applying the inverse distortion function $d_x^{-1}$ and $d_y^{-1}$ to the calibration image. In one example, the calibration image captured by the camera may be represented by pixel coordinates $[u, v]^T$ that represent locations at which pattern elements appear in the calibration image, while the modified version of the calibration image may be represented by pixel coordinates $[\tilde{u} \ \tilde{v}]^T$ that represent locations at which the same pattern elements appear in the modified version. In this example, the pixel coordinates $[\tilde{u} \ \tilde{v}]^T$ may be calculated by an estimate of the projection matrix K and the inverse distortion functions. More specifically, as discussed above, the estimate of the projection matrix may be used to determine an inverse projection matrix, which can be used to determine $$\begin{bmatrix} \hat{X} \\ \hat{Y} \\ 1 \end{bmatrix} = K^{-1} \begin{bmatrix} u \\ v \\ 1 \end{bmatrix}$$

Further as discussed above, the above result may be applied to the inverse distortion to determine:

$$\tilde{X} = d_x^{-1}(\hat{X}, \hat{Y})$$

$$\tilde{Y} = d_y^{-1}(\hat{X}, \hat{Y})$$

In the above example, $\ddot{X}$ and $\ddot{Y}$ for a pattern element relate to where the pattern element appears to be in the camera's field of view when lens distortion is applied, and $\hat{X}$ and $\hat{Y}$ relate to where the pattern element appears to be in the camera's field of view when there is compensation against the lens distortion. The projection matrix may be applied to $\tilde{X}$ and $\tilde{Y}$ to determine the pixel coordinates $[\tilde{u} \ \tilde{v}]^T$, based on the relationship:

$$\begin{bmatrix} \tilde{u} \\ \tilde{v} \\ 1 \end{bmatrix} = K \begin{bmatrix} \hat{X} \\ \hat{Y} \\ 1 \end{bmatrix}$$

In the above example, the inverse distortion function may include one or more distortion parameters. The estimate for the one or more distortion parameters may be optimized so as to best compensate against lens distortion. More specifically, the estimate may involve respective one or more estimated values for the one or more distortion parameters, and may be optimized so as to minimize or otherwise reduce an amount of distortion in the modified version of the calibration image. For instance, the control circuit 111 may try different estimates for the one or more distortion parameters to generate different modified versions of the calibration image, so as to evaluate which estimate minimizes the amount of curvature in the modified version of the calibration image, wherein the amount of curvature may be determined as a curvature score. An optimal estimate for a distortion parameter may be treated as the first estimate of the distortion parameter. As stated above, the calibration pattern may in some cases include pattern elements that are disposed along straight grid lines. Lens distortion may cause the pattern elements to appear in a calibration image as if they are disposed along a curved path. A modified version of the calibration image that has no distortion may exhibit no curvature, such that pattern elements appear in the modified version of the calibration image as if they are disposed along straight grid lines.

Figures 10A, 10B:
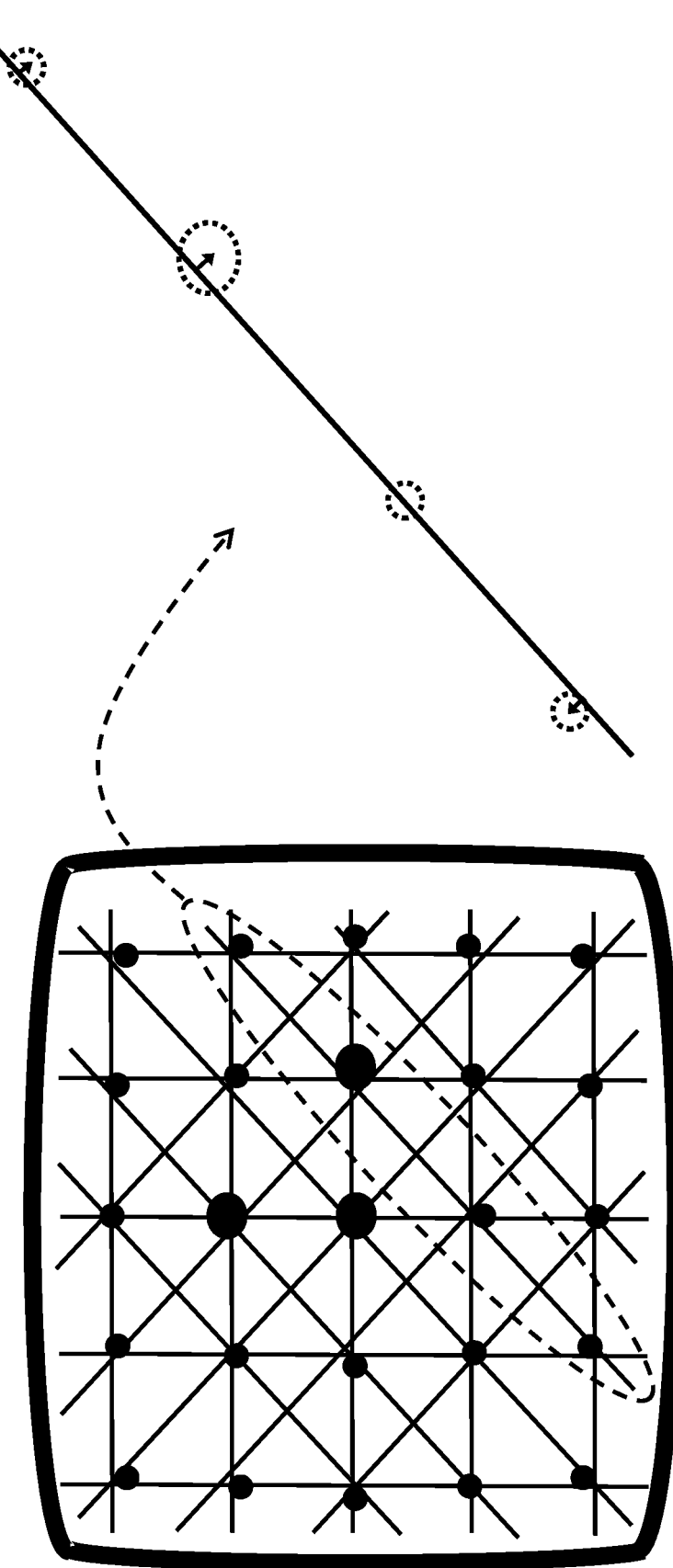
FIGS. 10A and 10B illustrate an aspect of determining an amount of curvature in an image of a calibration pattern, according to an embodiment herein.

In an embodiment, a line fitting technique may be used to determine an amount of curvature in the modified version of the calibration image. For instance, the plurality of pattern elements in the calibration pattern may be a plurality of dots (e.g., circular dots). In such an instance, the control circuit in step 907 may determine the amount of curvature by: fitting a plurality of straight lines through the plurality of dots (e.g., through respective centers of the dots) in the modified version of the calibration image, and determining the amount of curvature based on a distance between each straight line of the plurality of straight lines and a respective dot (e.g., a respective center of the dot) of the plurality of dots through which the straight line is fitted. If the modified version of the calibration image were not distorted, each straight line would have a distance of zero with the dots through which the line is fitted, or more specifically a distance of zero with respective centers of the dots. For instance, the straight line would go through respective centers of the dots. FIG. 10A, however, illustrates a calibration image that exhibits a degree of lens distortion. As a result, one or more of the straight lines does not go through respective centers of all of the dots through which that straight line is fit. FIG. 10B shows line fitting for a portion of the dots of FIG. 10A. In the figure, a line that is fitted through four dots are off from respective centers of three dots out of the four dots. The amount of curvature may be calculated based on a respective distance between a center of each dot and the fitted line in FIG. 10B, as indicated by a respective arrow stemming from the fitted line. In an embodiment, the amount of curvature for the modified version of the calibration image may be represented by a total curvature score, which may be, e.g., a sum of respective curvature scores for individual lines involved in the line fitting. In an embodiment, step 907 may involve optimizing respective estimated values of a plurality of distortion parameters so as to minimize a total curvature score for a modified version of the calibration image, wherein the modified version is generated based on the estimated values.

In step 909, the control circuit 111 may determine a second estimate of the first intrinsic camera parameter and a second estimate of the second intrinsic camera parameter based on the first estimate of the second intrinsic camera parameter. In an embodiment, the determination in step 909 is also based on the plurality of image pattern element locations and the defined pattern element locations. In step 909, the first estimate of the second intrinsic camera parameter may be used to refine the first estimate of the first intrinsic camera parameter, where the refined estimate is a second estimate of the first intrinsic camera parameter. As discussed above, because the second intrinsic camera parameter is estimated in a separate stage in step 907, this estimate of the second intrinsic camera parameter may be more accurate relative to a situation in which the first estimate of the first intrinsic camera parameter and the first estimate of the second intrinsic camera parameter are determined simultaneously in the same stage. In an embodiment, this more accurate estimate of the second intrinsic camera parameter may then be used to generate a better, updated estimate of the first intrinsic camera parameter, wherein the updated estimate is the second estimate of the first intrinsic camera parameter.

In an embodiment, Zhang's algorithm may be used in step 909. More specifically, Zhang's algorithm may accept, as an input, an initial guessed value for the second intrinsic camera parameter. The initial guessed value may be an optional input for Zhang's algorithm. In some instances, this optional input may not have been used in step 905. However, the optional input may be used in step 909, in which the first estimate of the second intrinsic camera parameter is applied as the initial guessed value for Zhang's algorithm, which may further use the plurality of image pattern element locations, and the defined pattern element locations, to generate the second estimate of the first intrinsic camera parameter. In an implementation, Zhang's algorithm may further generate a second estimate of the second intrinsic camera parameter, and may further output an estimate of a transformation function (e.g., $T_{CAMERA}^{PATTERN}$) that describes a relationship between a camera coordinate system and a pattern coordinate.

Steps 901-909 may be part of an intrinsic calibration phase of a camera calibration process. In an embodiment, the intrinsic calibration phase may further include a stage in which the control circuit determines uses the second estimate of the first intrinsic camera parameter and the second estimate of the second intrinsic camera parameter to determine a simulated location of a pattern element, and adjusts those estimates to generate a third estimate which minimizes a difference between the simulated location and an actual location of the pattern element.

More specifically, the control circuit may determine a third estimate of the second intrinsic camera parameter and a third estimate of the first intrinsic camera parameter by: (a) determining a simulated calibration image, which is a simulated image of the calibration pattern, based on the estimate of the first transformation function, on the second estimate of the second intrinsic camera parameter, and on the second estimate of the first intrinsic camera parameter, (b) determining a difference between the simulated calibration image and the calibration image captured by the camera, (c) adjusting the second estimate of the second intrinsic camera parameter and the second estimate of the first intrinsic camera parameter based on the difference so as to generate an adjusted estimate of the second intrinsic camera parameter and an adjusted estimate of the first intrinsic camera parameter that reduces the difference, wherein the adjusted estimate of the second intrinsic camera parameter is the third estimate thereof, and the adjusted estimate of the first intrinsic camera parameter is the third estimate thereof.

In an embodiment, the simulated calibration image may include simulated pixel coordinates $[u_{simulated}\ v_{simulated}]^T$ of various pattern elements. A simulated pixel coordinate for a pattern element may be a predicted pixel coordinate that predicts where the pattern will appear based on respective estimates intrinsic camera parameters and of, e.g., $T_{CAMERA}^{PATTERN}$. For instance, the simulated pixel coordinates may be based on the relationship $$\begin{bmatrix} X_{simulated} \\ Y_{simulated} \\ Z_{simulated} \\ 1 \end{bmatrix}_{Camera} = T_{CAMERA}^{PATTERN} \begin{bmatrix} X' \\ Y' \\ Z' \\ 1 \end{bmatrix}_{Pattern}$$

$$\hat{X} = d_x\left(\frac{X}{Z}, \frac{Y}{Z}\right),\ \hat{Y} = d_y\left(\frac{X}{Z}, \frac{Y}{Z}\right)$$

$$\begin{bmatrix} u_{simulated} \\ v_{simulated} \\ 1 \end{bmatrix} = K \begin{bmatrix} \hat{X} \\ \hat{Y} \\ 1 \end{bmatrix}$$

In the above example, K may be the second estimate the first intrinsic camera parameter, and may be adjusted to find the third estimate thereof. The distortion functions $d_x$ and $d_y$ may be based on the second estimate of the second intrinsic camera parameter(s), which may be adjusted to find the third estimate thereof. Further, $T_{CAMERA}^{PATTERN}$ may be an estimate that is obtained from step 909, while $[X'\ Y'\ Z']_{Pattern}$ is a known coordinate of a pattern element in the pattern coordinate system.

In the above example, the control circuit 111 may compute a distance between a respective simulated pixel coordinate and an actual pixel coordinate, wherein the simulated pixel coordinate represents a pattern element at $[X'\ Y'\ Z']_{Pattern}$ appears in the simulated calibration image, and the actual pixel coordinate represents where the pattern element actually appears in the calibration image captured by the camera. The control circuit 111 may perform optimization by adjusting the second estimate of the first intrinsic camera parameter (projection matrix K), the estimate of the second intrinsic camera parameter(s) (e.g., a distortion parameter(s)), and the estimate of $T_{CAMERA}^{PATTERN}$ until the distances are minimized (e.g., closer to zero). The adjusted estimates for these parameters may become the third estimate thereof. In an embodiment, the third estimate of the first intrinsic camera parameter may be a final estimate of the first intrinsic camera parameter, and the third estimate of the second intrinsic camera parameter may be a final estimate of the second intrinsic camera parameter, such that an output of the intrinsic calibration phase may be the third estimates of the first intrinsic camera parameter and the second intrinsic camera parameter.

As stated above, the camera calibration may include a stereo calibration phase in addition to the intrinsic calibration phase. For instance, in a system involving more than one camera, such as system 100A, in which the robot control system 110 is configured to communicate with a first camera and a second camera. The first camera may have a first camera coordinate system that is defined with respect to a location and orientation of the first camera, and the second camera may have a second camera coordinate system that is defined with respect to a location and orientation of the second camera. In this instance, the control circuit 111 of the robot control system 110 may be configured to perform the stereo calibration phase by determining a function (e.g., a matrix) that describes a relationship between the first camera coordinate system and the second camera coordinate system.

For example, if the robot control system 110 is in communication with multiple cameras, the robot control system 110 may be configured to estimate values of intrinsic camera parameters for each of the multiple cameras, and to estimate locations of the multiple cameras relative to each other, and/or their orientations relative to each other. In an embodiment, the relative locations and orientations between two cameras (e.g., 170 and 180 of FIG. 1A) may be expressed as a translation vector and rotation matrix between the two cameras.

As stated above, the camera calibration may involve a hand-eye calibration phase. For instance, in step 911, the control circuit 111 may determine, based on the second estimate of the first intrinsic camera parameter and the second estimate of the second intrinsic camera parameter, an estimate of a transformation function (e.g., $T_{World}^{Camera}$) that describes a relationship between a camera coordinate system and a world coordinate system. As stated above, the camera coordinate system may be a coordinate system defined with respect to a location and orientation of the camera, and the world coordinate system is a coordinate system defined with respect to a location that is stationary relative to the base of the robot. Step 911 may be directly based on the second estimates of the intrinsic camera parameters, or may be indirectly based on them. For instance, step 911 may be directly based on the third estimate of the first intrinsic camera parameter and the third estimate of the second intrinsic camera parameter, which are in turn based on the second estimate of the first intrinsic camera parameter and the second estimate of the second intrinsic camera parameter. In such an instance, step 911 is indirectly based on the second estimates of the intrinsic camera parameters.

In an embodiment, $T_{CAMERA}^{PATTERN}$ may be an example a first transformation function, and $T_{WORLD}^{CAMERA}$ may be an example of a second transformation function. In some instances, the second transformation function may be determined based on the first transformation function.

In a more specific instance, an objective of the hand-eye calibration may be to determine $T_{WORLD}^{CAMERA}$ and $T_{LINK}^{PATTERN}$ (which may be an example of a fourth transformation function) based on $T_{CAMERA}^{PATTERN}$ and $T_{WORLD}^{LINK}$ (which may be an example of a third transformation function).

In an embodiment, the hand-eye calibration may be based on the relationship:

$$T_{WORLD}^{LINK} T_{LINK}^{PATTERN} = T_{WORLD}^{CAMERA} T_{CAMERA}^{PATTERN}$$

In the above example, $T_{WORLD}^{LINK}$ and $T_{CAMERA}^{PATTERN}$ may be known or determined at a beginning of the hand-eye calibration phase. For instance, $T_{WORLD}^{LINK}$ may be determined based on movement commands that the robot control system 110 has communicated to a robot (e.g., 150 of FIG. 1A). In one example, the movement commands may be motor commands that cause rotation of links that form a robot arm of the robot, and the $T_{WORLD}^{LINK}$ may be determined from the rotation caused by the motor commands. In an example, $T_{CAMERA}^{PATTERN}$ may be determined based on the projection matrix K estimated from the intrinsic calibration phase. For instance, $T_{CAMERA}^{PATTERN}$ is based on the relationship:

$$\begin{bmatrix} X \\ Y \\ Z \\ 1 \end{bmatrix}_{Camera} = T_{CAMERA}^{PATTERN} \begin{bmatrix} X' \\ Y' \\ Z' \\ 1 \end{bmatrix}_{Pattern}$$

In the above example, $[X\ Y\ Z]_{Camera}^T$ may be a coordinate in the camera's field of view of a pattern element, and may be estimated from a calibration image in which the pattern element appears, and from an estimate of the projection matrix and estimates of the distortion parameters. In some cases, $T_{CAMERA}^{PATTERN}$ may be estimated using the perspective-n-point algorithm, which may use an estimate of a projection matrix and an estimate of a distortion parameter(s) of a camera to determine $T_{CAMERA}^{PATTERN}$. Such estimates of the projection matrix and distortion parameter(s) may be from the intrinsic calibration phase, or may be defined values from a manufacturer of the camera. In another example, $T_{CAMERA}^{PATTERN}$ may itself be a byproduct of the intrinsic calibration phase. For instance, if the intrinsic calibration phase uses Zhang's algorithm, the algorithm may output an estimate of $T_{CAMERA}^{PATTERN}$, and this estimate may be saved for the hand-eye calibration phase.

In an embodiment, the equation $T_{WORLD}^{LINK} T_{LINK}^{PATTERN} = T_{WORLD}^{CAMERA} T_{CAMERA}^{PATTERN}$ is nonlinear and non-convex for the unknown matrices $T_{WORLD}^{CAMERA}$ and $T_{LINK}^{PATTERN}$. The non-convex form may limit an effectiveness of iterating through different guesses for a value of the matrices, because the iteration may lead to a solution which is only locally optimal, rather than globally optimal. Thus, an implementation of the hand-eye calibration phase may involve reformulating the above equation into a convex form. In an embodiment, the reformulation may involve rewriting the above equation as a Kronecker product of vectorized matrices.

More specifically, the above equation may be rewritten as:

$$\begin{bmatrix} R_{WORLD}^{LINK} & t_{WORLD}^{LINK} \\ 0 & 1 \end{bmatrix} \begin{bmatrix} R_{LINK}^{PATTERN} & t_{LINK}^{PATTERN} \\ 0 & 1 \end{bmatrix} = \begin{bmatrix} R_{WORLD}^{CAMERA} & t_{WORLD}^{CAMERA} \\ 0 & 1 \end{bmatrix} \begin{bmatrix} R_{CAMERA}^{PATTERN} & t_{CAMERA}^{PATTERN} \\ 0 & 1 \end{bmatrix}$$

This equation may in turn be rewritten as two equations:

$$R_A R_X - R_Z R_B = 0$$

$$R_Z t_B - R_A t_X + t_Z = t_A$$

In the above equations, the nomenclature for the various rotation matrices and translation vector are written as follows:

$$R_A = R_{WORLD}^{LINK}, R_x = R_{LINK}^{PATTERN}, R_Z = R_{WORLD}^{CAMERA}, R_B = R_{CAMERA}^{PATTERN}$$

$$t_A = t_{WORLD}^{LINK}, t_x = t_{LINK}^{PATTERN}, t_Z = t_{WORLD}^{CAMERA}, t_B = t_{CAMERA}^{PATTERN}$$

The above equations may be rewritten as the following equation using vectorized versions of the above matrices and Kronecker products:

$$\begin{bmatrix} R_A \otimes I_3 & R_B^T \otimes I_3 & 0 & 0 \\ 0 & I_3 R_B^T \otimes t_B^T & -R_A & I_3 \end{bmatrix} \begin{bmatrix} vec(R_X) \\ vec(R_Z^T) \\ t_X \\ t_Z \end{bmatrix} = \begin{bmatrix} 0 \\ t_A \end{bmatrix}$$

In the above example, $I_3$ is a 3×3 identity matrix. The above equation is in linear and convex, which may facilitate solving for optimal values of $R_X$, $t_X$, $R_Z$, $t_Z$, i.e. $R_{LINK}^{PATTERN}$, $t_{LINK}^{PATTERN}$, $R_{WORLD}^{CAMERA}$, $t_{WORLD}^{CAMERA}$. More specifically, in the above equations, the terms $$\begin{bmatrix} R_A \otimes I_3 & R_B^T \otimes I_3 & 0 & 0 \\ 0 & I_3 R_B^T \otimes t_B^T & -R_A & I_3 \end{bmatrix} \text{ and } \begin{bmatrix} 0 \\ t_A \end{bmatrix}$$

may be known, because they include components belonging to $T_{WORLD}^{LINK}$ and $T_{CAMERA}^{PATTERN}$. Thus, the above equations may solve for $$\begin{bmatrix} vec(R_X) \\ vec(R_Z^T) \\ t_X \\ t_Z \end{bmatrix},$$

which is an unknown term. As stated above, the linear and convex nature of the equation may make it easier to solve for this unknown term, wherein a solution to the unknown term may be used to reconstruct $R_X$, $t_X$, $R_Z$, $t_Z$, which are components of $T_{WORLD}^{LINK}$ and $T_{CAMERA}^{PATTERN}$.

In an embodiment, the solution to the above equation may lead to a $R_X$ and $R_Z$ that are not perfect rotational matrices, because they may each comprise column vectors that are not orthogonal to each other. In this embodiment, the control circuit 111 may derive, from $R_X$, a matrix $R_X^*$ that does have column vectors that are orthogonal to each other. Similarly, the control circuit 111 may derive, from $R_Z$, a rotation matrix $R_Z^*$ that does have column vectors which are orthogonal to each other. In an embodiment, the control circuit 111 may perform this operation based on solving an Orthogonal Procrustes problem, which involves finding the nearest orthogonal matrix $R_X^*$ to a non-orthogonal matrix $R_X$ (in terms of Frobenius norm), and finding the nearest orthogonal matrix $R_Z^*$ to a non-orthogonal matrix $R_Z$. In some cases, this may be done via singular value decomposition, which may involve finding matrices $C_X$ and $D_X$ such that $C_X \Sigma D_X^T$ is equal to $R_X$, and finding matrices $C_Z$ and $D_Z$ such that $C_Z \Sigma D_Z^T$ is equal to $R_z$, wherein $\Sigma$ is a diagonal matrix. In this embodiment, $R_X^*$ may be determined as $C_X D_X^T$, and $R_Z^*$ may be determined as $C_Z D_Z^T$.

In an embodiment, the control circuit 111 may use the orthogonal matrices $R_X^*$ and $R_Z^*$ to further update the translation vectors $t_X$ and $t_Z$. The updated translation vectors may be referred to as $t_X^*$ and $t_Z^*$. In some implementations, the update may be done by using the above equation $R_Z t_B - R_A t_X + t_Z = t_A$, but substituting $R_Z^*$ for $R_Z$, $t_X^*$ for $t_X$, and $t_Z^*$ for $t_Z$. The resulting equation may be expressed as $R_Z^* t_B - R_A t_X^* + t_Z^* = t_A$, which may be rewritten as $$[-R_A\ \ I_3] \begin{bmatrix} t_X^* \\ t_Z^* \end{bmatrix} = t_A - R_Z^* t_B.$$

The above equation may be solved for $t_X^*$ and $t_Z^*$. The resulting rotation matrices and translation vectors may form an estimate of $T_{LINK}^{PATTERN}$ and $T_{WORLD}^{CAMERA}$, which may be expressed as:

$$T_{LINK}^{PATTERN} = T_X = \begin{bmatrix} R_X^* & t_X^* \\ 0 & 1 \end{bmatrix}$$

$$T_{WORLD}^{CAMERA} = T_Z = \begin{bmatrix} R_Z^* & t_Z^* \\ 0 & 1 \end{bmatrix}$$

In an embodiment, the hand-eye calibration phase may involve using the above parameters to determine a simulated calibration image, which is a simulated image of a calibration pattern, and adjusting values of the above parameters so as to minimize a difference between the simulated calibration and an actual calibration image, which is an actual image of the calibration pattern. More specifically, the control circuit 111 may determine a simulated calibration image of the calibration pattern based on the estimate of the fourth transformation function (e.g., $T_{LINK}^{PATTERN}$) on the estimate of the third transformation function (e.g., $T_{WORLD}^{LINK}$), on the estimate of the second transformation function (e.g., $T_{WORLD}^{CAMERA}$), and based on (directly or indirectly) the second estimate of the first intrinsic camera parameter (e.g., projection matrix K). The simulated calibration image may be represented by, e.g., pixel coordinates $[\tilde{u}_{sim} \; \tilde{v}_{sim}]^T$ of where pattern elements appear in the simulated calibration image. The pixel coordinates may be simulated coordinates, wherein a simulated coordinate for a pattern element may be a predicted coordinate that predicts where the pattern element will appear in a calibration image that is based on respective estimates of the above transformation functions. For instance, the simulated pixel coordinates may be calculated based on the relationship:

$$\begin{bmatrix} X \\ Y \\ Z \\ 1 \end{bmatrix}_{Camera} =$$

$$T_{CAMERA}^{PATTERN} \begin{bmatrix} X' \\ Y' \\ Z' \\ 1 \end{bmatrix}_{Pattern} = (T_{WORLD}^{CAMERA})^{-1} T_{WORLD}^{LINK} T_{LINK}^{PATTERN} \begin{bmatrix} X' \\ Y' \\ Z' \\ 1 \end{bmatrix}_{Pattern}$$

$$\begin{bmatrix} \tilde{u}_{sim} \\ \tilde{v}_{sim} \\ 1 \end{bmatrix} = K \begin{bmatrix} X/Z \\ Y/Z \\ 1 \end{bmatrix}_{CAMERA}$$

In an embodiment, the simulated calibration image does not need to account for an effect of lens distortion. In another embodiment, the simulated calibration image does account for an effect of lens distortion, such as by applying the distortion function to X/Z and Y/Z.

In an embodiment, the simulated calibration image may be compared against a modified version of the actual calibration image captured by the camera. The modified version may compensate against distortion caused by the lens of the camera. More specifically, the actual calibration image may be represented by pixel coordinates $[u, v]^T$ of the pattern elements, and may exhibit lens distortion. The modified version of the calibration image may be represented by pixel coordinates $[\tilde{u} \; \tilde{v}]^T$ of the pattern elements, and may compensate against an effect of the lens distortion. As stated above, the modified version of the calibration image may be determined based on the relationship:

$$\begin{bmatrix} X' \\ Y' \\ 1 \end{bmatrix} = K^{-1} \begin{bmatrix} u \\ v \\ 1 \end{bmatrix}$$

$$\tilde{X} = d_x^{-1}(\hat{X}, \hat{Y})$$

$$\tilde{Y} = d_y^{-1}(\hat{X}, \hat{Y})$$

$$\begin{bmatrix} \tilde{u} \\ \tilde{v} \\ 1 \end{bmatrix} = K \begin{bmatrix} \tilde{X} \\ \tilde{Y} \\ 1 \end{bmatrix}$$

In an embodiment, the control circuit 111 may determine a difference between simulated pixel coordinates of pattern elements in the simulated calibration image and pixel coordinates of corresponding pattern elements in the modified version of the calibration image captured by the camera (e.g., between $[\tilde{u}_{sim} \; \tilde{v}_{sim}]^T$ and $[\tilde{u} \; \tilde{v}]^T$). In an embodiment, the difference may be expressed as a distance, which is determined as $$\text{distance} = \sqrt{(\tilde{u}_{sim} - \tilde{u})^2 + (\tilde{v}_{sim} - \tilde{v})^2}$$

In an embodiment, the control circuit 111 may adjust at least the estimate of the fourth transformation function (e.g., $T_{LINK}^{PATTERN}$) and the estimate of the second transformation function (e.g., $T_{WORLD}^{CAMERA}$) to reduce the difference between the simulated calibration image and the modified version of the calibration image. For instance, the control circuit 111 may adjust respective values of components of $T_{LINK}^{PATTERN}$ and $T_{WORLD}^{CAMERA}$, recalculate $[\tilde{u}_{sim} \; \tilde{v}_{sim}]^T$ based on the adjusted matrices, and determine the distance based on the recalculated $[\tilde{u}_{sim} \; \tilde{v}_{sim}]^T$. The control circuit 111 may repeat the adjustment in a manner that minimizes the above distance. In an embodiment, the control circuit 111 may adjust the above matrices to minimize an error in the simulated calibration image, where the error may be a sum of the respective distances between (a) respective pixel coordinates of all pattern elements in the modified version of the calibration image and (b) respective pixel the same corresponding pattern elements in the simulated calibration image. In an embodiment, the adjustment may be based on an optimization algorithm for solving unconstrained nonlinear optimization problems, such as the Nelder-Mead algorithm, the Broyden-Fletcher-Goldfarb-Shanno (BFGS) algorithm, and the gradient descent algorithm. In an embodiment, the above optimization may also involve adjustments to respective values of $T_{CAMERA}^{PATTERN}$, and/or one or more distortion parameters. In an embodiment, a result of the optimization may be a final estimate for the hand-eye calibration phase (e.g., a final estimate of $T_{LINK}^{PATTERN}$ and/or $T_{WORLD}^{CAMERA}$).

Returning to FIG. 9, method 900 may involve a step 913 that is performed after step 911. In step 913, the control circuit 111 may receive a subsequent image from the camera, and to control placement of the robot arm by outputting to the robot (e.g., via the communication interface 113) a subsequent movement command that is based on the subsequent image and based on the estimate of the transformation function. For instance, the subsequent image may be an image of a package on a conveyor belt or of another object in the camera field of view. The camera may capture the subsequent image automatically, or in response to a camera command generated by the control circuit 111 and communicated to the camera via the communication interface. In an embodiment, the control circuit 111 may generate the subsequent movement command based on the estimate of the transformation function (e.g., $T_{WORLD}^{CAMERA}$). For instance, $T_{WORLD}^{CAMERA}$ may be used to determine a relationship between a photographed object (e.g., the package) and a robot that will interact with the object, based on the relationship:

$$T_{WORLD}^{OBJECT} = T_{WORLD}^{CAMERA} T_{CAMERA}^{OBJECT}$$

In the above equation, $T_{WORLD}^{CAMERA}$ is determined from the camera calibration, and $T_{CAMERA}^{OBJECT}$ may in some cases be determined from a machine vision algorithm. Because the camera calibration discussed herein produces more accurate calibration information, such as a more accurate estimate of $T_{WORLD}^{CAMERA}$, the calibration information may yield a more accurate estimate of $T_{WORLD}^{OBJECT}$, which may allow the robot to be controlled in a manner that provides more robust interaction with the object.

Figure 11A:
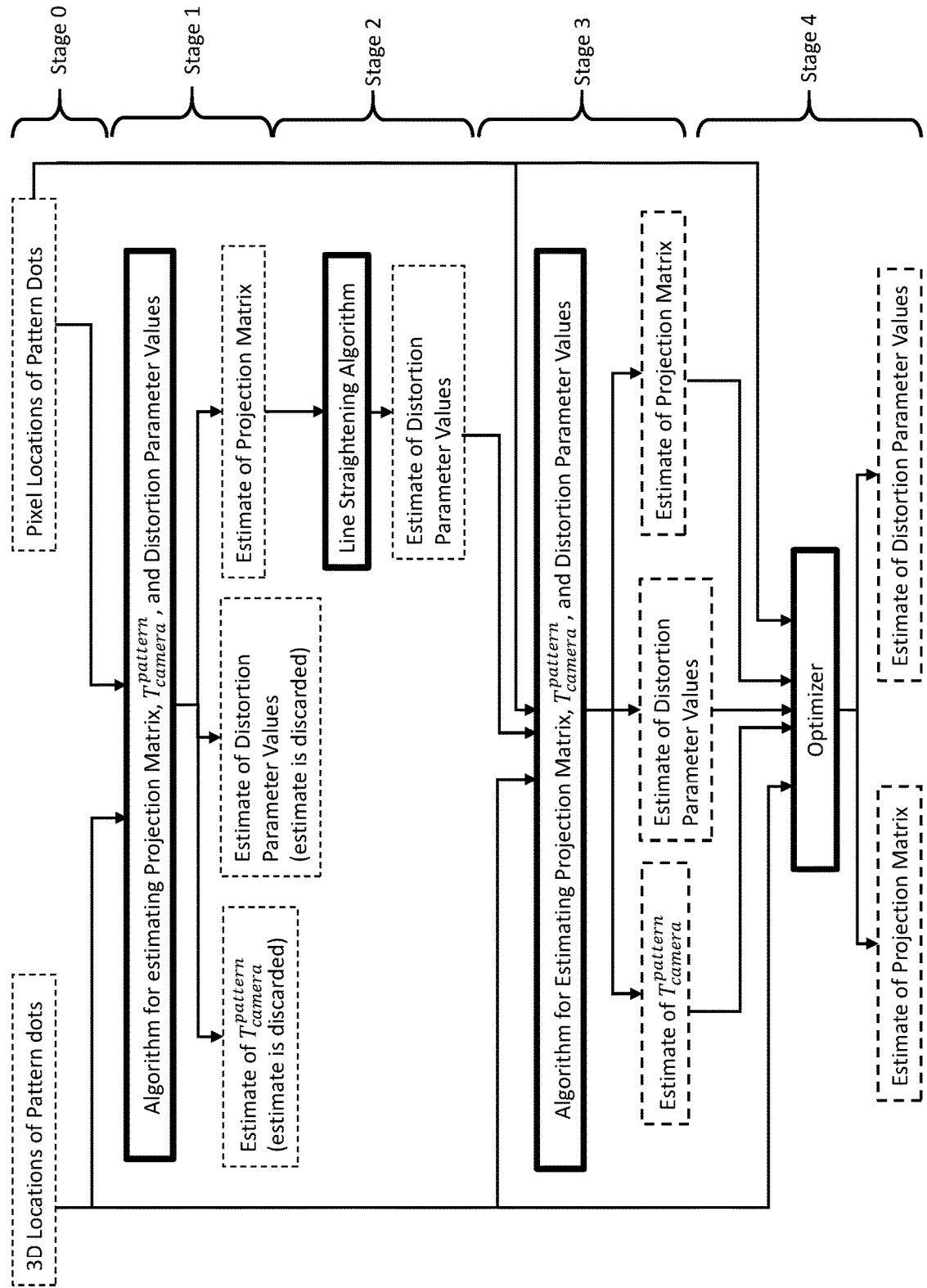
FIGS. 11A and 11B provide diagrams that illustrates examples of an intrinsic calibration phase of camera calibration, according to embodiments herein.

FIG. 11A provides another diagram that illustrates an embodiment of an intrinsic calibration phase of camera calibration. In some cases, the operation in FIG. 11A may be performed by, e.g., the control circuit 111 of FIG. 1A of the robot control system 110 of FIG. 1A. In an embodiment, the intrinsic calibration phase involves a stage 0 in which a plurality of calibration images is received, wherein the calibration images are images of a calibration pattern. The calibration pattern may be fixedly attached to a robot arm of a robot, and may have pattern elements that are pattern dots. Each of the pattern dots may have a defined pattern element location, which may be a 3D pattern coordinate $[X'\ Y'\ Z']_{Pattern}^T$, pattern in this example. For each calibration image of the plurality of calibration images, each of the pattern dots may also have an image pattern element location (also referred to as a captured pattern element location), which may be a 2D pixel coordinate in this example. In an embodiment, stage 0 of the intrinsic calibration phase involves determining the respective 3D pattern coordinates of the pattern dots in the pattern coordinate system and determining the 2D pixel coordinates at which the pattern dots appear in the plurality of calibration images.

In an embodiment, stage 1 of the intrinsic calibration phase involves inputting the 3D pattern coordinates and the 2D pixel coordinates of the pattern dots an algorithm for estimating a projection matrix K, a transformation function $T_{CAMERA}^{PATTERN}$, and respective values for distortion parameters of a distortion function. For instance, stage 1 may use Zhang's algorithm to generate a first estimate of the projection matrix K. In this example, Zhang's algorithm or some other algorithm may also determine an estimate of $T_{CAMERA}^{PATTERN}$ and the respective values of the distortion parameters in the same stage, but these estimates may be discarded or otherwise ignored for the next stage. In an embodiment, Zhang's algorithm may have, as an optional input, one or more guessed values for one or more respective distortion parameters. In the example of FIG. 11A, however, this optional input is not used in stage 1.

In an embodiment, stage 2 of the intrinsic calibration phase involves inputting the first estimate of the projection matrix K into a line straightening algorithm, wherein the line straightening algorithm may generate a first estimate of a distortion parameter, or a first set of respective estimates of a set of distortion parameters. In an embodiment, the line straightening algorithm may involve operations that are discussed above with respect to step 907 of method 900 and with respect to FIGS. 10A and 10B.

In an embodiment, stage 3 of the intrinsic calibration phase involves using the first estimate of the distortion parameter (or the first set of respective estimates of multiple distortion parameters) to generate a second estimate of the projection matrix K, a second estimate of the distortion parameter (or a second set of respective estimates of the multiple distortion parameters), and an estimate of $T_{CAMERA}^{PATTERN}$. In some instances, Zhang's algorithm is used again in stage 3. This stage, however, may use the first estimate of the distortion parameter (or the first set of respective estimates of multiple distortion parameters) as the optional input discussed above, wherein the optional input may be a guess that results in a more accurate output from Zhang's algorithm.

In an embodiment, stage 4 of the intrinsic calibration phase involves determining a third estimate of the projection matrix and a third estimate of the distortion parameter (or third set of respective estimates for the multiple distortion parameters). As depicted in FIG. 11A, stage 4 may be performed with an optimizer. As discussed above, the optimization performed by the optimizer may involve determining a simulated calibration image of a calibration pattern based on the estimate of $T_{CAMERA}^{PATTERN}$, the second estimate of K, and the second estimate of the distortion parameter, and adjusting the second estimate to so as to minimize a difference between the simulated calibration image and an actual calibration image of the calibration pattern.

Figure 11B:
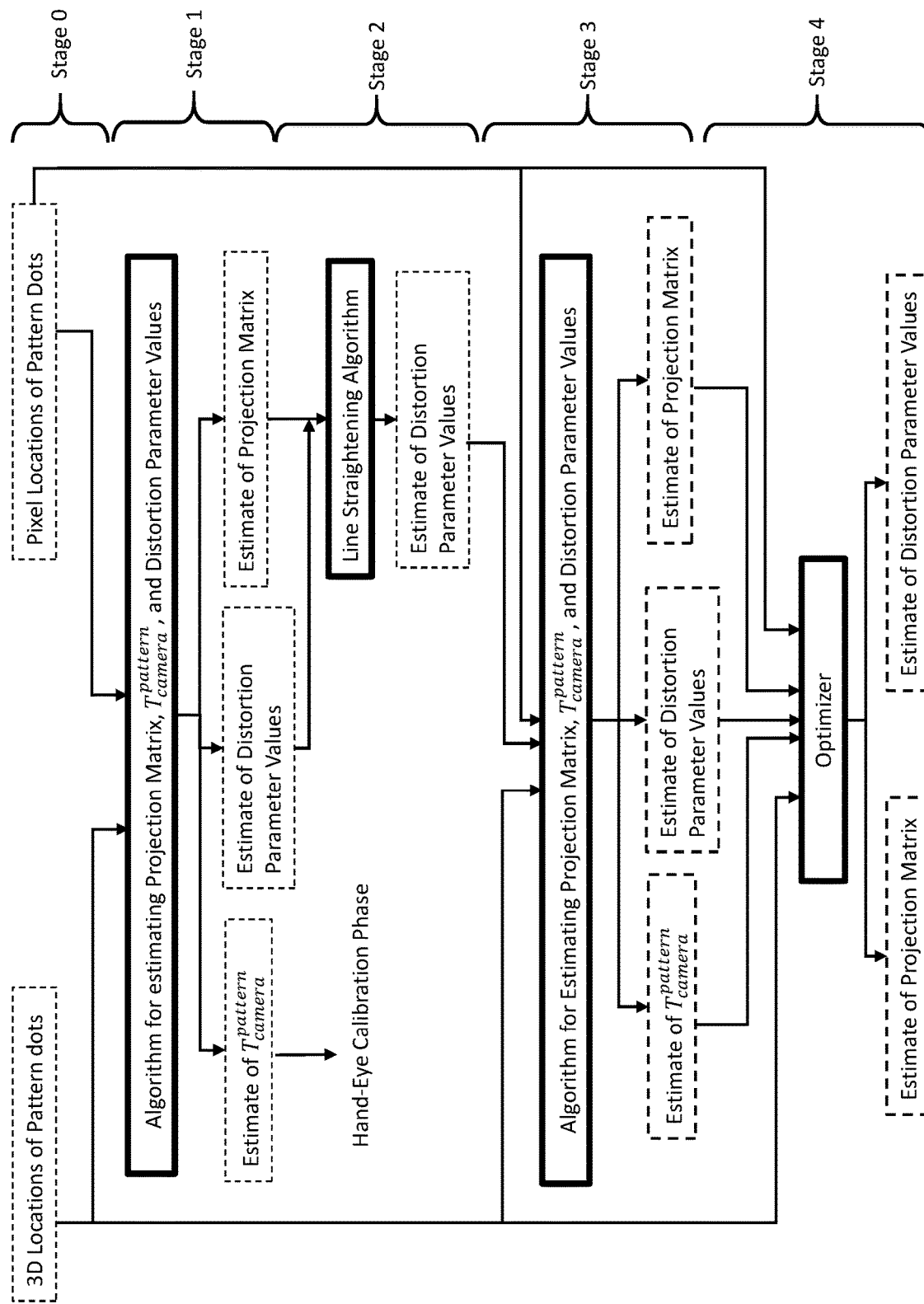

In the above embodiment of FIG. 11A, the estimate of $T_{CAMERA}^{PATTERN}$ and/or the respective values of the distortion parameters in stage 1 may be discarded or otherwise ignored for the next stages. In another embodiment, one or more of the above estimates may be used for any stage that follows stage 1. For instance, as illustrated in FIG. 11B, an estimate of the distortion parameter values in stage 1 may be used as an initial guess of the distortion parameter values in stage 2 of the intrinsic calibration phase. Further in FIG. 11B, an estimate of $T_{CAMERA}^{PATTERN}$ may be used to perform hand-eye calibration in stage 2 of the hand-eye calibration phase of FIG. 12.

Figure 12:
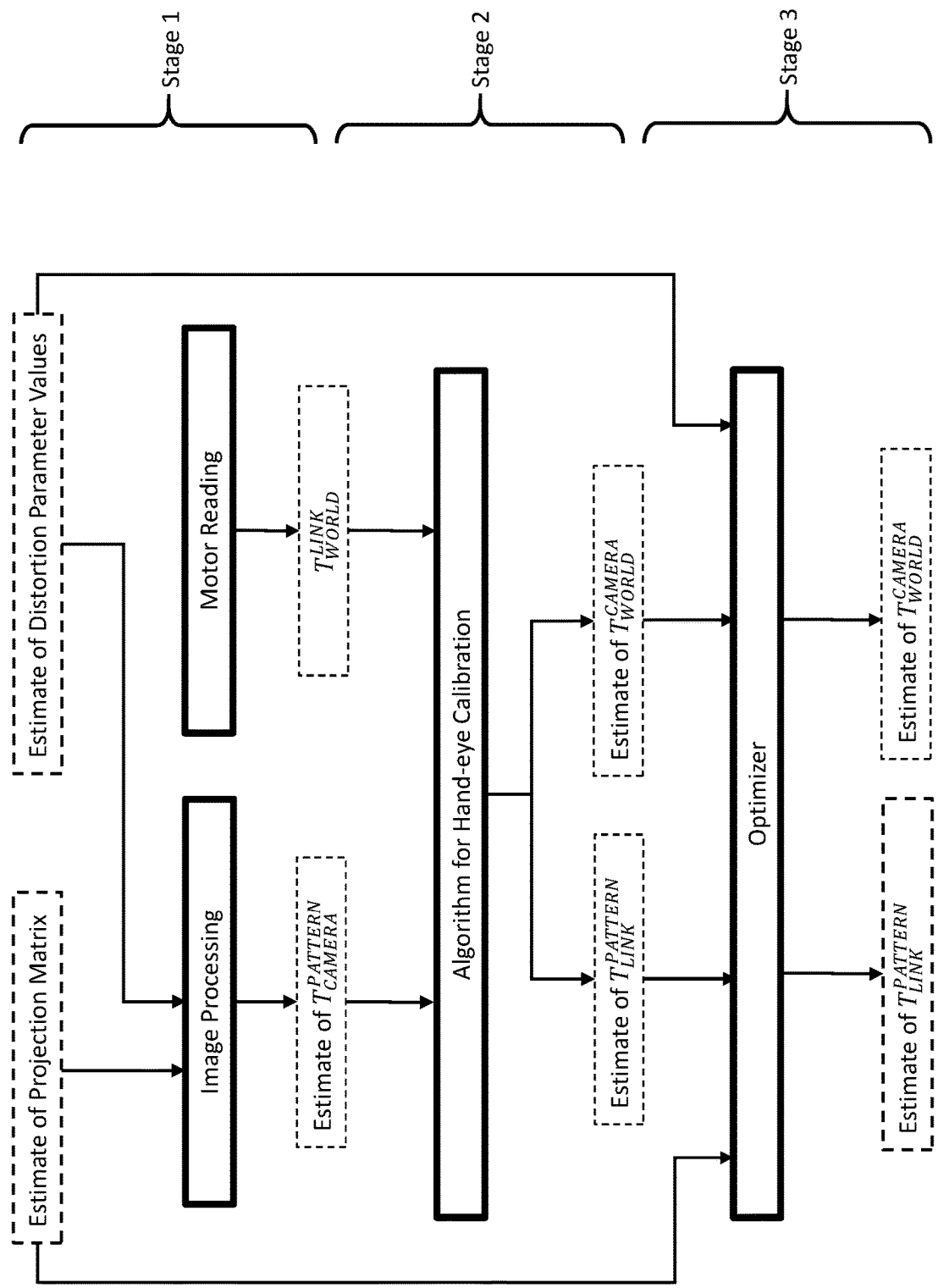
FIG. 12 provides a diagram that illustrates an example of a hand-eye calibration phase of camera calibration, according to an embodiment herein.

FIG. 12 provides a diagram that illustrates an example embodiment of a hand-eye calibration phase of camera calibration, and may also be performed by the robot control system 110 of FIG. 1A. In some cases, the hand-eye calibration phase is performed after the intrinsic calibration phase of FIG. 11A. In an embodiment, stage 1 of the hand-eye calibration phase involves determining an estimate of $T_{CAMERA}^{PATTERN}$ and $T_{WORLD}^{LINK}$. In some cases, $T_{WORLD}^{LINK}$ is based on a motor reading, which may include, e.g., sensor values that indicate respective amounts of rotation for a plurality of motors of a robot arm of the robot. In some cases, $T_{CAMERA}^{PATTERN}$ is based on an image processing algorithm, and may be based on a final estimate of the projection matrix K and a final estimate of the distortion parameter (or final set of estimates of the multiple distortion parameters). In one example, $T_{CAMERA}^{PATTERN}$ may be from stage 1 of the intrinsic calibration phase of FIG. 11B.

In an embodiment, stage 2 of the hand-eye calibration phase involves determining $T_{WORLD}^{CAMERA}$ and $T_{LINK}^{PATTERN}$. This determination may include, for instance, solving the equation $T_{WORLD}^{LINK} T_{LINK}^{PATTERN} = T_{WORLD}^{CAMERA} T_{CAMERA}^{PATTERN}$.

In an embodiment, stage 3 of the hand-eye calibration phase involves adjusting an estimate of at least $T_{WORLD}^{CAMERA}$ and $T_{LINK}^{PATTERN}$. This adjustment may be performed by an optimizer, which may perform an optimization based on minimizing a difference between a simulated calibration image of a calibration pattern and an actual calibration image of the calibration pattern. The simulated calibration image may be based on $(T_{WORLD}^{CAMERA})^{-1} T_{WORLD}^{LINK} T_{LINK}^{PATTERN} [X'Y'Z']_{PATTERN}^{T}$, as discussed above. In an embodiment, the adjusted estimate of $T_{WORLD}^{CAMERA}$ and $T_{LINK}^{PATTERN}$ may be a final estimate thereof of the hand-eye calibration phase.

Concise Description of Various Embodiments

Embodiment A1 of the present disclosure relates to a robot control system comprising a communication interface and a control circuit. The communication interface is configured to communicate with a robot and with a camera having a camera field of view, wherein the robot has a base and a robot arm with a calibration pattern disposed thereon. The control circuit is configured to perform camera calibration by: a) determining all corner locations of an imaginary cube that fits within the camera field of view, b) determining a plurality of locations that are distributed on or throughout the imaginary cube, c) controlling the robot arm to move the calibration pattern to the plurality of locations that are distributed on or throughout the imaginary cube by outputting movement commands to the robot via the communication interface, d) receiving a plurality of calibration images from the camera via the communication interface, wherein the plurality of calibration images are captured by the camera, and are respective images of the calibration pattern at the plurality of locations, e) determining respective estimates of intrinsic camera parameters based on the plurality of calibration images, and f) determining, based on the respective estimates of the intrinsic camera parameters: an estimate of a transformation function that describes a relationship between a camera coordinate system and a world coordinate system, wherein the camera coordinate system is a coordinate system defined with respect to a location and orientation of the camera, and the world coordinate system is a coordinate system defined with respect to a location that is stationary relative to the base of the robot. The control circuit is further configured, after the camera calibration is performed, to receive a subsequent image from the camera via the communication interface, and to control placement of the robot arm by outputting to the robot, via the communication interface, a subsequent movement command that is based on the subsequent image and based on the estimate of the transformation function.

Embodiment A2 includes the robot control system of embodiment A1, wherein the plurality of locations are uniformly distributed on or throughout the imaginary cube.

Embodiment A3 includes the robot control system of embodiment A2, wherein the plurality of locations have uniform spacing, as measured along an edge of the imaginary cube, between immediately neighboring locations of the plurality of locations.

Embodiment A4 includes the robot control system of any one of embodiments A1-A3, wherein the control circuit is configured to control the robot arm to move the calibration pattern to the plurality of locations in response to a determination that the robot arm is able to move the calibration pattern to all corner locations of the imaginary cube.

Embodiment A5 includes the robot control system of embodiment A4, wherein the control circuit is configured to control the robot arm to move the calibration pattern to the plurality of locations only in response to: (a) the determination that the robot arm is able to move the calibration pattern to all corner locations of the imaginary cube, and (b) a determination that the robot arm is able, at each corner location of all corner locations of the imaginary cube, to tilt the calibration pattern to an angle that is within a defined range of angles relative to the camera.

Embodiment A6 includes the robot control system of embodiment A5, wherein the imaginary cube is a second imaginary cube determined by the control circuit. In this embodiment, the control circuit is further configured to determine a first imaginary cube that fits within the camera field of view. The control circuit is further configured to determine that the robot arm is not able to move the calibration pattern to one or more corner locations of the first imaginary cube, or that the robot arm is not able, for one or more corner locations of the first imaginary cube, to tilt the calibration pattern to an angle that is within the defined range of angles relative to the camera. The control circuit is configured to determine all corner locations of the second imaginary cube in response to at least one of: (a) a determination that the robot arm is not able to move the calibration pattern to one or more corner locations of the first imaginary cube, or (b) the robot arm is not able, for one or more corner locations of the first imaginary cube, to tilt the calibration pattern to an angle that is within the defined range of angles relative to the camera.

Embodiment A7 includes the robot control system of embodiment A6, wherein the first imaginary cube is a maximum-sized imaginary cube that is able to fit within the camera field of view, and wherein the second imaginary cube is smaller than the first imaginary cube.

Embodiment A8 includes the robot control system of any one of embodiments A1-A7, wherein the plurality of locations include exactly $n^3$ locations, wherein n is an integer that is equal to or greater than 2.

Embodiment A9 includes the robot control system of any one of embodiments A1-A8, wherein the control circuit is configured to control the robot arm, via the movement commands, to tilt the calibration pattern to different respective angles relative to the camera for the plurality of locations that are uniformly distributed on or throughout the imaginary cube, such that the plurality of respective calibration images capture the calibration pattern at different respective angles relative to the camera.

Embodiment A10 includes the robot control system of any one of embodiments A1-A9, wherein the calibration pattern includes a plurality of pattern elements, and wherein the control circuit is configured, to receive a first calibration image from the camera before the plurality of calibration images are received, wherein the first calibration image is an image of the calibration pattern and is captured by the camera before the plurality of respective calibration images are captured. The control circuit is further configured to determine a level of intensity and a level of contrast of at least one of the pattern elements in the first calibration image, and to determine respective values of an exposure parameter and a focus parameter of the camera based on at least one of the level of intensity and the level of contrast of at least one of the pattern elements in the first calibration image. The plurality of respective calibration images are captured by the camera with the respective values of the exposure parameter and the focus parameter.

Embodiment A11 includes the robot control system of any one of embodiments A4-A10, wherein the control circuit is configured to determine the plurality of locations by dividing the imaginary cube into a plurality of non-overlapping regions, and by assigning a respective location of the plurality of locations to be in each region of the plurality of non-overlapping regions.

Embodiment A12 includes the robot control system of any one of embodiments A4-A11, wherein the control circuit is configured to determine the plurality of locations over a series of iterations, wherein a first location of the plurality of locations is determined as any location within the imaginary cube, and is determined during a first iteration of the series of iterations, wherein the imaginary cube forms a first region used to perform the first iteration. In this embodiment, respective locations for the remaining iterations are determined by performing the following for each of the remaining iterations: (a) dividing a region used to perform a previous iteration into a first half region and a second half region that do not overlap with each other, wherein each of the first half region and the second half region is a region used to perform a current iteration, (b) determining which of the first half region and the second half region contains a previous location, wherein the previous location is a respective location of the plurality of locations determined in the previous iteration, (c) and determining any location within the other of first half region and the second half region as a current location, wherein the current location is a location of the plurality of locations that is determined for the current iteration.

Embodiment A13 relates to a method for performing robot control. In this embodiment, the method comprises a) determining, by a robot control system, information indicative of a camera field of view, wherein the robot control system includes a communication interface configured to communicate with a camera, and with a robot having a base, a robot arm, and a calibration pattern disposed on the robot arm, wherein the camera field of view is a field of view of the camera; b) determining, by the robot control system, all corner locations of an imaginary cube that fits within the camera field of view; c) determining, by the robot control system, a plurality of locations that are distributed on or throughout the imaginary cube; d) outputting, by the robot control system, movement commands to the communication interface, wherein the communication interface is configured to communicate the movement commands to the robot to cause the robot arm to move the calibration pattern to the plurality of locations that are distributed on or throughout the imaginary cube; e) receiving, by the robot control system, a plurality of calibration images from the communication interface, wherein the communication interface is configured to receive the plurality of calibration images from the camera, and wherein the plurality of calibration images are captured by the camera and are a plurality of respective images of the calibration pattern at the plurality of locations; f) determining, by the robot control system, respective estimates of intrinsic camera parameters based on the plurality of calibration images; g) determining, by the robot control system, based on the respective estimates of the intrinsic camera parameters, an estimate of a transformation function that describes a relationship between a camera coordinate system and a world coordinate system, wherein the camera coordinate system is a coordinate system defined with respect to a location and orientation of the camera that the communication interface is configured to communicate with, and the world coordinate system is a coordinate system defined with respect to a location that is stationary relative to the base of the robot that the communication interface is configured to communicate with; h) receiving, by the robot control system, a subsequent image from the communication interface, wherein the communication interface is configured to receive the subsequent image from the camera after determining the respective estimates of the intrinsic camera parameters and the estimate of the transformation function; i) generating, by the robot control system, a subsequent movement command based on the subsequent image and based on the estimate of the transformation function; and j) outputting, by the robot control system, the subsequent movement command to the communication interface, wherein the communication interface is configured to communicate the subsequent movement command to the robot to control placement of the robot arm.

Embodiment A14 relates to a non-transitory computer-readable medium having instructions stored thereon that, when executed by a control circuit of a robot control system, causes the control circuit to perform camera calibration by: a) determining information indicative of a camera field of view, wherein the robot control system includes a communication interface configured to communicate with a camera, and with a robot having a base, a robot arm, and a calibration pattern disposed on the robot arm, wherein the camera field of view is a field of view of the camera, b) determining all corner locations of an imaginary cube that fits within the camera field of view, c) determining a plurality of locations that are distributed on or throughout the imaginary cube, d) outputting movement commands to the communication interface, wherein the communication interface is configured to communicate the movement commands to the robot to cause the robot arm to move the calibration pattern to the plurality of locations that are distributed on or throughout the imaginary cube, e) receiving a plurality of calibration images from the communication interface, wherein the communication interface is configured to receive the plurality of calibration images from the camera, and wherein the plurality of calibration images are captured by the camera and are a plurality of respective images of the calibration pattern at the plurality of locations, f) determining respective estimates of intrinsic camera parameters based on the plurality of calibration images, g) determining, based on the respective estimates of the intrinsic camera parameters, an estimate of a transformation function that describes a relationship between a camera coordinate system and a world coordinate system, wherein the camera coordinate system is a coordinate system defined with respect to a location and orientation of the camera that the communication interface is configured to communicate with, and the world coordinate system is a coordinate system defined with respect to a location that is stationary relative to the base of the robot that the communication interface is configured to communicate with. The instructions, when executed by the control circuit, further cause the control circuit to receive a subsequent image from the communication interface, wherein the communication interface is configured to receive the subsequent image from the camera after determining the respective estimates of the intrinsic camera parameters and the estimate of the transformation function. The control circuit is also configured to control placement of the robot arm by outputting, to the robot via the communication interface, a subsequent movement command that is based on the subsequent image and based on the estimate of the transformation function.

Embodiment B1 relates to a robot control system comprising a communication interface and a control circuit. The communication interface is configured to communicate with: a robot having a base and a robot arm with a calibration pattern disposed thereon, and a camera having a camera field of view. The calibration pattern includes a plurality of pattern elements having respective defined pattern element locations in a pattern coordinate system, wherein the pattern coordinate system is a coordinate system defined with respect to a location and orientation of the calibration pattern. The control circuit is configured to perform camera calibration by: a) controlling the robot arm to move the calibration pattern to at least one location within the camera field of view by outputting a movement command to the robot via the communication interface, b) receiving a calibration image from the camera via the communication interface, wherein the calibration image is captured by the camera and is an image of the calibration pattern at the at least one location, c) determining a plurality of image pattern element locations that indicate respective locations at which the plurality of pattern elements appear in the calibration image, d) determining a first estimate of a first intrinsic camera parameter based on the plurality of image pattern element locations and based on the defined pattern element locations, e) after the first estimate of the first intrinsic camera parameter has been determined, determining a first estimate of a second intrinsic camera parameter based on the first estimate of the first intrinsic camera parameter and based on the plurality of image pattern element locations, f) determining a second estimate of the first intrinsic camera parameter and a second estimate of the second intrinsic camera parameter based on the first estimate of the second intrinsic camera parameter, and based on the plurality of image pattern element locations and the defined pattern element locations, and g) determining, based on the second estimate of the first intrinsic camera parameter and the second estimate of the second intrinsic camera parameter, an estimate of a transformation function that describes a relationship between a camera coordinate system and a world coordinate system, wherein the camera coordinate system is a coordinate system defined with respect to a location and orientation of the camera, and the world coordinate system is a coordinate system defined with respect to a location that is stationary relative to the base of the robot. The control circuit is further configured, after the camera calibration is performed, to receive a subsequent image from the camera, and to control placement of the robot arm by outputting to the robot a subsequent movement command that is based on the subsequent image and based on the estimate of the transformation function.

Embodiment B2 includes the robot control system of embodiment B1, wherein the transformation function is a second transformation function, and wherein the control circuit is configured to perform the camera calibration by further determining, based on the second estimate of the first intrinsic camera parameter and the second estimate of the second intrinsic camera parameter, an estimate of a first transformation function that describes a relationship between the pattern coordinate system and the camera coordinate system, wherein the second transformation function is determined based on the first transformation function.

Embodiment B3 includes the robot control system of embodiment B1 or B2, wherein the camera comprises a lens and an image sensor, and wherein the first intrinsic camera parameter is a projection matrix that describes image projection onto the image sensor, and wherein the second intrinsic camera parameter is distortion parameter that describes distortion caused by the lens.

Embodiment B4 includes the robot control system of any one of embodiments B1-B3. In this embodiment, the control circuit is configured to determine the first estimate of the second intrinsic camera parameter by: (a) determining an initial estimate of the second intrinsic camera parameter, (b) generating, based on the initial estimate of the second intrinsic camera parameter, on the first estimate of the first intrinsic camera parameter, and on the calibration image, a modified version of the calibration image that compensates against the distortion caused by the lens, (c) determining an amount of curvature in the modified version of the calibration image, (d) adjusting the initial estimate of the second intrinsic camera parameter based on the amount of curvature in the modified version of the calibration image so as to generate an adjusted estimate of the second intrinsic camera parameter that reduces the amount of curvature, wherein the adjusted estimate is the first estimate of the second intrinsic camera parameter.

Embodiment B5 includes the robot control system of embodiment B4, wherein the plurality of pattern elements in the calibration pattern are a plurality of dots, and wherein the control circuit is configured to determine the amount of curvature by: fitting a plurality of straight lines through the plurality of dots in the modified version of the calibration image, and determining the amount of curvature based on respective distances between each straight line of the plurality of straight lines and respective dots of the plurality of dots through which the straight line is fitted.

Embodiment B6 includes the robot control system of any one of embodiments B2-B5. In this embodiment, the control circuit is further configured to determine a third estimate of the second intrinsic camera parameter and a third estimate of the first intrinsic camera parameter by: (a) determining a simulated calibration image, which is a simulated image of the calibration pattern, based on the estimate of the first transformation function, on the second estimate of the second intrinsic camera parameter, and on the second estimate of the first intrinsic camera parameter, (b) determining a difference between the simulated calibration image and the calibration image captured by the camera, (c) adjusting the second estimate of the second intrinsic camera parameter and the second estimate of the first intrinsic camera parameter based on the difference so as to generate an adjusted estimate of the second intrinsic camera parameter and an adjusted estimate of the first intrinsic camera parameter that reduces the difference, wherein the adjusted estimate of the second intrinsic camera parameter is the third estimate thereof, and the adjusted estimate of the first intrinsic camera parameter is the third estimate thereof. Further in this embodiment, the estimate of the first transformation function is determined based on the third estimate of the second intrinsic camera parameter and the third estimate of the first intrinsic camera parameter.

Embodiment B7 includes the robot control system of any one of embodiments B2 through B6, wherein the robot arm includes a link on which the calibration pattern is disposed. In this embodiment, the control circuit is configured to perform the camera calibration further by: determining an estimate of a third transformation function that describes a relationship between the world coordinate system and a link coordinate system, wherein the link coordinate system is a coordinate system defined with respect to a location on the link, and determining an estimate of a fourth transformation function that describes a relationship between the pattern coordinate system and the link coordinate system, wherein the estimate of the second transformation function and the estimate of the fourth transformation function are both determined based on the estimate of first transformation function and the estimate of third transformation function.

Embodiment B8 includes the robot control system of embodiment B7, wherein the control circuit is configured to perform the camera calibration further by: a) determining a simulated calibration image, which is a simulated image of the calibration pattern, based on the estimate of the fourth transformation function, on the estimate of the third transformation function, on the estimate of the second transformation function, and on the second estimate of the first intrinsic camera parameter, b) determining, based on the second estimate of the second intrinsic camera parameter, a modified version of the calibration image captured by the camera to compensate against distortion caused by the lens of the camera, c) determining a difference between the simulated calibration image and the modified version of the calibration image, and d) adjusting at least the estimate of the fourth transformation function and the estimate of the second transformation function to reduce the difference between the simulated calibration image and the modified version of the calibration image.

Embodiment B9 includes the robot control system of any one of embodiments B1 through B8, wherein the camera that the communication interface is configured to communicate with is a first camera and the camera coordinate system is a first camera coordinate system, and the communication interface is configured to communicate with a second camera. In this embodiment, the control circuit is configured to perform the camera calibration by further determining a relationship between the first camera coordinate system and a second camera coordinate system, wherein the second camera coordinate system is defined with respect to a location and orientation of the second camera.

Embodiment B10 relates to a method for performing robot control, the method comprising: a) generating, by a robot control system, a movement command for outputting to a communication interface of the robot control system, wherein the communication interface is configured to communicate with a robot having a base and a robot arm with a calibration pattern disposed thereon, and is configured to communicate with a camera having a camera field of view; b) outputting, by the robot control system, the movement command to the communication interface, wherein the communication interface is configured to communicate the movement command to the robot to cause the robot arm to move the calibration pattern to at least one location in the camera field of view; c) receiving, by the robot control system, a calibration image from the communication interface, wherein the communication interface is configured to receive the calibration image from the camera, the calibration image being an image of the calibration pattern at the at least one location in the camera field of view, and wherein the calibration pattern includes a plurality of pattern elements having respective defined pattern element locations in a pattern coordinate system, wherein the pattern coordinate system is a coordinate system defined with respect to a location and orientation of the calibration pattern; d) determining, by the robot control system, a plurality of image pattern element locations from the calibration image, wherein the plurality of image pattern element locations indicate respective locations at which the plurality of pattern elements appear in the calibration image; e) determining, by the robot control system, a first estimate of a first intrinsic camera parameter based on the plurality of image pattern element locations and based on the defined pattern element locations; f) determining, by the robot control system, after the first estimate of the first intrinsic camera parameter has been determined, a first estimate of a second intrinsic camera parameter based on the first estimate of the first intrinsic camera parameter and based on the plurality of image pattern element locations; g) determining, by the robot control system, a second estimate of the first intrinsic camera parameter and a second estimate of the second intrinsic camera parameter based on the first estimate of the second intrinsic camera parameter, and based on the plurality of image pattern element locations and the defined pattern element locations; h) determining, by the robot control system, based on the second estimate of the first intrinsic camera parameter and the second estimate of the second intrinsic camera parameter, an estimate of a transformation function that describes a relationship between a camera coordinate system and a world coordinate system, wherein the camera coordinate system is a coordinate system defined with respect to a location and orientation of the camera that the communication interface is configured to communicate with, and the world coordinate system is a coordinate system defined with respect to a location that is stationary relative to the base of the robot that the communication interface is configured to communicate with; i) receiving, by the robot control system, a subsequent image from the communication interface, wherein the communication interface is configured to receive the subsequent image from the camera after the estimate of the transformation function has been determined; j) generating, by the robot control system, a subsequent movement command based on the subsequent image and based on the estimate of the transformation function; and k) outputting, by the robot control system, the subsequent movement command to the communication interface, wherein the communication interface is configured to output the subsequent movement command to the robot to control placement of the robot arm.

Embodiment B11 relates to a non-transitory computer-readable medium having instructions stored thereon that, when executed by a control circuit of a robot control system, causes the control circuit to perform camera calibration by a) generating a movement command for outputting to a communication interface of the robot control system, wherein the communication interface is configured to communicate with a robot having a base and a robot arm with a calibration pattern disposed thereon, and with a camera having a camera field of view; b) outputting the movement command to the communication interface, wherein the communication interface is configured to communicate the movement command to the robot to cause the robot arm to move the calibration pattern to at least one location in the camera field of view; c) receiving a calibration image from the communication interface, wherein the communication interface is configured to receive the calibration image from the camera, the calibration image being an image of the calibration pattern at the at least one location in the camera field of view, and wherein the calibration pattern includes a plurality of pattern elements having respective defined pattern element locations in a pattern coordinate system, wherein the pattern coordinate system is a coordinate system defined with respect to a location and orientation of the calibration pattern; d) determining a plurality of image pattern element locations from the calibration image, wherein the plurality of image pattern element locations indicate respective locations at which the plurality of pattern elements appear in the calibration image; e) determining a first estimate of a first intrinsic camera parameter based on the plurality of image pattern element locations and based on the defined pattern element locations; f) determining after the first estimate of the first intrinsic camera parameter has been determined, a first estimate of a second intrinsic camera parameter based on the first estimate of the first intrinsic camera parameter and based on the plurality of image pattern element locations; g) determining a second estimate of the first intrinsic camera parameter and a second estimate of the second intrinsic camera parameter based on the first estimate of the second intrinsic camera parameter, and based on the plurality of image pattern element locations and the defined pattern element locations; h) determining, based on the second estimate of the first intrinsic camera parameter and the second estimate of the second intrinsic camera parameter, an estimate of a transformation function that describes a relationship between a camera coordinate system and a world coordinate system, wherein the camera coordinate system is a coordinate system defined with respect to a location and orientation of the camera that the communication interface is configured to communicate with, and the world coordinate system is a coordinate system defined with respect to a location that is stationary relative to the base of the robot that the communication interface is configured to communicate with. The instructions, when executed by the control circuit, further cause the control circuit to receive a subsequent image from the communication interface, wherein the communication interface is configured to receive the subsequent image from the camera after the camera calibration is performed, and to control placement of the robot arm by outputting to the robot, via the communication interface, a subsequent movement command that is based on the subsequent image and based on the estimate of the transformation function.

Embodiment C1 relates to a robot control system that comprises a communication interface and a control circuit. The communication interface is configured to communicate with: a robot having a robot arm with a calibration pattern disposed thereon, and a camera having a camera field of view. The calibration pattern includes a plurality of pattern elements having respective defined pattern element locations in a pattern coordinate system, wherein the pattern coordinate system is a coordinate system defined with respect to a location and orientation of the calibration pattern. The control circuit is configured, when the communication interface is in communication with the robot and the camera, to perform camera calibration by: outputting a movement command for controlling the robot arm to move the calibration pattern to at least one location within the camera field of view; receiving a calibration image from the camera via the communication interface, wherein the calibration image is captured by the camera and is an image of the calibration pattern at the at least one location; determining a plurality of image pattern element locations that indicate respective locations at which the plurality of pattern elements appear in the calibration image; determining an estimate of a first intrinsic camera parameter based on the plurality of image pattern element locations and based on the defined pattern element locations; after the estimate of the first intrinsic camera parameter has been determined, determining an estimate of a second intrinsic camera parameter based on the estimate of the first intrinsic camera parameter and based on the plurality of image pattern element locations. The control circuit is further configured, after the camera calibration is performed, to receive a subsequent image from the camera, and to generate a subsequent movement command for controlling placement of the robot arm, wherein the subsequent movement command is generated based on the subsequent image and based on the estimate of the first intrinsic camera parameter and the estimate of the second intrinsic camera parameter.

Embodiment C2 includes the robot control system of embodiment C1, wherein the estimate of the first intrinsic camera parameter is a first estimate thereof. In this embodiment, the control circuit is configured, when the communication interface is in communication with the robot and the camera, to perform the camera calibration further by determining a second estimate of the first intrinsic camera parameter based on the estimate of the second intrinsic camera parameter, and based on the plurality of image pattern element locations and the defined pattern element locations. The subsequent movement command is generated based on the second estimate of the first intrinsic camera parameter.

Embodiment C3 includes the robot control system of embodiment C2, wherein the estimate of the second intrinsic camera parameter is a first estimate thereof. In this embodiment, the control circuit is configured, when the communication interface is in communication with the robot and the camera, to perform the camera calibration further by determining a second estimate of the second intrinsic camera parameter based on the first estimate of the second intrinsic camera parameter, and based on the plurality of image pattern element locations and the defined pattern element locations. The subsequent movement command is generated based on the second estimate of the second intrinsic camera parameter.

Embodiment C4 includes the robot control system of embodiment C3, wherein the control circuit is configured, when the communication interface is in communication with the robot and the camera, to perform the camera calibration further by: determining, based on the second estimate of the first intrinsic camera parameter and the second estimate of the second intrinsic camera parameter, an estimate of a transformation function for describing a spatial relationship between the camera and a location that is stationary relative to a base of the robot. The subsequent movement command is generated based on the estimate of the transformation function.

Embodiment C5 includes the robot control system of embodiment C4, wherein the transformation function is a second transformation function. In this embodiment, the control circuit is configured, when the communication interface is in communication with the robot and the camera, to perform the camera calibration by further determining, based on the second estimate of the first intrinsic camera parameter and the second estimate of the second intrinsic camera parameter, an estimate of a first transformation function for describing a spatial relationship between the calibration pattern and the camera, wherein the second transformation function is determined based on the first transformation function.

Embodiment C6 includes the robot control system of embodiment C5, wherein the control circuit is further configured, when the communication interface is in communication with the robot and the camera, to determine a third estimate of the second intrinsic camera parameter and a third estimate of the first intrinsic camera parameter by: (a) determining a simulated calibration image, which is a simulated image of the calibration pattern, based on the estimate of the first transformation function, on the second estimate of the second intrinsic camera parameter, and on the second estimate of the first intrinsic camera parameter, (b) determining a difference between the simulated calibration image and the calibration image captured by the camera, (c) adjusting the second estimate of the second intrinsic camera parameter and the second estimate of the first intrinsic camera parameter based on the difference so as to generate an adjusted estimate of the second intrinsic camera parameter and an adjusted estimate of the first intrinsic camera parameter that reduces the difference, wherein the adjusted estimate of the second intrinsic camera parameter is the third estimate thereof, and the adjusted estimate of the first intrinsic camera parameter is the third estimate thereof. The estimate of the first transformation function is determined based on the third estimate of the second intrinsic camera parameter and the third estimate of the first intrinsic camera parameter.

Embodiment C7 includes the robot control system of embodiment C6, wherein the control circuit is configured, when the communication interface is in communication with the robot and the camera, to perform the camera calibration further by: determining an estimate of a third transformation function for describing a spatial relationship between the location that is stationary relative to the base of the robot and a location on a link of the robot arm having the calibration pattern disposed on the link, and determining an estimate of a fourth transformation function for describing a spatial relationship between the calibration pattern and the location on the link. The estimate of the second transformation function and the estimate of the fourth transformation function are both determined based on the estimate of first transformation function and the estimate of third transformation function.

Embodiment C8 includes the robot control system of embodiment C7, wherein the control circuit is configured, when the communication interface is in communication with the robot and the camera, to perform the camera calibration further by: determining a simulated calibration image, which is a simulated image of the calibration pattern, based on the estimate of the fourth transformation function, on the estimate of the third transformation function, on the estimate of the second transformation function, and on the second estimate of the first intrinsic camera parameter; determining, based on the second estimate of the second intrinsic camera parameter, a modified version of the calibration image captured by the camera to compensate against lens distortion caused by a lens of the camera; determining a difference between the simulated calibration image and the modified version of the calibration image; and adjusting at least the estimate of the fourth transformation function and the estimate of the second transformation function to reduce the difference between the simulated calibration image and the modified version of the calibration image.

Embodiment C9 includes the robot control system of embodiment C4. In this embodiment, the camera that the communication interface is configured to communicate with is a first camera. The communication interface is configured to communicate with a second camera. The control circuit is configured, when the communication interface is in communication with the robot and the first camera and the second camera, to perform the camera calibration by further determining a spatial relationship between the first camera and the second camera.

Embodiment C10 includes the robot control system of embodiment C1, wherein the first intrinsic camera parameter is a projection matrix for describing image projection onto an image sensor of the camera that the communication interface is configured to communicate with, and wherein the second intrinsic camera parameter is a distortion parameter for describing lens distortion caused by a lens of the camera that the communication interface is configured to communicate with.

Embodiment C11 includes the robot control system of embodiment C1, wherein the control circuit is configured, when the communication interface is in communication with the robot and the camera, to determine the estimate of the second intrinsic camera parameter by: (a) determining an initial estimate of the second intrinsic camera parameter, (b) generating, based on the initial estimate of the second intrinsic camera parameter, on the estimate of the first intrinsic camera parameter, and on the calibration image, a modified version of the calibration image for compensating against lens distortion caused by a lens of the camera, (c) determining an amount of curvature in the modified version of the calibration image, and (d) adjusting the initial estimate of the second intrinsic camera parameter based on the amount of curvature in the modified version of the calibration image so as to generate an adjusted estimate of the second intrinsic camera parameter that reduces the amount of curvature, wherein the adjusted estimate is the estimate of the second intrinsic camera parameter.

Embodiment C12 includes the robot control system of embodiment C11, wherein the plurality of pattern elements in the calibration pattern are a plurality of dots. In this embodiment, the control circuit is configured, when the communication interface is in communication with the robot and the camera, to determine the amount of curvature by: fitting a plurality of straight lines through the plurality of dots in the modified version of the calibration image, and determining the amount of curvature based on respective distances between each straight line of the plurality of straight lines and respective dots of the plurality of dots through which the straight line is fitted.

Embodiment C13 relates to a method for performing robot control. The method comprises the following: generating, by a robot control system, a movement command for outputting to a communication interface of the robot control system, wherein the communication interface is configured to communicate with a robot having a robot arm with a calibration pattern disposed thereon, and is configured to communicate with a camera having a camera field of view. The method further comprises: outputting, by the robot control system, the movement command to the communication interface, wherein the movement command is for controlling the robot arm to move the calibration pattern to at least one location in the camera field of view; receiving, by the robot control system, a calibration image from the communication interface, wherein the communication interface is configured to receive the calibration image from the camera, the calibration image being an image of the calibration pattern at the at least one location in the camera field of view, and wherein the calibration pattern includes a plurality of pattern elements having respective defined pattern element locations in a pattern coordinate system, wherein the pattern coordinate system is a coordinate system defined with respect to a location and orientation of the calibration pattern. The method further comprises: determining, by the robot control system, a plurality of image pattern element locations from the calibration image, wherein the plurality of image pattern element locations indicate respective locations at which the plurality of pattern elements appear in the calibration image; determining, by the robot control system, an estimate of a first intrinsic camera parameter based on the plurality of image pattern element locations and based on the defined pattern element locations; determining, by the robot control system, after the estimate of the first intrinsic camera parameter has been determined, an estimate of a second intrinsic camera parameter based on the estimate of the first intrinsic camera parameter and based on the plurality of image pattern element locations. The method further comprises receiving, by the robot control system, a subsequent image from the communication interface, wherein the communication interface is configured to receive the subsequent image from the camera after the estimate of the first intrinsic camera parameter and the estimate of the second intrinsic camera parameter have been determined; generating, by the robot control system, a subsequent movement command based on the subsequent image and based on the estimate of the first intrinsic camera parameter and the estimate of the second intrinsic camera parameter; and outputting, by the robot control system, the subsequent movement command to the communication interface, wherein the subsequent movement command is for controlling placement of the robot arm.

Embodiment C14 relates to a non-transitory computer-readable medium having instructions stored thereon that, when executed by a control circuit of a robot control system, causes the control circuit to perform camera calibration by: generating a movement command for outputting to a communication interface of the robot control system, wherein the communication interface is configured to communicate with a robot having a robot arm with a calibration pattern disposed thereon, and with a camera having a camera field of view. The instructions, when executed by the control circuit, further cause the control circuit to perform the camera calibration further by: outputting the movement command to the communication interface, wherein the movement command is for controlling the robot arm to move the calibration pattern to at least one location in the camera field of view; receiving a calibration image from the communication interface, wherein the communication interface is configured to receive the calibration image from the camera, the calibration image being an image of the calibration pattern at the at least one location in the camera field of view, and wherein the calibration pattern includes a plurality of pattern elements having respective defined pattern element locations in a pattern coordinate system, wherein the pattern coordinate system is a coordinate system defined with respect to a location and orientation of the calibration pattern; determining a plurality of image pattern element locations from the calibration image, wherein the plurality of image pattern element locations indicate respective locations at which the plurality of pattern elements appear in the calibration image; determining an estimate of a first intrinsic camera parameter based on the plurality of image pattern element locations and based on the defined pattern element locations; determining, after the estimate of the first intrinsic camera parameter has been determined, an estimate of a second intrinsic camera parameter based on the estimate of the first intrinsic camera parameter and based on the plurality of image pattern element locations. The instructions, when executed by the control circuit, further cause the control circuit, after the camera calibration is performed, to receive a subsequent image from the communication interface, wherein the communication interface is configured to receive the subsequent image from the camera. The instructions, when executed by the control circuit, further cause the control circuit to generate a subsequent movement command for controlling placement of the robot arm of the robot, wherein the subsequent movement command is generated based on the subsequent image and based on the estimate of the first intrinsic camera parameter and the estimate of the second intrinsic camera parameter.

Embodiment D1 includes a robot control system comprising a communication interface and a control circuit. The communication interface is configured to communicate with: a robot having a base and a robot arm with a calibration pattern disposed thereon, and a camera having a camera field of view. The calibration pattern includes a plurality of pattern elements having respective defined pattern element locations in a pattern coordinate system, wherein the pattern coordinate system is a coordinate system defined with respect to a location and orientation of the calibration pattern. The control circuit is configured, when the communication interface is in communication with the robot and with the camera, to perform camera calibration by: controlling the robot arm to move the calibration pattern to at least one location within the camera field of view by outputting a movement command to the robot via the communication interface; receiving a calibration image from the camera via the communication interface; wherein the calibration image is captured by the camera and is an image of the calibration pattern at the at least one location; determining a plurality of image pattern element locations that indicate respective locations at which the plurality of pattern elements appear in the calibration image; determining an estimate of a first intrinsic camera parameter and an estimate of a second intrinsic camera parameter based on the plurality of image pattern element locations and based on the defined pattern element locations; determining, based on the estimate of the first intrinsic camera parameter and the estimate of the second intrinsic camera parameter, an estimate of a first transformation function for describing a spatial relationship between the camera and the calibration pattern; determining a simulated calibration image, which is a simulated image of the calibration pattern, based on the estimate of the first transformation function, on the estimate of the first intrinsic camera parameter, and on the estimate of the second intrinsic camera parameter; determining a difference between the simulated calibration image and the calibration image; adjusting the estimate of the first transformation function based on the difference so as to generate an adjusted estimate of the first transformation function; determining, based on the adjusted estimate of the first transformation function, an estimate of a second transformation function for describing a spatial relationship between the camera and a location that is stationary relative to the base of the robot. The control circuit is further configured, after the camera calibration is performed, to receive a subsequent image from the camera, and to output a subsequent movement command for controlling placement of the robot arm, wherein the subsequent movement command is based on the subsequent image and based on the estimate of the second transformation function.

Embodiment D2 includes the robot control system of embodiment D1, wherein the control circuit is configured, when the communication interface is in communication with the robot and the camera, to determine the simulated calibration image by determining a plurality of simulated pixel coordinates which predict where the plurality of pattern elements will appear in the simulated calibration image. In this embodiment, the control circuit is further configured to determine the difference between the simulate calibration image and the calibration image by determining respective distances between the plurality of simulated pixel coordinates and a plurality of actual pixel coordinates that indicate where the plurality of pattern elements actually appear in the calibration image.

Embodiment D3 includes the robot control system of embodiment D2, wherein the control circuit is configured, when the communication interface is in communication with the robot and the camera, to adjust the estimate of the first transformation function so as to reduce the respective distances between the plurality of simulated pixel coordinates and the plurality of actual pixel coordinates.

Embodiment D4 includes the robot control system of embodiment D3, wherein the control circuit is configured, when the communication interface is in communication with the robot and the camera, to perform the camera calibration further by: adjusting the estimate of the first intrinsic camera parameter to determine an adjusted estimate of the first intrinsic camera parameter, and adjusting the estimate of the second intrinsic camera parameter to determine an adjusted estimate of the second intrinsic camera parameter. In this embodiment, the adjusting of the first transformation function, the adjusting of the estimate of the first intrinsic camera parameter, and the adjusting of the estimate of the second intrinsic camera parameter are performed by the control circuit to reduce the respective distances between the plurality of simulated pixel coordinates and the plurality of actual pixel coordinates.

Embodiment D5 includes the robot control system of embodiment D4, wherein the estimate of the second transformation function is determined further based on the adjusted estimate of the second intrinsic camera parameter and the adjusted estimate of the first intrinsic camera parameter.

Embodiment D6 includes the robot control system of embodiment D1, wherein the estimate of the first intrinsic camera parameter is a second estimate thereof, and wherein the estimate of the second intrinsic camera parameter is a second estimate thereof. In this embodiment, the control circuit is further configured, when the communication interface is in communication with the robot and the camera, to perform the camera calibration further by: determining a first estimate of the first intrinsic camera parameter based on the plurality of image pattern element locations and based on the defined pattern element locations; after the first estimate of the first intrinsic camera parameter has been determined, determining a first estimate of the second intrinsic camera parameter based on the first estimate of the first intrinsic camera parameter and based on the plurality of image pattern element locations. The second estimate of the first intrinsic camera parameter and the second estimate of the second intrinsic camera parameter are determined based on the first estimate of the second intrinsic camera parameter.

Embodiment D7 includes the robot control system of embodiment D6, wherein the control circuit is configured, when the communication interface is in communication with the robot and the camera, to determine the first estimate of the second intrinsic camera parameter by: (a) determining an initial estimate of the second intrinsic camera parameter, (b) generating, based on the initial estimate of the second intrinsic camera parameter, on the first estimate of the first intrinsic camera parameter, and on the calibration image, a modified version of the calibration image for compensating against lens distortion caused by a lens of the camera, (c) determining an amount of curvature in the modified version of the calibration image, (d) adjusting the initial estimate of the second intrinsic camera parameter based on the amount of curvature in the modified version of the calibration image so as to generate an adjusted estimate of the second intrinsic camera parameter that reduces the amount of curvature, wherein the adjusted estimate is the first estimate of the second intrinsic camera parameter.

Embodiment D8 includes the robot control system of embodiment D7, wherein the plurality of pattern elements in the calibration pattern are a plurality of dots. In this embodiment, the control circuit is configured, when the communication interface is in communication with the robot and the camera, to determine the amount of curvature by: fitting a plurality of straight lines through the plurality of dots in the modified version of the calibration image, and determining the amount of curvature based on respective distances between each straight line of the plurality of straight lines and respective dots of the plurality of dots through which the straight line is fitted.

Embodiment D9 includes the robot control system of embodiment D1, wherein the first intrinsic camera parameter is a projection matrix for describing image projection onto an image sensor of the camera that the communication interface is configured to communicate with, and wherein the second intrinsic camera parameter is a distortion parameter for describing lens distortion caused by a lens of the camera that the communication interface is configured to communicate with.

Embodiment D10 includes the robot control system of embodiment D1, wherein the control circuit is configured, when the communication interface is in communication with the robot and the camera, to perform the camera calibration further by: determining an estimate of a third transformation function for describing a spatial relationship between the location that is stationary relative to the base of the robot and a location on a link of the robot arm having the calibration pattern disposed on the link; and determining an estimate of a fourth transformation function for describing a spatial relationship between the calibration pattern and the location on the link, wherein the estimate of the second transformation function and the estimate of the fourth transformation function are both determined based on the estimate of first transformation function and the estimate of third transformation function.

Embodiment D11 includes the robot control system of embodiment D10, wherein the simulated calibration image is a first simulated calibration image. In this embodiment, the control circuit is configured, when the communication interface is in communication with the robot and the camera, to perform the camera calibration further by: determining a second simulated calibration image, which is a second simulated image of the calibration pattern, based on the estimate of the fourth transformation function, on the estimate of the third transformation function, on the estimate of the second transformation function, and on the estimate of the first intrinsic camera parameter; determining, based on the estimate of the second intrinsic camera parameter, a modified version of the calibration image for compensating against lens distortion caused by a lens of the camera; determining a difference between the second simulated calibration image and the modified version of the calibration image; and adjusting at least the estimate of the fourth transformation function and the estimate of the second transformation function to reduce the difference between the second simulated calibration image and the modified version of the calibration image.

Embodiment D12 includes the robot control system of embodiment D11, wherein the control circuit is further configured, when the communication interface is in communication with the robot and the camera: to receive, before the first calibration image is received, an additional calibration image from the camera via the communication interface. In this embodiment, the additional calibration image is an additional image of the calibration pattern. The control circuit is configured to determine, based on an appearance of a pattern element in the additional calibration image, a value of at least one of a focus parameter or an exposure parameter; and to cause the first calibration image to be generated based on the value of the at least one of the focus parameter or exposure parameter.

Embodiment D13 relates to a method for performing robot control. The method comprises generating, by a robot control system, a movement command for outputting to a communication interface of the robot control system. The communication interface is configured to communicate with a robot having a base and a robot arm with a calibration pattern disposed thereon, and is configured to communicate with a camera having a camera field of view. The method further comprises: outputting, by the robot control system, the movement command to the communication interface, wherein the communication interface is configured to communicate the movement command to the robot to cause the robot arm to move the calibration pattern to at least one location in the camera field of view; receiving, by the robot control system, a calibration image from the communication interface, wherein the communication interface is configured to receive the calibration image from the camera, the calibration image being an image of the calibration pattern at the at least one location in the camera field of view, and wherein the calibration pattern includes a plurality of pattern elements having respective defined pattern element locations in a pattern coordinate system, wherein the pattern coordinate system is a coordinate system defined with respect to a location and orientation of the calibration pattern; determining, by the robot control system, a plurality of image pattern element locations from the calibration image, wherein the plurality of image pattern element locations indicate respective locations at which the plurality of pattern elements appear in the calibration image. The method further comprises: determining, by the robot control system, an estimate of a first intrinsic camera parameter and an estimate of the second intrinsic camera parameter based on the plurality of image pattern element locations and based on the defined pattern element locations; determining, by the robot control system, based on the estimate of the first intrinsic camera parameter and the estimate of the second intrinsic camera parameter, an estimate of a first transformation function for describing a spatial relationship between the camera and the calibration pattern; determining a simulated calibration image, which is a simulated image of the calibration pattern, based on the estimate of the first transformation function, on the estimate of the first intrinsic camera parameter, and on the estimate of the second intrinsic camera parameter. The method further comprises: determining a difference between the simulated calibration image and the calibration image; adjusting the estimate of the first transformation function based on the difference so as to generate an adjusted estimate of the first transformation function; determining, based on the adjusted estimate of the first transformation function, an estimate of a second transformation function for describing a spatial relationship between the camera and a location that is stationary relative to the base of the robot; receiving, by the robot control system, a subsequent image from the communication interface, wherein the communication interface is configured to receive the subsequent image from the camera after the estimate of the second transformation function has been determined; generating, by the robot control system, a subsequent movement command based on the subsequent image and based on the estimate of the second transformation function; and outputting, by the robot control system, the subsequent movement command to the communication interface, wherein the communication interface is configured to output the subsequent movement command to the robot to control placement of the robot arm.

Embodiment D14 relates to a non-transitory computer-readable medium having instructions stored thereon that, when executed by a control circuit of a robot control system, causes the control circuit to perform camera calibration by: generating a movement command for outputting to a communication interface of the robot control system, wherein the communication interface is configured to communicate with a robot having a base and a robot arm with a calibration pattern disposed thereon, and with a camera having a camera field of view. The instructions, when executed by the control circuit, further cause the control circuit to perform the camera calibration further by: outputting the movement command to the communication interface, wherein the communication interface is configured to communicate the movement command to the robot to cause the robot arm to move the calibration pattern to at least one location in the camera field of view; receiving a calibration image from the communication interface, wherein the communication interface is configured to receive the calibration image from the camera, the calibration image being an image of the calibration pattern at the at least one location in the camera field of view, and wherein the calibration pattern includes a plurality of pattern elements having respective defined pattern element locations in a pattern coordinate system, wherein the pattern coordinate system is a coordinate system defined with respect to a location and orientation of the calibration pattern; determining a plurality of image pattern element locations from the calibration image, wherein the plurality of image pattern element locations indicate respective locations at which the plurality of pattern elements appear in the calibration image; determining an estimate of a first intrinsic camera parameter and an estimate of a second intrinsic camera parameter based on the plurality of image pattern element locations and based on the defined pattern element locations; determining, based on the estimate of the first intrinsic camera parameter and the estimate of the second intrinsic camera parameter, an estimate of a first transformation function for describing a spatial relationship between the camera and the calibration pattern; determining a simulated calibration image, which is a simulated image of the calibration pattern, based on the estimate of the first transformation function, on the estimate of the first intrinsic camera parameter, and on the estimate of the second intrinsic camera parameter; determining a difference between the simulated calibration image and the calibration image; adjusting the estimate of the first transformation function based on the difference so as to generate an adjusted estimate of the first transformation function; determining, based on the adjusted estimate of the first transformation function, an estimate of a second transformation function for describing a spatial relationship between the camera and a location that is stationary relative to the base of the robot. The instructions, when executed by the control circuit, further cause the control circuit, after the camera calibration is performed, to receive a subsequent image from the communication interface. The communication interface is configured to receive the subsequent image from the camera. The instructions, when executed by the control circuit, further cause the control circuit to output a subsequent movement command for controlling placement of the robot arm, wherein the subsequent movement command is based on the subsequent image and based on the estimate of the second transformation function.

While various embodiments have been described above, it should be understood that they have been presented only as illustrations and examples of the present invention, and not by way of limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

What is claimed is:

1. A robot control system comprising:
a communication interface configured to communicate with:
a robot having a base and a robot arm with a calibration pattern disposed thereon, and
a camera having a camera field of view,
wherein the calibration pattern includes a plurality of pattern elements having respective defined pattern element locations in a pattern coordinate system, wherein the pattern coordinate system is a coordinate system defined with respect to a location and orientation of the calibration pattern; and
a control circuit configured to perform camera calibration by:
controlling the robot arm to move the calibration pattern to at least one location within the camera field of view by outputting a movement command to the robot via the communication interface,
receiving a calibration image, wherein the calibration image is captured by the camera and is an image of the calibration pattern at the at least one location,
determining a plurality of image pattern element locations that indicate respective locations at which the plurality of pattern elements appear in the calibration image,
determining an estimate of a first intrinsic camera parameter of a first type based on the plurality of image pattern element locations and based on the defined pattern element locations and without having previously determined an estimate of an intrinsic camera parameter of a second type,
determining an estimate of a second intrinsic camera parameter of the second type based on the estimate of the first intrinsic camera parameter of the first type and based on an amount of curvature detected between the plurality of image pattern element locations, and
determining, based on the estimate of the first intrinsic camera parameter of the first type and the estimate of the second intrinsic camera parameter of the second type, an estimate of a transformation function that describes a relationship between a camera coordinate system and a world coordinate system, wherein the camera coordinate system is a coordinate system defined with respect to a location and orientation of the camera, and the world coordinate system is a coordinate system defined with respect to a location that is stationary relative to the base of the robot.

2. The robot control system of claim 1, wherein the transformation function is a second transformation function, and wherein the control circuit is configured to perform the camera calibration by further determining an estimate of a first transformation function that describes a relationship between the pattern coordinate system and the camera coordinate system, wherein the second transformation function is further determined based on the first transformation function.

3. The robot control system of claim 2, wherein the control circuit is further configured to:
determine a simulated calibration image, which is a simulated image of the calibration pattern, based on the estimate of the first transformation function, on the estimate of the first intrinsic camera parameter of the first type, and on the estimate of the second intrinsic camera parameter of the second type,
determine a difference between the simulated calibration image and the calibration image,
adjust the estimate of the first transformation function based on the difference so as to generate an adjusted estimate of the first transformation function, and
determine, based on the adjusted estimate of the first transformation function, an estimate of the second transformation function for describing a spatial relationship between the camera and a location that is stationary relative to the base of the robot.

4. The robot control system of claim 2, wherein the control circuit is configured to perform the camera calibration further by:
determining an estimate of a third transformation function that describes a relationship between the world coordinate system and a link coordinate system, wherein the link coordinate system is a coordinate system defined with respect to a location on a link of the robot arm having the calibration pattern disposed on the link, and
determining an estimate of a fourth transformation function that describes a relationship between the pattern coordinate system and the link coordinate system, wherein the estimate of the second transformation function and the estimate of the fourth transformation function are both determined based on the estimate of the first transformation function and the estimate of the third transformation function.

5. The robot control system of claim 4, wherein the control circuit is configured to perform the camera calibration further by:
determining a simulated calibration image, which is a simulated image of the calibration pattern, based on the estimate of the fourth transformation function, on the estimate of the third transformation function, and on the estimate of the second transformation function,
determining a modified version of the calibration image captured by the camera to compensate against lens distortion caused by a lens of the camera,
determining a difference between the simulated calibration image and the modified version of the calibration image, and
adjusting at least the estimate of the fourth transformation function and the estimate of the second transformation function to reduce the difference between the simulated calibration image and the modified version of the calibration image.

6. The robot control system of claim 4, wherein the camera that the communication interface is configured to communicate with is a first camera and the camera coordinate system is a first camera coordinate system,
wherein the communication interface is configured to communicate with a second camera, and
wherein the control circuit is configured to perform the camera calibration by further determining a relationship between the first camera coordinate system and a second camera coordinate system, wherein the second camera coordinate system is defined with respect to a location and orientation of the second camera.

7. The robot control system of claim 1, wherein the first intrinsic camera parameter of the first type is a projection matrix that describes image projection onto an image sensor of the camera that the communication interface is configured to communicate with, and wherein the second intrinsic camera parameter of the second type is a distortion parameter that describes lens distortion caused by a lens of the camera that the communication interface is configured to communicate with.

8. The robot control system of claim 7, wherein the control circuit is configured to determine the estimate of the second intrinsic camera parameter of the second type by: (a) determining an initial estimate of the second intrinsic camera parameter of the second type, (b) generating, based on the initial estimate of the second intrinsic camera parameter of the second type, on the estimate of the first intrinsic camera parameter of the first type, and on the calibration image, a modified version of the calibration image that compensates against lens distortion caused by the lens, (c) determining an amount of curvature in the modified version of the calibration image, and (d) adjusting the initial estimate of the second intrinsic camera parameter of the second type based on the amount of curvature in the modified version of the calibration image so as to generate an adjusted estimate of the second intrinsic camera parameter of the second type that reduces the amount of curvature, wherein the adjusted estimate is the estimate of the second intrinsic camera parameter of the second type.

9. The robot control system of claim 8, wherein the control circuit is configured to determine the amount of curvature by: fitting a plurality of straight lines through the plurality of pattern elements in the modified version of the calibration image, and determining the amount of curvature based on respective distances between each straight line of the plurality of straight lines and respective pattern elements of the plurality of pattern elements through which the straight line is fitted.

10. The robot control system of claim 1, wherein the estimate of the second intrinsic camera parameter of the second type is not calculated at a time of determining the estimate of the first intrinsic camera parameter of the first type.

11. A method for performing robot control, the method comprising:
generating, by a robot control system, a movement command for outputting to a communication interface of the robot control system, wherein the communication interface is configured to communicate with a robot having a base and a robot arm with a calibration pattern disposed thereon, and is configured to communicate with a camera having a camera field of view;
outputting, by the robot control system, the movement command to the communication interface, wherein the communication interface is configured to communicate the movement command to the robot to cause the robot arm to move the calibration pattern to at least one location in the camera field of view;
receiving, by the robot control system, a calibration image, wherein the communication interface is configured to receive the calibration image from the camera, the calibration image being an image of the calibration pattern at the at least one location in the camera field of view, and wherein the calibration pattern includes a plurality of pattern elements having respective defined pattern element locations in a pattern coordinate system, wherein the pattern coordinate system is a coordinate system defined with respect to a location and orientation of the calibration pattern;
determining, by the robot control system, a plurality of image pattern element locations from the calibration image, wherein the plurality of image pattern element locations indicate respective locations at which the plurality of pattern elements appear in the calibration image;
determining, by the robot control system, an estimate of a first intrinsic camera parameter of a first type based on the plurality of image pattern element locations and based on the defined pattern element locations and without having previously determined an estimate of an intrinsic camera parameter of a second type;
determining, by the robot control system, an estimate of a second intrinsic camera parameter of the second type based on the estimate of the first intrinsic camera parameter of the first type and based on an amount of curvature detected between the plurality of image pattern element locations; and
determining, by the robot control system, based on the estimate of the first intrinsic camera parameter of the first type and the estimate of the second intrinsic camera parameter of the second type, an estimate of a transformation function that describes a relationship between a camera coordinate system and a world coordinate system, wherein the camera coordinate system is a coordinate system defined with respect to a location and orientation of the camera that the communication interface is configured to communicate with, and the world coordinate system is a coordinate system defined with respect to a location that is stationary relative to the base of the robot that the communication interface is configured to communicate with.

12. The method of claim 11, wherein the transformation function is a second transformation function, and wherein the method further comprises determining an estimate of a first transformation function that describes a relationship between the pattern coordinate system and the camera coordinate system, wherein the second transformation function is further determined based on the first transformation function.

13. The method of claim 12, further comprising:
determining a simulated calibration image, which is a simulated image of the calibration pattern, based on the estimate of the first transformation function, on the estimate of the first intrinsic camera parameter of the first type, and on the estimate of the second intrinsic camera parameter of the second type,
determining a difference between the simulated calibration image and the calibration image,
adjusting the estimate of the first transformation function based on the difference so as to generate an adjusted estimate of the first transformation function, and
determining, based on the adjusted estimate of the first transformation function, an estimate of the second transformation function for describing a spatial relationship between the camera and a location that is stationary relative to the base of the robot.

14. The method of claim 12, further comprising:
determining an estimate of a third transformation function that describes a relationship between the world coordinate system and a link coordinate system, wherein the link coordinate system is a coordinate system defined with respect to a location on a link of the robot arm, wherein the calibration pattern is disposed on the link, and
determining an estimate of a fourth transformation function that describes a relationship between the pattern coordinate system and the link coordinate system, wherein the estimate of the second transformation function and the estimate of the fourth transformation function are both determined based on the estimate of the first transformation function and the estimate of the third transformation function.

15. The method of claim 14, further comprising:
determining a simulated calibration image, which is a simulated image of the calibration pattern, based on the estimate of the fourth transformation function, on the estimate of the third transformation function, and on the estimate of the second transformation function,
determining a modified version of the calibration image to compensate against lens distortion,
determining a difference between the simulated calibration image and the modified version of the calibration image, and
adjusting at least the estimate of the fourth transformation function and the estimate of the second transformation function to reduce the difference between the simulated calibration image and the modified version of the calibration image.

16. The method of claim 11, wherein determining the estimate of the second intrinsic camera parameter of the second type comprises: (a) determining an initial estimate of the second intrinsic camera parameter of the second type, (b) generating, based on the initial estimate of the second intrinsic camera parameter of the second type, on the estimate of the first intrinsic camera parameter of the first type, and on the calibration image, a modified version of the calibration image that compensates against lens distortion caused by a lens, (c) determining an amount of curvature in the modified version of the calibration image, and (d) adjusting the initial estimate of the second intrinsic camera parameter of the second type based on the amount of curvature in the modified version of the calibration image so as to generate an adjusted estimate of the second intrinsic camera parameter of the second type that reduces the amount of curvature, wherein the adjusted estimate is the estimate of the second intrinsic camera parameter of the second type.

17. A non-transitory computer-readable medium having instructions stored thereon that, when executed by a control circuit of a robot control system, causes the control circuit to perform camera calibration by:
generating a movement command for outputting to a communication interface of the robot control system, wherein the communication interface is configured to communicate with a robot having a base and a robot arm with a calibration pattern disposed thereon, and with a camera having a camera field of view;
outputting the movement command to the communication interface, wherein the communication interface is configured to communicate the movement command to the robot to cause the robot arm to move the calibration pattern to at least one location in the camera field of view;
receiving a calibration image, wherein the communication interface is configured to receive the calibration image from the camera, the calibration image being an image of the calibration pattern at the at least one location in the camera field of view, and wherein the calibration pattern includes a plurality of pattern elements having respective defined pattern element locations in a pattern coordinate system, wherein the pattern coordinate system is a coordinate system defined with respect to a location and orientation of the calibration pattern;
determining a plurality of image pattern element locations from the calibration image, wherein the plurality of image pattern element locations indicate respective locations at which the plurality of pattern elements appear in the calibration image;
determining an estimate of a first intrinsic camera parameter of a first type based on the plurality of image pattern element locations and based on the defined pattern element locations and without having previously determined an estimate of an intrinsic camera parameter of a second type;
determining an estimate of a second intrinsic camera parameter of the second type based on the estimate of the first intrinsic camera parameter of the first type and based on an amount of curvature detected between the plurality of image pattern element locations; and
determining, based on the estimate of the first intrinsic camera parameter of the first type and the estimate of the second intrinsic camera parameter of the second type, an estimate of a transformation function that describes a relationship between a camera coordinate system and a world coordinate system, wherein the camera coordinate system is a coordinate system defined with respect to a location and orientation of the camera that the communication interface is configured to communicate with, and the world coordinate system is a coordinate system defined with respect to a location that is stationary relative to the base of the robot that the communication interface is configured to communicate with.

18. The non-transitory computer-readable medium of claim 17, wherein the transformation function is a second transformation function, and wherein the instructions, when executed by the control circuit, further cause the control circuit to determine an estimate of a first transformation function that describes a relationship between the pattern coordinate system and the camera coordinate system, wherein the second transformation function is determined based on the first transformation function.

19. The non-transitory computer-readable medium of claim 18, wherein the instructions, when executed by the control circuit, further cause the control circuit to:
determine a simulated calibration image, which is a simulated image of the calibration pattern, based on the estimate of the first transformation function, on the estimate of the first intrinsic camera parameter of the first type, and on the estimate of the second intrinsic camera parameter of the second type,
determine a difference between the simulated calibration image and the calibration image,
adjust the estimate of the first transformation function based on the difference so as to generate an adjusted estimate of the first transformation function, and
determine, based on the adjusted estimate of the first transformation function, an estimate of the second transformation function for describing a spatial relationship between the camera and a location that is stationary relative to the base of the robot.

20. The non-transitory computer-readable medium of claim 18, wherein the instructions, when executed by the control circuit, further cause the control circuit to:
determine an estimate of a third transformation function that describes a relationship between the world coordinate system and a link coordinate system, wherein the link coordinate system is a coordinate system defined with respect to a location on a link of the robot arm, wherein the calibration pattern is disposed on the link, and determine an estimate of a fourth transformation function that describes a relationship between the pattern coordinate system and the link coordinate system, wherein the estimate of the second transformation function and the estimate of the fourth transformation function are both determined based on the estimate of the first transformation function and the estimate of the third transformation function.

21. The non-transitory computer-readable medium of claim 20, wherein the instructions, when executed by the control circuit, further cause the control circuit to:
determine a simulated calibration image, which is a simulated image of the calibration pattern, based on the estimate of the fourth transformation function, on the estimate of the third transformation function, and on the estimate of the second transformation function,
determine a modified version of the calibration image to compensate against lens distortion,
determine a difference between the simulated calibration image and the modified version of the calibration image, and
adjust at least the estimate of the fourth transformation function and the estimate of the second transformation function to reduce the difference between the simulated calibration image and the modified version of the calibration image.

* * * * *